United States Patent
Tien et al.

(10) Patent No.: US 8,612,386 B2
(45) Date of Patent: Dec. 17, 2013

(54) METHOD AND APPARATUS FOR PEER-TO-PEER DATABASE SYNCHRONIZATION IN DYNAMIC NETWORKS

(75) Inventors: Chienwen Tien, Plano, TX (US); Raymond B. Miller, Belmar, NJ (US); Jih-Tsang Leu, Plano, TX (US); Pravir A. Patel, McKinney, TX (US); Suman Das, Colonia, NJ (US); Jaideep Singh Lamba, Plano, TX (US); Liem Le, Murphy, TX (US)

(73) Assignee: Alcatel Lucent, Paris (FR)

( * ) Notice: Subject to any disclaimer, the term of this patent is extended or adjusted under 35 U.S.C. 154(b) by 44 days.

(21) Appl. No.: 13/025,908

(22) Filed: Feb. 11, 2011

(65) Prior Publication Data

US 2012/0209808 A1    Aug. 16, 2012

(51) Int. Cl.
    *G06F 7/00*    (2006.01)
(52) U.S. Cl.
    USPC ........... 707/614; 707/641; 707/959; 707/966; 370/255
(58) Field of Classification Search
    None
    See application file for complete search history.

(56) References Cited

U.S. PATENT DOCUMENTS

| | | | |
|---|---|---|---|
| 2006/0256769 A1* | 11/2006 | Cho et al. | 370/351 |
| 2007/0099624 A1* | 5/2007 | Guo | 455/453 |
| 2009/0003279 A1* | 1/2009 | Abusch-Magder et al. | 370/331 |
| 2009/0103436 A1* | 4/2009 | Heino et al. | 370/235 |
| 2009/0147702 A1* | 6/2009 | Buddhikot et al. | 370/255 |
| 2010/0177665 A1* | 7/2010 | Ayyagari et al. | 370/254 |
| 2012/0089714 A1* | 4/2012 | Carley | 709/223 |

* cited by examiner

*Primary Examiner* — Anh Tai Tran
(74) *Attorney, Agent, or Firm* — Wall & Tong, LLP

(57) ABSTRACT

A distributed database synchronization capability is provided herein. The distributed database synchronization capability may be implemented using one or more of a timer-based scheme and a token-based scheme. The distributed database synchronization capability enables synchronization of databases of nodes in various types of networks, including dynamic networks (e.g., such as rapidly deployable wireless networks) and various other types of networks. The synchronization of databases may include synchronization of databases as a whole and/or portions of databases (which may include any suitable database table or tables). The distributed database synchronization capability enables synchronization of databases of nodes under various dynamic conditions (e.g., synchronization of databases of nodes within a cluster of nodes, synchronization of databases of nodes between clusters of nodes, synchronization of databases of nodes by administrative domain, and the like).

18 Claims, 23 Drawing Sheets

1900

2000

2200

2300

METHOD AND APPARATUS FOR PEER-TO-PEER DATABASE SYNCHRONIZATION IN DYNAMIC NETWORKS

FIELD OF THE INVENTION

The invention relates generally to dynamic wireless networks and, more specifically but not exclusively, to database synchronization in dynamic wireless networks.

BACKGROUND

In many types of networks, replication of data across multiple nodes is important in order to maintain a synchronized database. For example, in many networks, the database for the network may maintain information such as user profiles, authentication and authorization credentials, quality-of-service profiles, billing and accounting information, and the like. While maintaining a synchronized database in a network is important to its coherent operation, it is, at the same time, a challenging task, and especially in networks with unknown and dynamic topologies (e.g., in dynamic networks such as rapidly deployable mesh networks used in emergency response and disaster recovery situations, tactical deployment scenarios, and the like). The two main challenges involved in such networks are (1) the limited bandwidth of wireless networks and (2) the high frequency of the nodes joining and leaving the network. The existing solution for database synchronization in many networks utilizes a centralized approach, e.g., a pre-defined master and slave relationship, which is not feasible in dynamic networks. Furthermore, when using such centralized approaches in dynamic networks, whenever a node joins the network, a large amount of data has to be transferred from a pre-elected leader node to the joining node, which may result in a funneling effect on links near the leader node. For example, in a twenty node system where the leader has only one link to a single neighbor, nineteen copies of possibly very large database tables may be transferred on the single link between the leader node and its neighbor. Thus, a need exists for improved database synchronization capabilities.

SUMMARY

Various deficiencies in the prior art are addressed by embodiments that facilitate synchronization of databases in dynamic wireless networks including mobile network nodes (MNNs).

In one embodiment, an apparatus for building a database synchronization node list of a MNN associated with an organization includes a processor configured for performing steps of: in response to a trigger condition, identifying each of a plurality of mesh neighbor nodes of the MNN having wireless connectivity to the MNN; for each mesh neighbor node of the MNN associated with the organization, entering the mesh neighbor node into the database synchronization neighbor list of the MNN; and, for each mesh neighbor node of the MNN not associated with the organization, propagating a probe message from the MNN toward the mesh neighbor node via the wireless connection therebetween.

In one embodiment, an apparatus for synchronizing a database of a mobile network node (MNN) associated with an organization includes a processor configured for performing steps of: selecting, by the MNN, a neighbor node associated with the organization, where the selected neighbor node is one of a plurality of neighbor nodes of the MNN that are associated with the organization; and initiating, by the MNN, a database synchronization process for synchronizing the database of the MNN with the database of the selected neighbor node.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF ILLUSTRATIVE EMBODIMENTS

Figure 1:
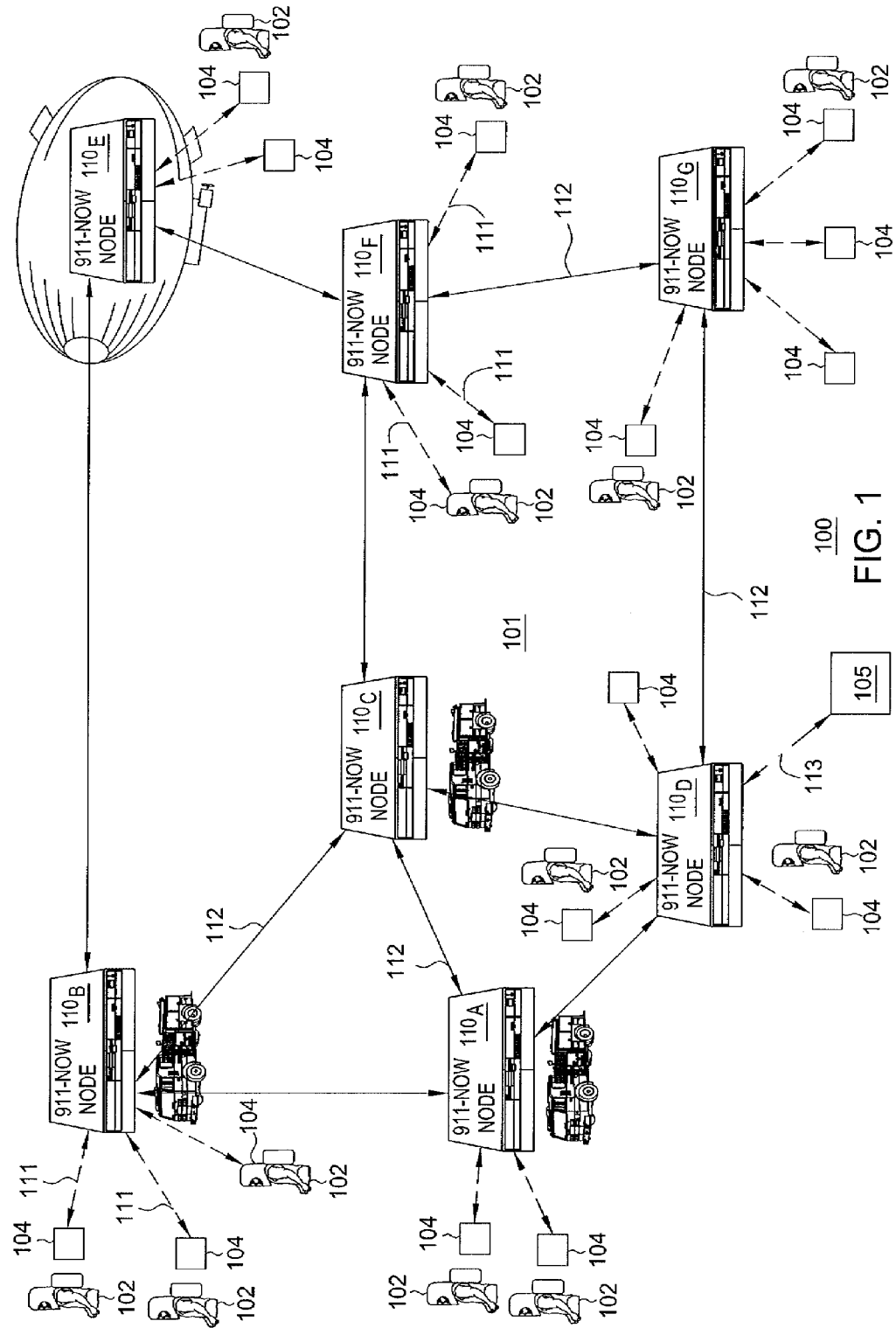
FIG. 1 depicts a standalone 911-NOW communication network architecture that is independent of any existing network infrastructure.

A distributed database synchronization capability is depicted and described herein.

The distributed database synchronization capability enables synchronization of databases of nodes in various types of networks, including dynamic networks (e.g., such as rapidly deployable wireless networks) and various other types of networks. The synchronization of databases may include synchronization of databases as a whole and/or portions of databases (which may include any suitable database table or tables).

The distributed database synchronization capability enables synchronization of databases of nodes under various dynamic conditions. For example, the distributed database synchronization capability enables synchronization of databases of nodes within a cluster of nodes (e.g., ensuring that, for a given cluster of nodes, data stored in the databases of the nodes of the cluster reaches an equilibrium state in which the data is synchronized throughout the nodes of the cluster). For example, the distributed database synchronization capability enables synchronization of databases of nodes between clusters of nodes. For example, the distributed database synchronization capability enables synchronization of databases of nodes to be isolated by administrative domain as necessary, even where nodes of multiple organizations cooperate to form the network.

The distributed database synchronization capability reduces the control traffic overhead on the network, eliminates the funneling effect of existing centralized database synchronization schemes, and provides various other advantages.

In various embodiments of the distributed database synchronization capability, which also may be referred to herein as a peer-to-peer database synchronization capability or a hop-by-hop database synchronization capability, each node of the network synchronizes with a subset of nodes of the network (e.g., only with its immediate neighbor nodes in a given cluster, with only one node of the same organization in a different cluster, and the like), rather than synchronizing with all nodes of the network as in centralized database synchronization schemes.

The distributed database synchronization capability may be implemented using one or more of a token-based implementation, a timer-based implementation, and the like.

The distributed database synchronization capability is described within the context of a rapidly deployable wireless network (denoted herein as a 911 network on wheels, i.e., 911-NOW network); however, the distributed database synchronization capability is applicable to various other types of networks.

A 911-NOW network is formed by placing a 911-NOW node(s) on a mobile platform(s) such that when the mobile platform(s) is dispatched to a network site, the 911-NOW node(s) provides a wireless communication network. As described herein, one or more 911-NOW nodes may be deployed to form a wireless network. The 911-NOW network may be a standalone wireless network that is independent of existing network infrastructure or an integrated wireless network that utilizes existing network infrastructure.

FIG. 1 depicts a standalone 911-NOW communication network architecture that is independent of any existing network infrastructure. Specifically, standalone 911-NOW communication network architecture 100 includes a plurality of 911-NOW nodes 110$_A$-110$_G$ (collectively, 911-NOW nodes 110) supporting wireless communications at an emergency site 101. The standalone 911-NOW communication network architecture 100 provides a fully-functional network since each of the 911-NOW nodes 110 supports RAN functions, CORE networking functions, and services. As depicted in FIG. 1, each of the 911-NOW nodes 110 is placed or mounted on a mobile platform and transported to emergency site 101. The 911-NOW nodes 110 form a wireless network at emergency site 101.

The emergency site 101 may be any location or combination of locations at which a wireless network is required. The emergency site 101 may be a localized site, a collection of localized sites, a widespread site, a collection of widespread sites, and the like, as well as various combinations thereof. For example, emergency site 101 may be a single location, multiple locations within a town or city, or even span one or more counties, states, countries, or even continents. The 911-NOW network is not limited by the scope of the emergency site. The emergency site 101 may be associated with any type of emergency. For example, emergency site 101 may be associated with a natural disaster (e.g., a flood, a hurricane, a tornado, and the like), a manmade disaster (e.g., a chemical spill, a terrorist attack, and the like), and the like, as well as various combinations thereof.

As depicted in FIG. 1, emergency personnel (denoted herein as users 102 of the 911-NOW network 100) have responded to the emergency. The users 102 are performing various different functions at different areas of emergency site 101. For example, the users may be containing the disaster, participating in evacuation operations, participating in search and rescue operations, and the like, as well as various combinations thereof. The users 102 use equipment in responding to the emergency, including equipment capable of receiving and sending information wirelessly (denoted herein as wireless user devices 104 of users 102). The wireless user devices 104 include communication equipment, and may include various other types of emergency equipment (depending on the type of emergency, severity of the emergency, logistics of the emergency site, and various other factors).

For example, wireless user devices 104 may include wireless devices carried by emergency personnel for communicating with other emergency personnel, receiving information for use in responding at the emergency site, collecting information at the emergency site, monitoring conditions at the emergency site, and the like, as well as various combinations thereof. For example, wireless user devices 104 may include devices such as walkie-talkies, wireless headsets, cell phones, personal digital assistants (PDAs), laptops, and the like, as well as various combinations thereof. The wireless user devices 104 may include various other equipment, such as monitors (e.g., for monitoring breathing, pulse, and other characteristics; for monitoring temperature, precipitation, and other environmental characteristics; and the like), sensors (e.g., for detecting air-quality changes, presence of chemical or biological agents, radiation levels, and the like), and various other equipment.

As depicted in FIG. 1, a 911-NOW-based network is established at the emergency site 101 by deploying 911-NOW nodes 110 (illustratively, 911-NOW nodes $110_A$-$110_G$) to emergency site 101. The 911-NOW nodes 110 may be deployed using mobile platforms. The 911-NOW nodes 110 may be deployed using standalone mobile platforms. For example, 911-NOW nodes 110 may be placed in backpacks, suitcases, and like mobile cases which may be carried by individuals. The 911-NOW nodes 110 may be deployed using mobile vehicles, including land-based vehicles, sea-based vehicles, and/or air-based vehicles. For example, 911-NOW nodes may be placed (and/or mounted) on police cars, swat trucks, fire engines, ambulances, humvees, boats, helicopters, blimps, airplanes, unmanned drones, satellites, and the like, as well as various combinations thereof. The 911-NOW nodes 110 may be deployed using various other mobile platforms.

As depicted in FIG. 1, 911-NOW node $110_A$ is deployed using a fire engine, 911-NOW node $110_B$ is deployed using a fire engine, 911-NOW node $110_C$ is deployed using a fire engine, 911-NOW node $110_D$ is deployed as a standalone node, 911-NOW node $110_E$ is deployed using a blimp, 911-NOW node $110_F$ is deployed as a standalone node, and 911-NOW node $110_G$ is deployed using a fire engine. The inherent mobility of 911-NOW nodes 110 enables quick and flexible deployment of a wireless network as needed (e.g., when, where, and how the wireless network is needed), thereby providing scalable capacity and coverage on-demand as required by the emergency personnel. Since each 911-NOW node 110 supports RAN functions, CORE networking functions, and various service functions, deployment of even one 911-NOW node produces a fully-functional wireless network.

A 911-NOW node 110 may belong to otherwise be associated with an organization. As such, 911-NOW network 110 may include 911-NOW nodes 110 associated with one or more organizations. For example, organizations may include a police force of a town, a portion of a police force of a town, a fire company of a town, a portion of a fire company of a town, multiple fire companies of a town, a county sheriff's office, a federal emergency response organization, a federal emergency response team that is part of a federal emergency response organization, and the like, as well as various combinations thereof. In FIG. 1, for example, 911-NOW nodes $110_A$, $110_B$, and $110_C$ may belong to a first organization (e.g., a fire department), 911-NOW nodes $110_C$, $110_F$, and $110_G$ may belong to a second organization (e.g., a police department), 911-NOW node $110_D$ may belong to a third organization (e.g., a hazmat unit), and 911-NOW node $110_E$ may belong to a fourth organization (e.g., a federal emergency management unit). Although described with respect to specific examples, it will be appreciated that an organization may be defined in any suitable manner (e.g., using any suitable granularity, of any suitable size, and the like, as well as various combinations thereof).

As depicted in FIG. 1, the 911-NOW nodes 110 support wireless communications for wireless user devices 104 (denoted herein as wireless access communications). The wireless access communications include wireless communications between a 911-NOW node 110 and wireless user devices served by that 911-NOW node 110. A 911-NOW node 110 includes one or more wireless access interfaces supporting wireless communications for wireless user devices 104 using respective wireless access connections 111 established between wireless user devices 104 and 911-NOW nodes 110. The 911-NOW nodes 110 further support mobility of user devices 104 at emergency site 101 such that, as users 102 move around emergency site 101, communication sessions between wireless user devices 104 of those users 102 and 911-NOW nodes 110 are seamlessly transferred between 911-NOW nodes 110.

As depicted in FIG. 1, the 911-NOW nodes 110 support wireless communications between 911-NOW nodes 110 (denoted herein as wireless mesh communications). The wireless mesh communications include wireless communications between 911-NOW nodes, including information transported between wireless user devices 104, control information exchanged between 911-NOW nodes 110, and the like, as well as various combinations thereof. A 911-NOW node 110 includes one or more wireless mesh interfaces supporting wireless communications with one or more other 911-NOW nodes 110. The wireless mesh communications between 911-NOW nodes 110 are supported using wireless mesh connections 112 established between 911-NOW nodes 110.

As depicted in FIG. 1, the following pairs of 911-NOW nodes 110 communicate using respective wireless mesh connections 112: 911-NOW nodes $110_A$ and $110_B$, 911-NOW nodes $110_A$ and $110_C$, 911-NOW nodes $110_A$ and $110_D$, 911-NOW nodes $110_B$ and $110_C$, 911-NOW nodes $110_C$ and $110_D$, 911-NOW nodes $110_B$ and $110_E$, 911-NOW nodes $110_C$ and $110_F$, 911-NOW nodes $110_D$ and $110_G$, 911-NOW nodes $110_E$ and $110_F$, and 911-NOW nodes $110_F$ and $110_G$. As such, 911-NOW nodes 110 of FIG. 1 communicate to form a wireless mesh network. Although a specific wireless mesh configuration is depicted and described with respect to FIG. 1, 911-NOW nodes 110 may communicate to form various other wireless mesh configurations, and mesh configurations may be modified in real-time as conditions change.

As depicted in FIG. 1, the 911-NOW nodes 110 support wireless communications for one or more management devices 105 (denoted herein as wireless management communications). The wireless management communications include wireless communications between a 911-NOW node 110 and a management device(s) 105 served by that 911-NOW node 110. A 911-NOW node 110 includes one or more wireless management interfaces supporting wireless communications for management device(s) 105. The wireless management communications between management device 105 and 911-NOW node $110_D$ are supported using a wireless management connection 113 established between management device 105 and 911-NOW node 110$_D$.

The management device 105 is operable for configuring and controlling standalone 911-NOW network 100. For example, management device 105 may be used to configure and reconfigure one or more of the 911-NOW nodes 110, control access to the 911-NOW nodes, control functions and services supported by the 911-NOW nodes 110, upgrade 911-NOW nodes 110, perform element/network management functions for individual 911-NOW nodes or combinations of 911-NOW nodes (e.g., fault, performance, and like management functions) and the like, as well as various combinations thereof. The management device 105 may be implemented using existing devices (e.g., laptops, PDAs, and the like), or using a newly-designed device adapted to support such management functions. The management device 105 may connect to one or more 911-NOW nodes 110 directly and/or indirectly using wireline and/or wireless interfaces.

The 911-NOW nodes 110 support wireless communications using one or more wireless technologies. For wireless access communications, each 911-NOW node 110 may support one or more different wireless technologies, such as Global System for Mobile Communications (GSM), General Packet Radio Service (GPRS), Evolution—Data Optimized (1xEV-DO), Universal Mobile Telecommunications System (UMTS), High-Speed Downlink Packet Access (HSDPA), Worldwide Interoperability for Microwave Access (WiMAX), and the like. For wireless mesh communications, each 911-NOW node 110 may support Wireless Fidelity (WiFi) or WiMAX technology, microwave technologies, or any other wireless technology. For wireless management communications, each 911-NOW node 110 may support one or more such cellular technologies, and, further, may support WiFi technology, Bluetooth technology, or any other wireless technology.

The wireless communications supported by 911-NOW nodes 110 convey user information, control information, and the like, as well as various combinations thereof. For example, user information may include voice communications (e.g., voice calls, audio conferences, push-to-talk, and the like), data communications (e.g., text-based communications, high-speed data downloads/uploads, file transfers, and the like), video communications (e.g., video broadcasts, conferencing, and the like), multimedia communications, and the like, as well as various combinations thereof. The communications supported by 911-NOW nodes 110 may convey various combinations of content, e.g., audio, text, image, video, multimedia, and the like, as well as various combinations thereof. For example, control information may include network configuration information, network control information, management information and the like, as well as various combinations thereof. Thus, 911-NOW nodes 110 support wireless communication of any information.

Although a specific number of 911-NOW nodes 110 is depicted and described as being deployed to form a 911-NOW network, fewer or more 911-NOW nodes may be deployed to form a 911-NOW network supporting communications required to provide an effective emergency response. Similarly, although a specific configuration of 911-NOW nodes 110 is depicted and described as being deployed to form a 911-NOW network, 911-NOW nodes may be deployed in various other configurations (including different locations at one emergency site or across multiple emergency sites, different combinations of mesh connections between 911-NOW nodes, and the like, as well as various combinations thereof) to form a standalone 911-NOW network supporting RAN functions, CORE networking functions, and various services supporting multimedia communications to provide an effective emergency response.

As described herein, although one or more 911-NOW nodes 110 are capable of forming a fully-functional standalone mesh wireless network without relying on existing infrastructure (fixed or variable), where there is existing infrastructure (that was not damaged or destroyed), the standalone 911-NOW wireless network may leverage the existing network infrastructure to form an integrated 911-NOW wireless network capable of supporting various additional capabilities (e.g., supporting communications with one or more other standalone 911-NOW wireless networks, supporting communications with one or more remote emergency management headquarters, supporting communications with other resources, and the like, as well as various combinations thereof). An integrated 911-NOW wireless network including a mesh 911-NOW network in communication with existing network infrastructure is depicted and described herein with respect to FIG. 2.

Figure 2:
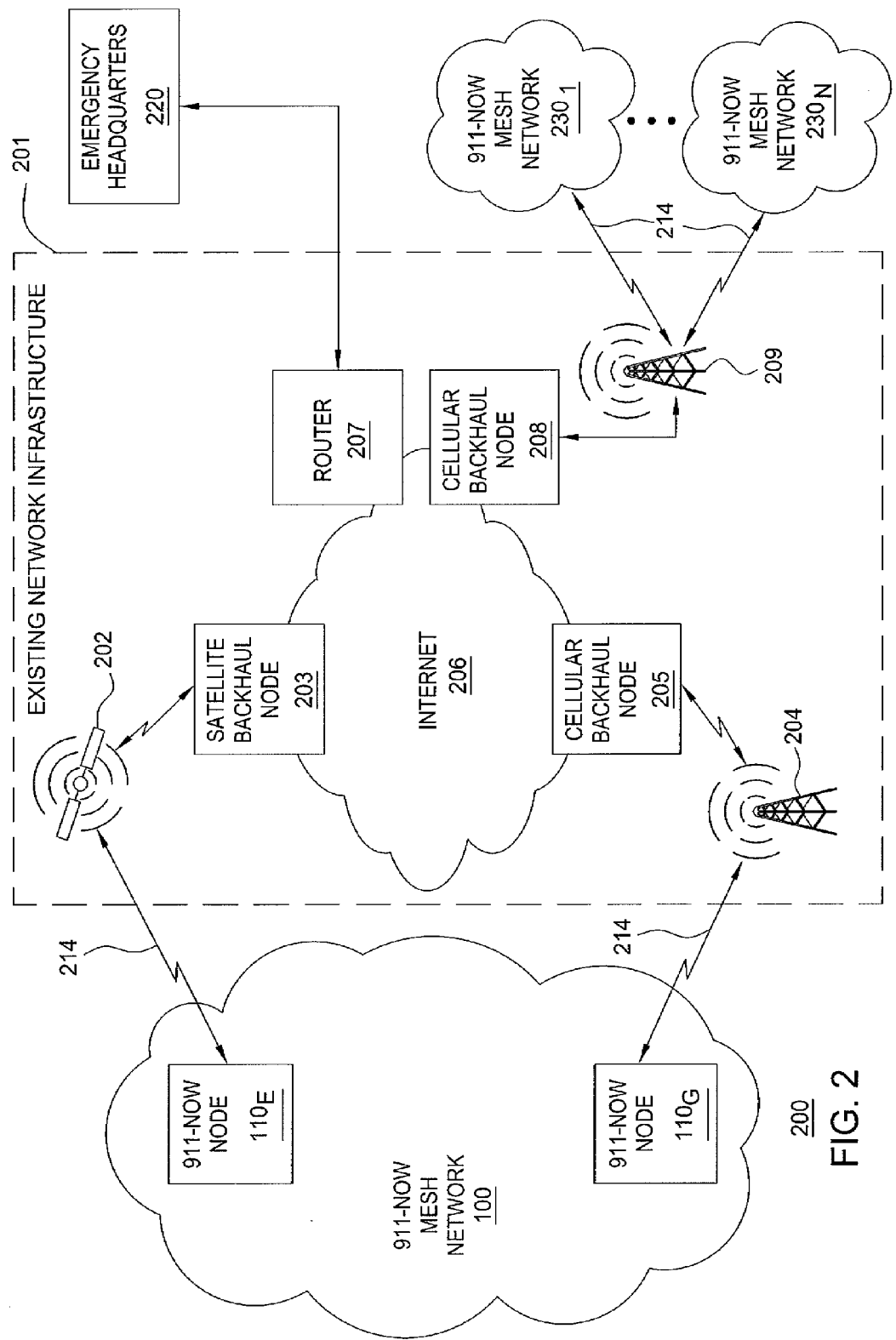
FIG. 2 depicts an integrated 911-NOW communication network architecture including a 911-NOW mesh network and an existing network infrastructure.

FIG. 2 depicts an integrated 911-NOW communication network architecture including a 911-NOW mesh network and an existing network infrastructure. Specifically, the integrated 911-NOW communication network architecture 200 includes 911-NOW mesh network 100 (depicted and described with respect to FIG. 1) and existing network infrastructure 201. The existing network infrastructure 201 may include any existing communications infrastructure adapted for supporting communications for 911-NOW mesh network 100 (e.g., including wireless communications capabilities, backhaul functions, networking functions, services, and the like, as well as various combinations thereof).

The existing network infrastructure 201 may include wireless access capabilities (e.g., radio access networks, satellite access networks, and the like, as well as various combinations thereof), backhaul capabilities (e.g., public and/or private, wireline and/or wireless, backhaul networks supporting mobility management functions, routing functions, and gateway functions, as well as various other related functions), core networking capabilities (e.g., AAA functions, DNS functions, DHCP functions, call/session control functions, and the like), services capabilities (e.g., application servers, media servers, and the like), and the like, as well as various combinations thereof. Since 911-NOW nodes 110 also supports such capabilities, in some embodiments at least a portion of these capabilities of existing network infrastructure 201 may only be relied upon when necessary.

As depicted in FIG. 2, the existing network infrastructure 201 supports wireless backhaul connections. Specifically, the existing network infrastructure 201 supports two wireless backhaul connections from 911-NOW mesh network 100. The existing network infrastructure 201 supports a first wireless backhaul connection 214 with 911-NOW node 110$_E$ using a satellite 202, where satellite 202 is in wireless backhaul communication with a satellite backhaul node 203 at the edge of Internet 206. The existing network infrastructure 201 supports a second wireless backhaul connection 214 with 911-NOW node 110$_G$ using a cellular base station 204, where cellular base station in 204 is in wireline backhaul communication with a cellular backhaul node 205 at the edge of Internet 206.

As depicted in FIG. 2, the existing network infrastructure 201 further supports other connections to other locations with which users 102 of emergency site 101 may communicate. The existing network infrastructure 201 includes a router 207 supporting communications for an emergency headquarters 220 (which may include, for example, emergency personnel and/or emergency systems). The existing network infrastructure 201 includes a cellular backhaul node 208 and an associated base station 209 supporting communications for one or more other 911-NOW mesh networks $230_1$-$230_N$ (i.e., one or more other standalone 911-NOW networks established at remote emergency sites).

The existing network infrastructure 201 supports communications for 911-NOW mesh network 100. The existing network infrastructure 201 may support communications between wireless user devices 104 of 911-NOW mesh network 100 (e.g., complementing wireless mesh communications between 911-NOW nodes 110 of the standalone 911-NOW network 100). The existing network infrastructure 201 may support communications between wireless user devices 104 of 911-NOW mesh network 100 and other emergency personnel and/or emergency systems. For example, existing network infrastructure 201 may support communications between wireless user devices 104 of 911-NOW mesh network 100 and an emergency headquarters 220, one or more other 911-NOW mesh networks 230 (e.g., at emergency sites remote from emergency site 101), and the like, as well as various combinations thereof.

As depicted in FIG. 2, in addition to supporting one or more wireless access interfaces, one or more wireless mesh interfaces, and one or more wireless management interfaces, 911-NOW nodes 110 support one or more wireless backhaul interfaces supporting communications between 911-NOW nodes 110 and existing network infrastructure (illustratively, existing network infrastructure 201). The wireless backhaul communications between 911-NOW nodes 110 and existing network infrastructure 201 are supported using wireless backhaul connections 214 established between 911-NOW nodes 110 and existing network infrastructure 201. The wireless backhaul connections 214 may be provided using one or more wireless technologies, such as GSM, GPRS, EV-DO, UMTS, HSDPA, WiFi, WiMAX, microwave, satellite, and the like, as well as various combinations thereof.

The mesh networking capabilities provided by 911-NOW nodes 110, in combination with backhaul networking capabilities provided by 911-NOW nodes 110 using wireless backhaul connections with the existing network infrastructure 201, enable communications between emergency personnel at one emergency site (e.g., between users connected to 911-NOW nodes 110 of a standalone 911-NOW mesh network), between emergency personnel at different emergency sites (e.g., between users connected to 911-NOW nodes 110 of different standalone wireless mesh networks), between emergency personnel at one or more emergency sites and emergency management personnel (e.g., users stationed at emergency headquarters 220), and the like, as well as various combinations thereof.

Thus, 911-NOW nodes 110 may each support four different types of wireless interfaces. The 911-NOW nodes 110 support one or more wireless access interfaces by which user devices 104 may access 911-NOW nodes 110. The 911-NOW nodes 110 support one or more wireless mesh interfaces by which 911-NOW nodes 110 communicate with other 911-NOW nodes 110. The 911-NOW nodes 110 support one or more wireless backhaul interfaces by which the 911-NOW nodes 110 communicate with existing network infrastructure. The 911-NOW nodes 110 support one or more wireless management interfaces by which network administrators may manage the 911-NOW-based wireless network. The functions of a 911-NOW node 110 may be better understood with respect to FIG. 3.

Figure 3:
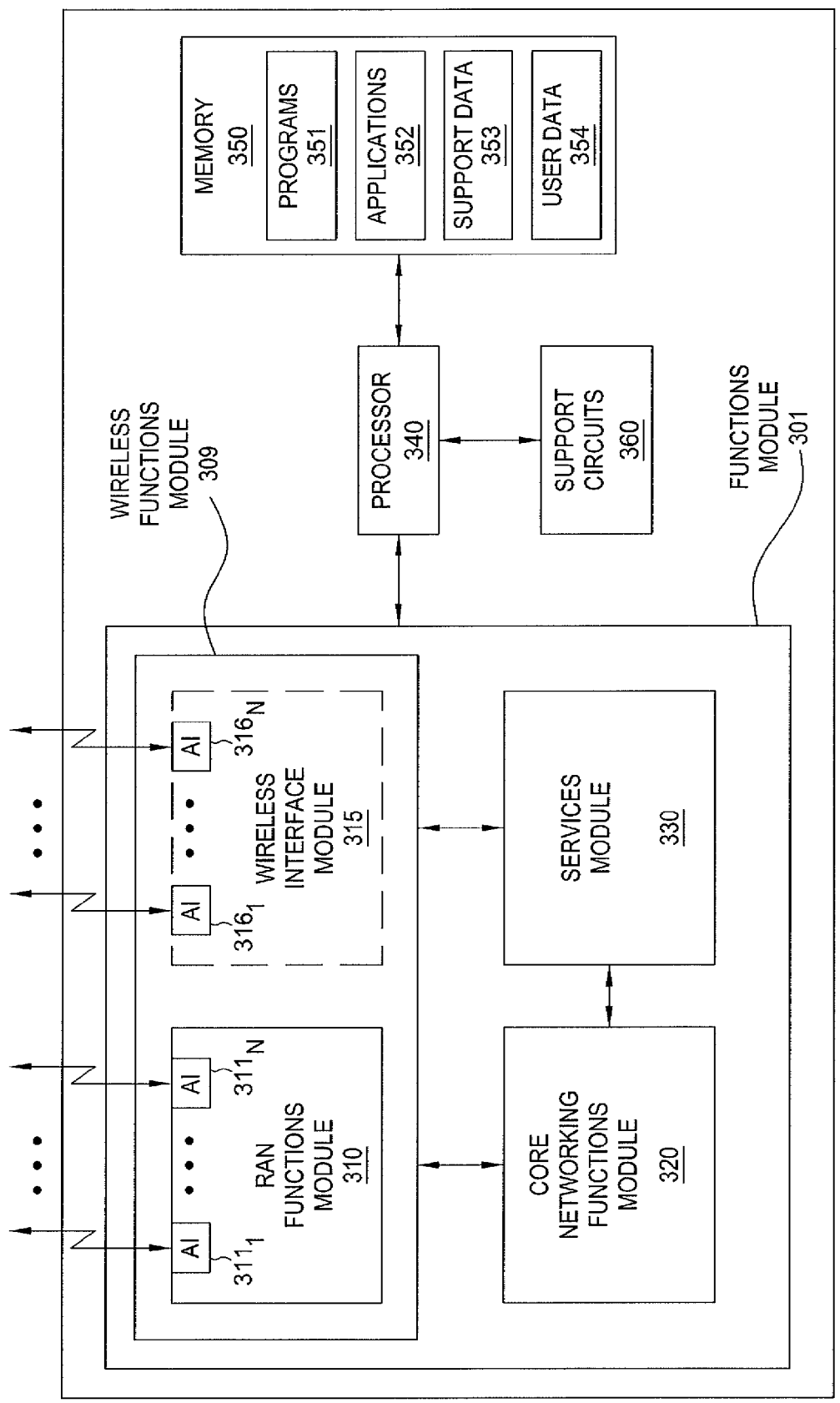
FIG. 3 depicts a high-level block diagram of one embodiment of a 911-NOW node.

FIG. 3 depicts a high-level block diagram of one embodiment of a 911-NOW node. Specifically, as depicted in FIG. 3, 911-NOW node 110 includes a functions module 301, a processor 340, a memory 350, and support circuit(s) 360 (as well as various other processors, modules, storage devices, support circuits, and the like required to support various functions of 911-NOW node 110). The functions module 301 cooperates with processor 340, memory 350, and support circuits 360 to provide various functions of 911-NOW node 110, as depicted and described herein).

The processor 340 controls the operation of 911-NOW node 110, including communications between functions module 301, memory 350, and support circuit(s) 360. The memory 350 includes programs 351, applications 352, support data 353 (e.g., user profiles, quality-of-service profiles, and the like, as well as various combinations thereof), and user data 354 (e.g., any information intended for communication to/from user devices associated with 911-NOW node 110). The memory 350 may store other types of information. The support circuit(s) 360 may include any circuits or modules adapted for supporting functions of 911-NOW node 110, such as power supplies, power amplifiers, transceivers, encoders, decoders, and the like, as well as various combinations thereof.

The functions module 301 includes a wireless functions module 309, a core (CORE) networking functions module 320, and a services module 330. The wireless functions module 309 includes a radio access network (RAN) functions module 310 and, optionally, a wireless interface module 315. The CORE networking functions module 320 provides CORE networking functions. The services module 330 provides one or more services. The RAN functions module 310 (and, when present, wireless interface module 315) communicate with both CORE networking functions module 320 and services module 330, and CORE networking functions module 320 and services module 330 communicate, to provide functions depicted and described herein.

The wireless functions module 309, CORE networking functions module 320, and services module 330 cooperate (in combination with processor 340, memory 350, and support circuits 360, and any other required modules, controllers, and the like, which are omitted for purposes of clarity) to provide a rapidly deployable wireless node which may form: (1) a single-node, standalone wireless network; (2) a multi-node, standalone wireless network (i.e., using wireless mesh connections between 911-NOW nodes); or (3) an integrated wireless network (i.e., using wireless backhaul connections between one or more 911-NOW nodes and existing network infrastructure and, optionally, using wireless mesh connections between 911-NOW nodes).

The RAN functions module 310 provides RAN functions. The RAN functions include supporting one or more wireless access interfaces for communications associated with wireless user devices. Specifically, RAN functions module 310 supports a plurality of air interfaces (AIs) $311_1$-$311_N$ (collectively, AIs 311). The AIs 311 provide wireless access interfaces supporting communications associated with wireless user devices. For example, AIs 311 may support functions typically provided by a base transceiver station (BTS).

The RAN functions module 310 provides control functions. The control functions may include any control functions typically performed by controllers in radio access networks. For example, the control functions may include functions such as admission control, power control, packet scheduling, load control, handover control, security functions, and the like, as well as various combinations thereof. For example, in one embodiment, the control functions may include functions typically performed by RAN network controllers (RNCs) or similar wireless network controllers.

The RAN functions module 310 provides network gateway functions. The network gateway functions may include any functions typically performed in order to bridge RAN and CORE networks, such as IP session management functions, mobility management functions, packet routing functions, and the like, as well as various combinations thereof. For example, where intended for use with CDMA2000-based wireless technology, the network gateway functions may include functions typically performed by a Packet Data Serving Node (PDSN). For example, where intended for use with GPRS-based and/or UMTS-based wireless technology, the network gateway functions may include functions typically performed by a combination of a GPRS Gateway Support Node (GGSN) and a Serving GPRS Support Node (SGSN).

In one embodiment, RAN functions module 310 may be implemented as a base station router (BSR). In one such embodiment, the BSR includes a base station (BS) or one or more modules providing BS functions, a radio network controller (RNC) or one or more modules providing RNC functions, and a network gateway (NG) or one or more modules providing NG functions. In such embodiments, RAN functions module 310 supports any functions typically supported by a base station router.

The wireless interface module 315 provides one or more wireless interfaces. The wireless interfaces provided by wireless interface module may include one or more of: (1) one or more wireless mesh interfaces supporting communications with other 911-NOW nodes; (2) one or more wireless backhaul interfaces supporting communications with existing network infrastructure; and/or (3) one or more wireless management interfaces supporting communications with one or more management devices. The wireless interface module 315 supports a plurality of air interfaces (AIs) $316_1$-$316_N$ (collectively, AIs 316), which provide wireless interfaces supporting communications associated with one or more of: one or more other 911-NOW nodes, existing network infrastructure, and one or more management devices.

In one embodiment, a 911-NOW node 110 is implemented without wireless interface module 315 (e.g., if the 911-NOW node 110 is not expected to require wireless mesh, backhaul, or management capabilities). In one embodiment, a 911-NOW node 110 includes a wireless interface module 315 supporting a subset of: one or more wireless mesh interfaces, one or more wireless backhaul interfaces, and one or more wireless management interfaces (i.e., the 911-NOW node is tailored depending on whether the 911-NOW node 110 will require wireless management, mesh, and/or backhaul capabilities). In one embodiment, a 911-NOW node 110 includes a wireless interface module 315 supporting each of: one or more wireless mesh interfaces, one or more wireless backhaul interfaces, and one or more wireless management interfaces (i.e., all types of wireless interfaces are available should the 911-NOW node 110 require such wireless capabilities).

The CORE networking functions module 320 provides networking functions typically available from the CORE network. For example, CORE networking functions module 320 may provide authentication, authorization, and accounting (AAA) functions, domain name system (DNS) functions, dynamic host configuration protocol (DHCP) functions, call/session control functions, and the like, as well as various combinations thereof. One skilled in the art knows which functions are typically available from the CORE network.

The services module 330 provides services. The services may include any services capable of being provided to wireless user devices. In one embodiment, for example, services module 330 may provide services typically provided by application servers, media servers, and the like, as well as various combinations thereof. For example, services may include one or more of voice services, voice conferencing services, data transfer services (e.g., high-speed data downloads/uploads, file transfers, sensor data transfers, and the like), video services, video conferencing services, multimedia services, multimedia conferencing services, push-to-talk services, instant messaging services, and the like, as well as various combinations thereof. One skilled in the art knows which services are typically available over RAN and CORE networks.

Although primarily depicted and described herein with respect to a specific configuration of a 911-NOW node including three modules providing wireless functions (including RAN functions and, optionally, additional wireless interfaces and associated interface functions), CORE networking functions, and services, respectively, 911-NOW nodes may be implemented using other configurations for providing wireless functions, CORE networking functions, and services. Similarly, although primarily depicted and described herein with respect to a specific configuration of a functions module providing specific wireless functions, CORE networking functions, and services, functions modules of 911-NOW nodes may be implemented using other configurations for providing wireless functions, CORE networking functions, and services.

Therefore, it is contemplated that at least a portion of the described functions may be distributed across the various functional modules in a different manner, may be provided using fewer functional modules, or may be provided using more functional modules. Furthermore, although primarily depicted and described with respect to specific wireless functions (including RAN functions and, optionally, one or more additional wireless interface functions), CORE networking functions, and services, it is contemplated that fewer or more wireless functions (including RAN functions, optionally, and one or more additional wireless interface functions), CORE networking functions, and/or services may be supported by a 911-NOW node. Thus, 911-NOW nodes are not intended to be limited by the example functional architectures depicted and described herein with respect to FIG. 3.

Figure 4:
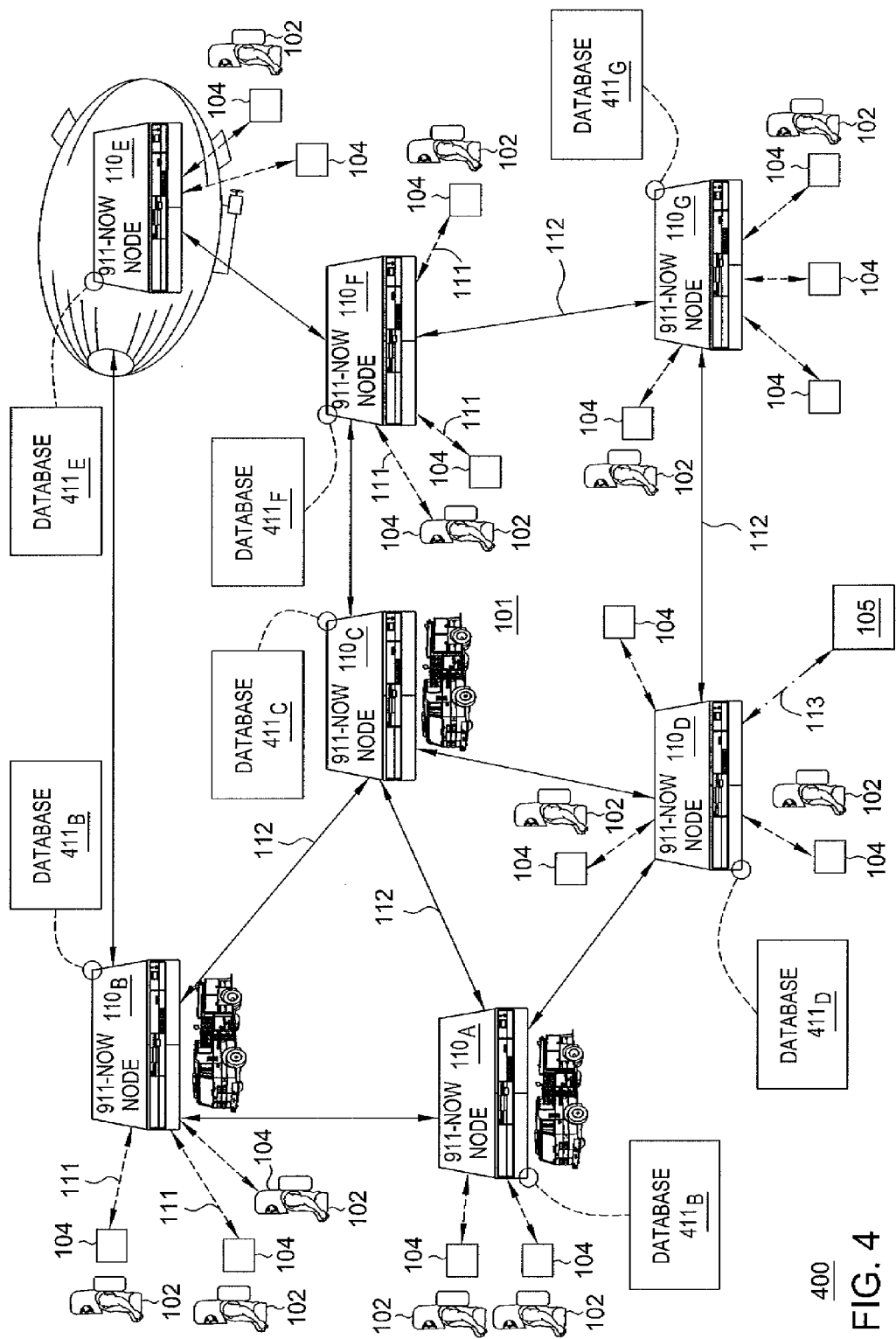
FIG. 4 depicts the 911-NOW communication network architecture of FIG. 1 in which 911-NOW nodes include respective databases.

FIG. 4 depicts the 911-NOW communication network architecture of FIG. 1 in which 911-NOW nodes include respective databases.

As depicted in FIG. 4, 911-NOW nodes $110_A$-$110_G$ maintain respective databases $411_A$-$411_G$ (collectively, databases 411).

The databases 411 may be maintained on the 911-NOW nodes 110 in any suitable manner. In one embodiment, for example, databases 411 may be stored in memories 350 of the 911-NOW nodes 110, respectively. The databases 411 may be stored in any other suitable manner.

The databases 411 may store information in any suitable manner, e.g., using any tables or combinations of tables which may be organized in any suitable manner.

The databases 411 of 911-NOW nodes 110 may store any information for use by the 911-NOW nodes 110 in operating within 911-NOW network 100.

The database 411 of a 911-NOW node 110 may store information that needs to be synchronized with databases 411 of other 911-NOW nodes 110 of 911-NOW network 100 and, optionally, information that may not need to be synchronized with databases 411 of other 911-NOW nodes 110 of 911-NOW network 100.

For example, the database 411 of a given 911-NOW node 110 may store database tables such as an end user database table storing information for end users authenticated to use the 911-NOW network 100, a mesh network connectivity database table storing information identifying neighbor 911-NOW nodes 110 with which the given 911-NOW node has direct wireless connectivity, and the like, as well as various combinations thereof.

A distributed database synchronization capability is depicted and described herein. The distributed database synchronization capability enables synchronization of databases 411, or at least portions of databases 411, maintained on 911-NOW nodes 110 of 911-NOW network 100.

As described herein, the distributed database synchronization capability depicted and described herein may be implemented in various other types of rapidly deployable mobile networks and, thus, the 911-NOW nodes depicted and described herein may be referred to more generally as mobile network nodes (MNNs) for purposes of describing various embodiments of the distributed database synchronization capability.

Similarly, as described herein, the distributed database synchronization capability depicted and described herein may be implemented in various other types of networks and, thus, the 911-NOW nodes depicted and described herein may be referred to more generally as nodes for purposes of describing various embodiments of the distributed database synchronization capability. Additionally, other types of networks may include databases storing other types of information. Accordingly, the distributed database synchronization capability depicted and described herein is applicable for database synchronization of databases storing any type of information in any suitable manner.

The distributed database synchronization capability may be implemented in any suitable manner.

In one embodiment, the distributed database synchronization capability includes a timer-based database synchronization procedure for use in synchronizing database tables of MNNs. In one embodiment, the distributed database synchronization capability includes a token-based database synchronization procedure for use in synchronizing database tables of MNNs. A description of various embodiments of such capabilities follows.

In one embodiment, a timer-based database synchronization capability is provided.

In one embodiment, the timer-based database synchronization capability enables each node to maintain database synchronization with other nodes by (1) discovering its neighbor nodes and (2) synchronizing its database with databases of the discovered neighbor nodes.

In one embodiment, a timer-based database synchronization capability includes, for each node of the network, a Neighbor Node Discovery Procedure and a Database Synchronization Procedure.

Figure 5:
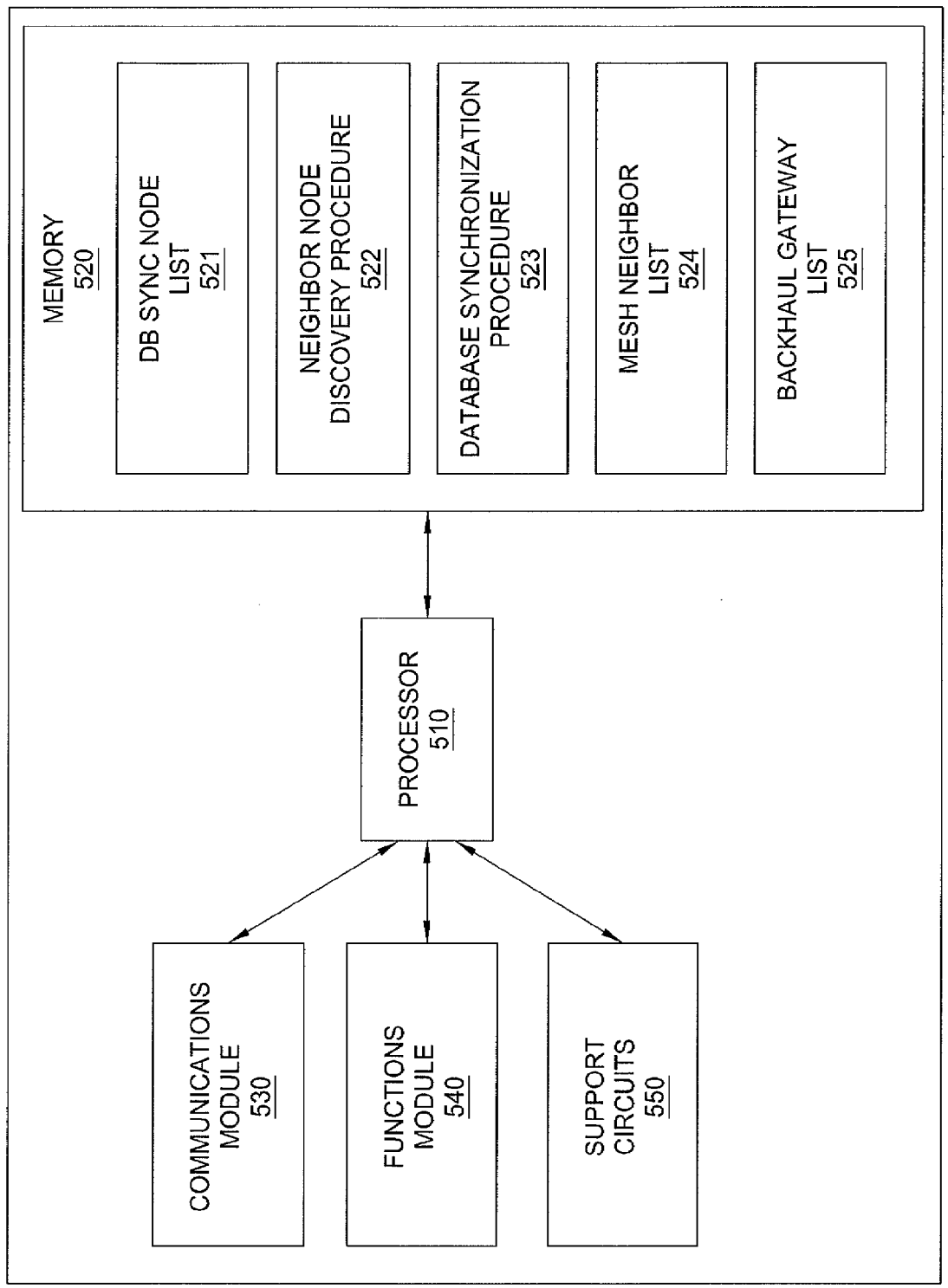
FIG. 5 depicts an exemplary node configured for providing a timer-based database synchronization capability.

FIG. 5 depicts an exemplary node configured for providing a timer-based database synchronization capability.

As depicted in FIG. 5, the node 500 includes a processor 510, a memory 520, a communications module 530, a functions module 540, and support circuits 550. The memory 520, communications module 530, functions module 540, and support circuits 550 each communicate with processor 510. Although omitted for purposes of clarity, it will be appreciated that any of the modules of node 500 may communicate with any other modules of node 500 in any suitable manner for providing functions described herein.

The configuration and operation of node 500 may be in accordance with any suitable network element which may participate in the database synchronization capability depicted and described herein. In one embodiment, the configuration and operation of node 500 is similar to that of the exemplary 911-NOW node 110 of FIG. 1 (e.g., with processor 510 being similar to processor 340, memory 520 being similar to memory 350, communications module 530 and functions module 540 being similar to functions module 301, and support circuits 550 being similar to support circuits 360).

The configuration and operation of node 500 may be adapted for use with the timer-based database synchronization capability in any suitable manner. In one embodiment, as depicted in FIG. 5, memory 520 stores information configured for use by node 500 in providing the timer-based database synchronization capability. In one embodiment, for example, memory 520 stores a Database Synchronization Node List (DB Sync Node List) 521, a Neighbor Node Discovery Procedure 522, a Database Synchronization Procedure 523, a Mesh Neighbor List 524 (which also may be denoted as a Mesh_Neighbor_List), and a Backhaul Gateway List 525. It will be appreciated that memory 520 may store any other suitable information (e.g., such as programs 351, applications 352, support data 353, and/or user data 354 as depicted and described with respect to FIG. 3, and/or any other suitable information).

The DB Sync Node List 521 for a given node provides a list of neighbor nodes of the given node.

The Neighbor Node Discovery Procedure 522 for a given node is used by the given node to discover its neighbor nodes in order to maintain the DB Sync Node List 521 for the given node. Various embodiments of the Neighbor Node Discovery Procedure 522 are depicted and described with respect to FIGS. 6-11.

The Database Synchronization Procedure 523 for a given node is used to synchronize the database of the given node with databases of other nodes. The Database Synchronization Procedure 523 utilizes the DB Sync Node List 521 maintained by the Neighbor Node Discovery Procedure 522. Various embodiments of the Database Synchronization Procedure 523 are depicted and described with respect to FIG. 12-14.

In one embodiment, each node 110 initiates the Neighbor Node Discovery Procedure 522 and the Database Synchronization Procedure 523 autonomously and periodically.

In one embodiment, each node 110 maintains a periodic internal database synchronization timer (which also may be referred to herein as a periodic timer, an internal timer, a periodic internal timer or using other similar terms) that is adapted for use by the node 110 to determine when to initiate a database synchronization procedure with its neighbor node(s).

In one embodiment, database synchronization is performed on a per-organization basis, such that each node 110 maintains database synchronization only with other nodes that belong to the same organization.

In one embodiment, database synchronization may be performed both (1) intra-cluster and (2) inter-cluster where clusters may be connected via any suitable backhaul connections.

In one embodiment, timer-based database synchronization is performed within a standalone mesh cluster.

Figure 6A:
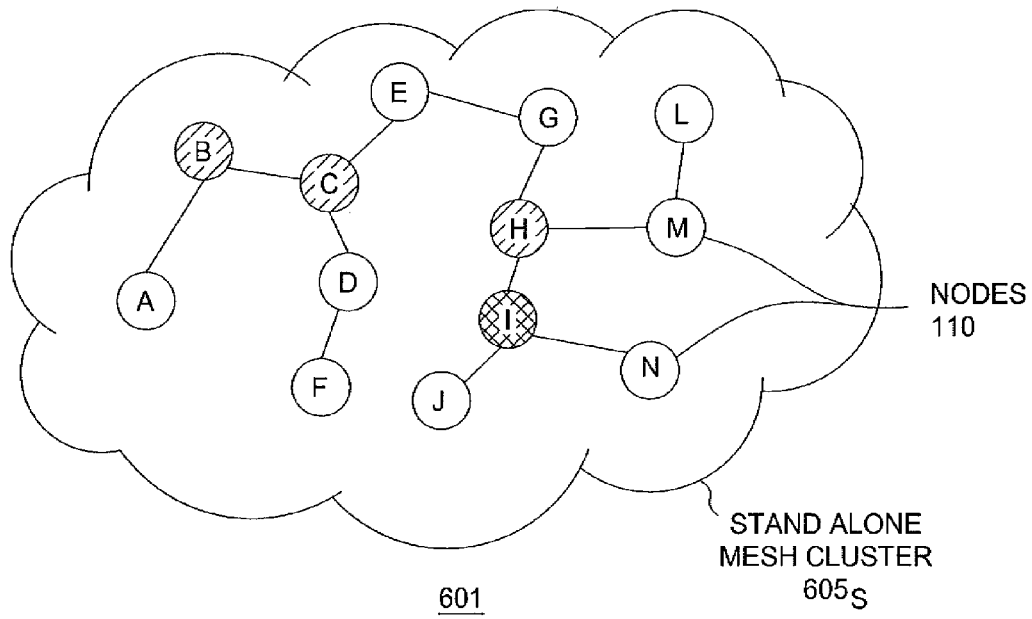
FIG. 6A depicts an exemplary network illustrating an exemplary standalone mesh cluster within which timer-based database synchronization may be performed.

FIG. 6A depicts an exemplary network illustrating an exemplary standalone mesh cluster within which timer-based database synchronization may be performed.

As depicted in FIG. 6A, the exemplary network 601 includes an exemplary standalone mesh cluster $605_S$. The standalone mesh cluster $605_S$ includes thirteen nodes 110, which are labeled as nodes A, B, C, D, E, F, G, H, I, J, L, M, N. The nodes A, D, E, F, G, J, L, M, and N belong to a first organization. The nodes B, C, and H belong to a second organization. The node I belongs to a third organization. In one embodiment, all nodes 110 of exemplary standalone mesh cluster $605_S$ synchronize their respective databases 411 amongst themselves. In one embodiment, the nodes 110 of the first organization synchronize their respective databases 411 amongst themselves, and the nodes 110 of the second organization synchronize their respective databases 411 amongst themselves. In some embodiments, within a standalone mesh cluster such as exemplary standalone mesh cluster $605_S$, each given node 110 of the standalone mesh cluster performs (1) the Neighbor Node Discovery Procedure 522 in order to identify neighbor nodes 110 within the standalone mesh cluster that belong to the same organization as the given node 110 and (2) the Database Synchronization Procedure 523 for enabling the given node 110 to synchronize its database 411 with databases 411 of any neighbor nodes 110 belonging to the same organization.

In one embodiment, timer-based database synchronization is performed within a multi-cluster network, e.g., across two or more mesh clusters connected via a backhaul connection.

Figure 6B:
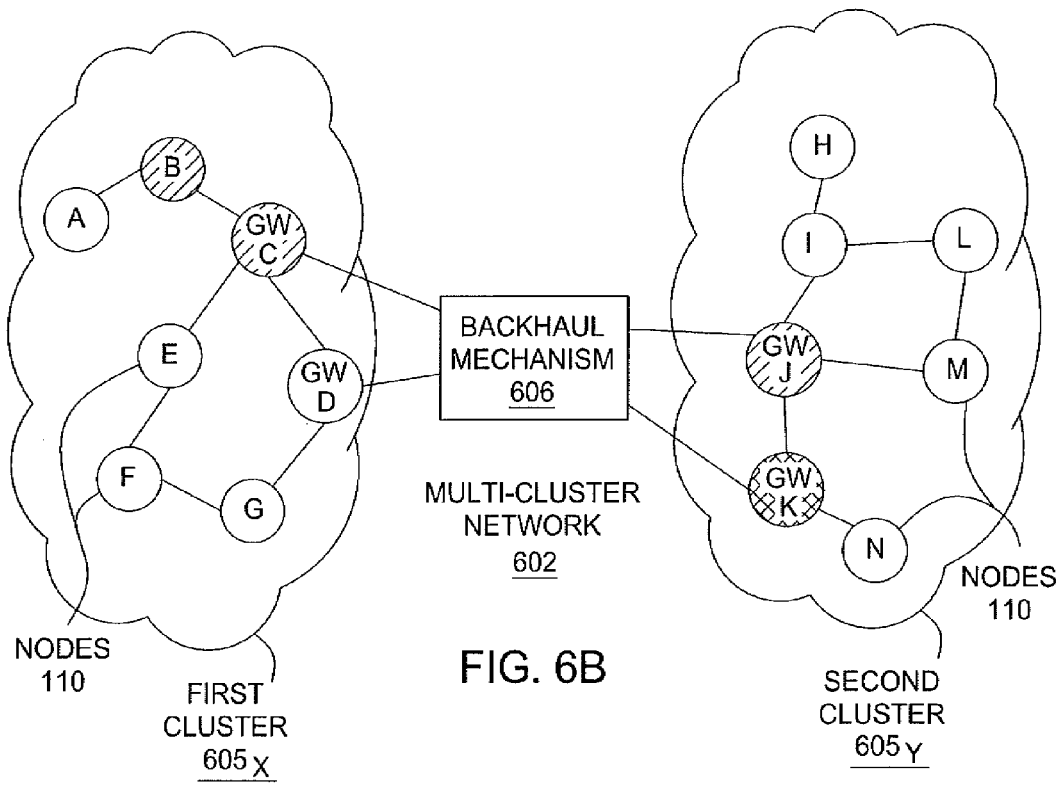
FIG. 6B depicts an exemplary network illustrating an exemplary multi-cluster network within which timer-based database synchronization may be performed.

FIG. 6B depicts an exemplary multi-cluster network within which timer-based database synchronization may be performed.

As depicted in FIG. 6B, the exemplary multi-cluster network 602 includes a first cluster $605_X$ and a second cluster $605_Y$ connected via a backhaul mechanism 606. As depicted in FIG. 6B, the exemplary multi-cluster network 602 includes fourteen nodes 110, which are labeled as nodes A, B, C, D, E, F, G, H, I, J, K, L, M, N, which are organized in clusters. The first cluster $605_X$ includes seven nodes (A, B, C, D, E, F, G), where nodes C and D function as gateways from first cluster $605_X$ to backhaul mechanism 606. The second cluster $605_Y$ includes seven nodes (H, I, J, K, L, M, N), where nodes J and K function as gateways from second cluster $605_Y$ to backhaul mechanism 606. The nodes A, D, E, F, G, H, I, L, M, and N belong to a first organization. The nodes B, C, and J belong to a second organization. The node K belongs to a third organization. The backhaul mechanism 606 may be any suitable mechanism via which nodes of clusters may communicate (e.g., via the Internet, via one or more satellite connections, and the like, as well as various combinations thereof). In one embodiment, all nodes 110 of exemplary multi-cluster network 602 synchronize their respective databases 411 amongst themselves. In one embodiment, nodes 110 of the first organization synchronize their respective databases 411 amongst themselves by performing intra-cluster and inter-cluster database synchronization, and the nodes 110 of the second organization synchronize their respective databases amongst themselves by performing intra-cluster and inter-cluster database synchronization. In some embodiments, in which mesh clusters are connected via backhaul, in addition to the intra-cluster synchronization, nodes 110 of a given organization also synchronize across clusters via the backhaul. In at least some such embodiments, since bandwidth availability on the backhaul mechanism 606 may be limited, inter-cluster synchronization of nodes 110 of an organization is performed by selecting, within each cluster 605, a node 110 to represent the cluster 605 for purposes of cross-cluster synchronization, such that only one node 110 of the organization with the first cluster $605_X$ communicates with only one node of the organization within the second cluster $605_Y$.

These and various other embodiments of the timer-based database synchronization capability may be better understood by way of reference to FIGS. 7-15.

For purposes of clarity, embodiments of the Neighbor Node Discovery Procedure 522 are described, and then embodiments of the Database Synchronization Procedure 523 are described.

As described herein, a given node 110 maintains a DB Sync Node List 521 that includes the neighbor nodes 110 with which the given node 110 synchronizes its database during the Database Synchronization Procedure 523.

The DB Sync Node List 521 on a node 110 is populated by the node 110 using the Neighbor Node Discovery Procedure 522 and used by the node 110 for executing the Database Synchronization Procedure 523.

The Neighbor Node Discovery Procedure 523 may be executed by a node 110 at any suitable time. The Neighbor Node Discovery Procedure 522 may be run independently from the Database Synchronization Procedure 523 and/or prior to the Database Synchronization Procedure 523. In one embodiment, for example, each node 110 discovers its neighbors periodically and, thus, updates its DB Sync Node List 521 periodically. This may be controlled in any suitable manner, e.g., such as by using a periodic timer (which may be referred to herein as the DBEQ_SYNC_PROBE_TIMER timer).

The DB Sync Node List 521 of a given node 110 may include any suitable numbers and types of target nodes 110.

In one embodiment, the DB Sync Node List 521 of a given node includes target nodes that belong to the same organization as the given node 110 and which are direct neighbors of the given node 110 and indirect neighbors of the given node 110.

In one embodiment, two nodes 110 are deemed to be direct neighbors of each other when the two nodes 110 belong to the same organization and each node 110 is in the Mesh Neighbor List 524 and the Backhaul Gateway List 525 of the other node 110. The Mesh Neighbor List 524 of a node 110 may be populated in any suitable manner (e.g., by a Mesh Application running on the node 110, where the Mesh Application is configured for managing mesh connections from the node 110 to other one-hop neighbors of the node 110). The Backhaul Gateway List 525 of a node 110 may be populated in any suitable manner (e.g., by a Backhaul Application running on the node 110 where the node 110 has been assigned a role of operating as a Backhaul Gateway for its cluster).

In one embodiment, two nodes 110 are deemed to be indirect neighbors of each other when the two nodes 110 are reachable via one or more other nodes 110 of one or more different organizations.

The DB Sync Node Lists 521 of the nodes 110 may utilize any suitable data structure. In one embodiment, for example, the DB Sync Node Lists 521 of the nodes 110 may be formatted using the following data structure:

TABLE 1

| DB Sync Target IP | Sync Timestamp | Discover Timestamp |
| --- | --- | --- |

In one embodiment, the DB Sync Node List 521 of a node 110 is periodically checked for stale entries, and stale entries are automatically deleted from the DB Sync Node List 521. In one such embodiment, an entry of the DB Sync Node List 521 is determined to be stale when the Discover Timestamp of the entry is older than a threshold. The threshold may be any suitable length of time. In one embodiment, for example, the threshold may be twice the value of the DBEQ_SYNC_PROBE_TIMER.

The population of the DB Sync Node Lists 521 of nodes 110 of a network may be better understood by way of examples associated with FIGS. 6A (mesh cluster without backhaul) and 6B (mesh clusters connected via backhaul).

In FIG. 6A, for example, each of the nodes 110 discovers its direct and indirect neighbor nodes 110 using its Neighbor Node Discovery Procedure 522, and maintains the discovered neighbor nodes 110 in its DB Sync Node List 521. In this example: (1) node D has a direct neighbor node F, and indirect neighbor nodes A and E; (2) node H has no direct neighbor nodes, but has an indirect neighbor node C; and (3) node M has a direct neighbor node L, and indirect neighbor nodes G, J, and N. Other relationships between nodes 110 will be apparent from FIG. 6A and the description provided herein. The Neighbor Node Discovery Procedure 522 used in such a network may include a process for neighbor node discovery within a mesh cluster.

In FIG. 6B, for example, each of the nodes 110 discovers its direct and indirect neighbor nodes 110 using its Neighbor Node Discovery Procedure 522, and maintains the discovered neighbor nodes 110 in its DB Sync Node List 521. As described herein, for two mesh clusters 605 connected via backhaul, only one node 110 within a first one of the mesh clusters 605 is chosen to synchronize its database 411 with only one node 110 of the same organization within a second one of the mesh clusters 605. Thus, for example, if node E and node M are chosen for their clusters $605_X$ and $605_Y$, respectively, node A will have nodes E, D, and M in its DB Sync Node List 521. The Neighbor Node Discovery Procedure 522 used in such a network may include processes for neighbor node discovery within a mesh cluster (i.e., intra-cluster discovery) and neighbor node discovery across mesh clusters connected via backhaul (i.e., inter-mesh discovery).

In one embodiment, an Intra-Mesh Neighbor Node Discovery process is provided for enabling a node 110 within a mesh cluster 605 to discover neighbor nodes 110 within the mesh cluster 605.

A node 110 executing the Intra-Mesh Neighbor Node Discovery process (denoted as executing node 110) reads the Mesh Neighbor List 524 from its memory 520. The Mesh Neighbor List 524 provides information on each of the nodes 110 having a direct wireless connection to the executing node 110, which may include nodes 110 belonging to the same organization as the executing node 110 and/or nodes 110 belonging to a different organization(s) than the executing node 110. The information of the Mesh Neighbor List 524 may include any information suitable for use by the executing node 110 in updating the DB Sync Node List 521. For example, the information of the Mesh Neighbor List 524 may include the IP addresses and organization names/identifiers of each of the nodes 110 having a direct wireless connection to the executing node 110.

The executing node 110 identifies the direct neighbor nodes 110 of the executing node 110 using its Mesh Neighbor List 524. The executing node 110 identifies the nodes 110 of the Mesh Neighbor List 524 that belong to the same organization as the executing node 110, enters those nodes 110 within the DB Sync Node List 521, and updates the Discovery Timestamp of each entered node 110 with the current time. These nodes 110 are direct neighbors of the executing node 110.

The executing node 110 identifies the indirect neighbor nodes 110 of the executing node 110 using its Mesh Neighbor List 524 and interaction with nodes 110 of the cluster 605, a description of which follows.

The executing node 110 identifies the nodes of the Mesh Neighbor List 524 that belong to different organizations than the executing node 110. The executing node 110 sends, to each of the identified nodes 110 belonging to a different organization, a database synchronization probe message.

The database synchronization probe message may include any suitable information. In one embodiment, for example, the database synchronization probe message includes an IP address of the originating node 110 (e.g., denoted as OriginatingNodeIP), an organization name of the originating node 110 (e.g., denoted as OriginatingNodeOrgName), a hop counter (e.g., denoted as Hopcounter), a backhaul indicator (e.g., denoted as BackhaulIndicator), and an IP address of a Backhaul Gateway (e.g., denoted as BackhaulGatewayIP).

The database synchronization probe message may be implemented in any suitable manner. In one embodiment, for example, the database synchronization probe message is a UDP message.

The database synchronization probe message is provided from the executing node 110 to one or more receiving nodes 110, and each receiving node 110 performs processing upon receiving the database synchronization probe message. The database synchronization probe message also may be provided from a receiving node 110 to one or more other receiving nodes 110, and each of the other receiving nodes 110 performs processing upon receiving the database synchronization probe message. Accordingly, a node 110 sending a database synchronization probe message may be referred to more generally as an originating node 110.

In one embodiment, the processing performed by a receiving node 110 upon receiving the database synchronization probe message includes:

(1) The receiving node 110 determines if the IP address of the receiving node 110 and the IP address of the originating node 110 (e.g., OriginatingNodeIP) are the same. If yes, the database synchronization probe message is discarded. The receiving node 110 also determines whether the HopCounter exceeds a maximum hop count threshold (which may be any suitable value, e.g., 2, 3 or any other value). If the HopCounter exceeds the maximum hop count threshold, the database synchronization probe message is discarded.

(2) The receiving node 110 determines if the organization to which the receiving node 110 belongs and the organization of the originating node 110 (e.g., OriginatingNodeOrgName) are the same.

(a) If they are the same, receiving node 110 replies to originating node 110 and does not forward the database synchronization probe message to any other nodes 110. The receiving node 110 replies to the originating node 110 with a database synchronization probe response message (denoted herein as a DBEQ_SYNC_PROBE_RESP message). The database synchronization probe response message includes the IP address of the receiving node 110 as the originating address and the IP address of the originating node 110 as the destination address. The database synchronization probe response message may include any suitable information. In one embodiment, for example, the database synchronization probe response message includes an IP address of the originating node 110 (e.g., denoted as OriginatingNodeIP, and copied from the DBEQ_SYNC_PROBE message), an organization name of the originating node 110 (e.g., denoted as OriginatingNodeOrgName, and copied from the DBEQ_SYNC_PROBE message), and an IP address of the responding node 110 (denoted as RespNodeIP). The database synchronization probe response message may be implemented in any suitable manner. In one embodiment, for example, the database synchronization probe response message is a UDP message.

(b) If they are different, the receiving node 110 forwards the database synchronization probe message to each of the nodes 110 in the Mesh Neighbor List 524 of the receiving node. In this case, each node 110 receiving the forwarded database synchronization probe message repeats this process described as being performed by a receiving node upon receiving a database synchronization probe message.

The database synchronization probe message is provided to one or more receiving nodes 110, and each receiving node 110 performs processing in response to the database synchronization probe message. The processing may include responding, to the node 110 from which the database synchronization probe message originates, with a database synchronization probe response message. A node 110, upon receiving each database synchronization probe response message, determines if the source IP address of the database synchronization probe response message exists in its DB Sync Node List 521. If it does not exist, a new entry is created in the DB Sync Node List 521 for the node 110 from which the database synchronization probe response message is received (e.g., the RespNodeIP is recorded in the DB Sync Target IP field and the time of discovery (e.g., the current time) is recorded in the Discover Timestamp field). If it does exist, the existing entry, for the node 110 from which the database synchronization probe response message is received, is updated (e.g., the Discover Timestamp field is updated to include the current time). The nodes 110 for which entries are created and updated within the DB Sync Node List 521, i.e., the nodes 110 discovered via the PROBE and PROBE_RESP messages, are indirect neighbor nodes of the executing node 110.

Figure 7:
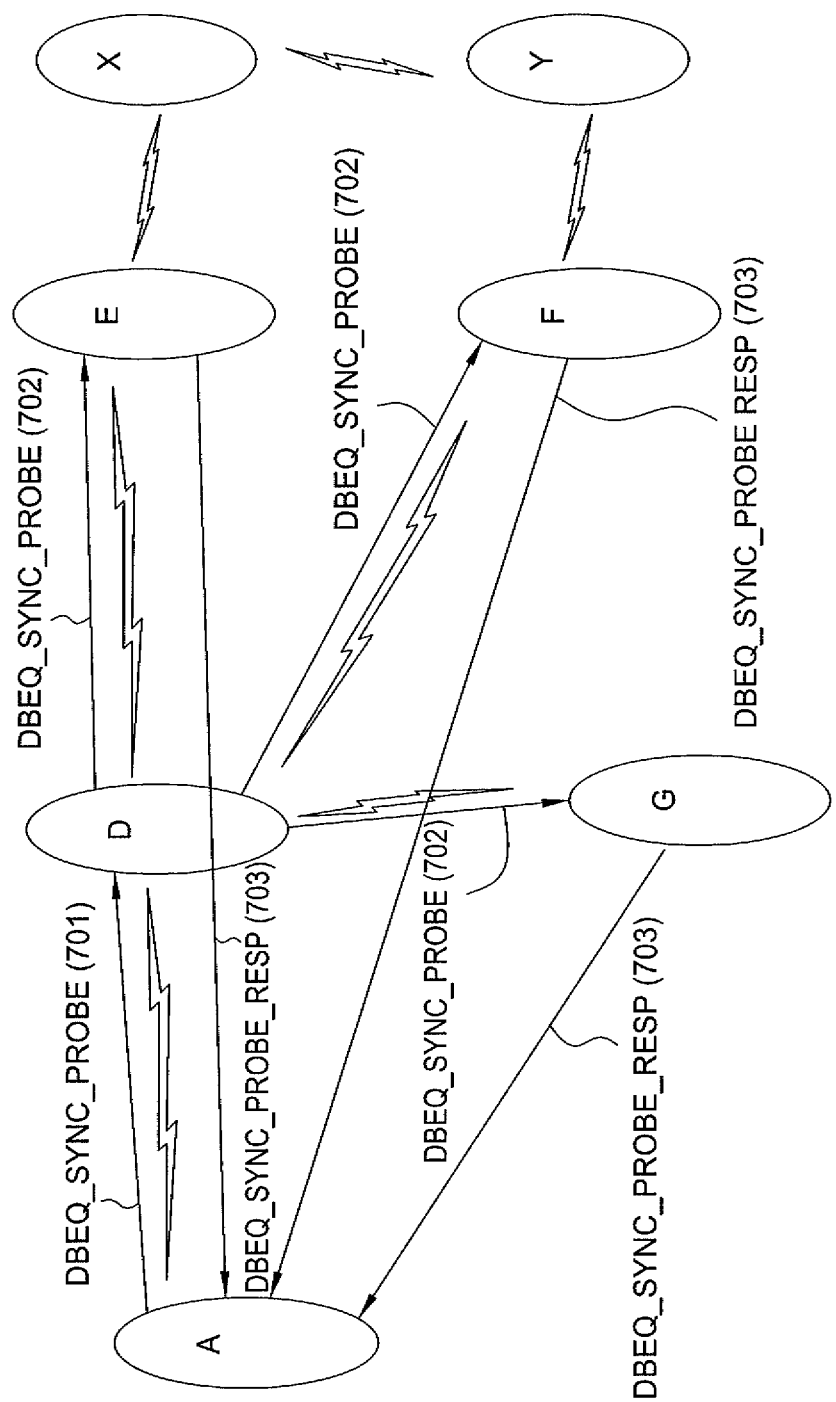
FIG. 7 depicts messages exchanged between nodes during neighbor node discovery, for intra-mesh discovery of indirect neighbors, in timer-based database synchronization.

FIG. 7 depicts messages exchanged between nodes during neighbor node discovery, for intra-mesh discovery of indirect neighbors, in timer-based database synchronization.

As depicted in FIG. 7, the mesh cluster includes seven nodes 110 (denoted as nodes A, D, E, F, G, X, and Y).

At step 701, node A initiates a DBEQ_SYNC_PROBE message to node D, which belongs to a different organization than node A.

At step 702, node D forwards the DBEQ_SYNC_PROBE message to nodes E, F, and G.

At step 703, node E, F, and G each reply to node A with respective DBEQ_SYNC_PROBE_RESP messages.

As depicted in FIG. 7, after execution of the Neighbor Node Discovery Procedure 522 by node A is complete, the DB Sync Node List 521 of node A includes entries for nodes E, F, and G, but not for nodes X and Y since nodes X and Y are neither direct nor indirect neighbor nodes of node A.

In one embodiment, an Inter-Mesh Neighbor Node Discovery process is provided for enabling nodes 110 within a mesh cluster 605 to discover neighbor nodes 110 within one or more other mesh clusters 605.

As described herein, when mesh clusters 605 are connected via a backhaul mechanism 606, nodes 110 of the same organization within the clusters 605 synchronize their respective databases 411 across the backhaul mechanism 606.

In one embodiment, in order to reduce the bandwidth used in order to perform neighbor discovery, for each mesh cluster 605, only one node 110 of a given organization is elected to participate in neighbor discovery for that given organization within that mesh cluster 605.

Figure 8:
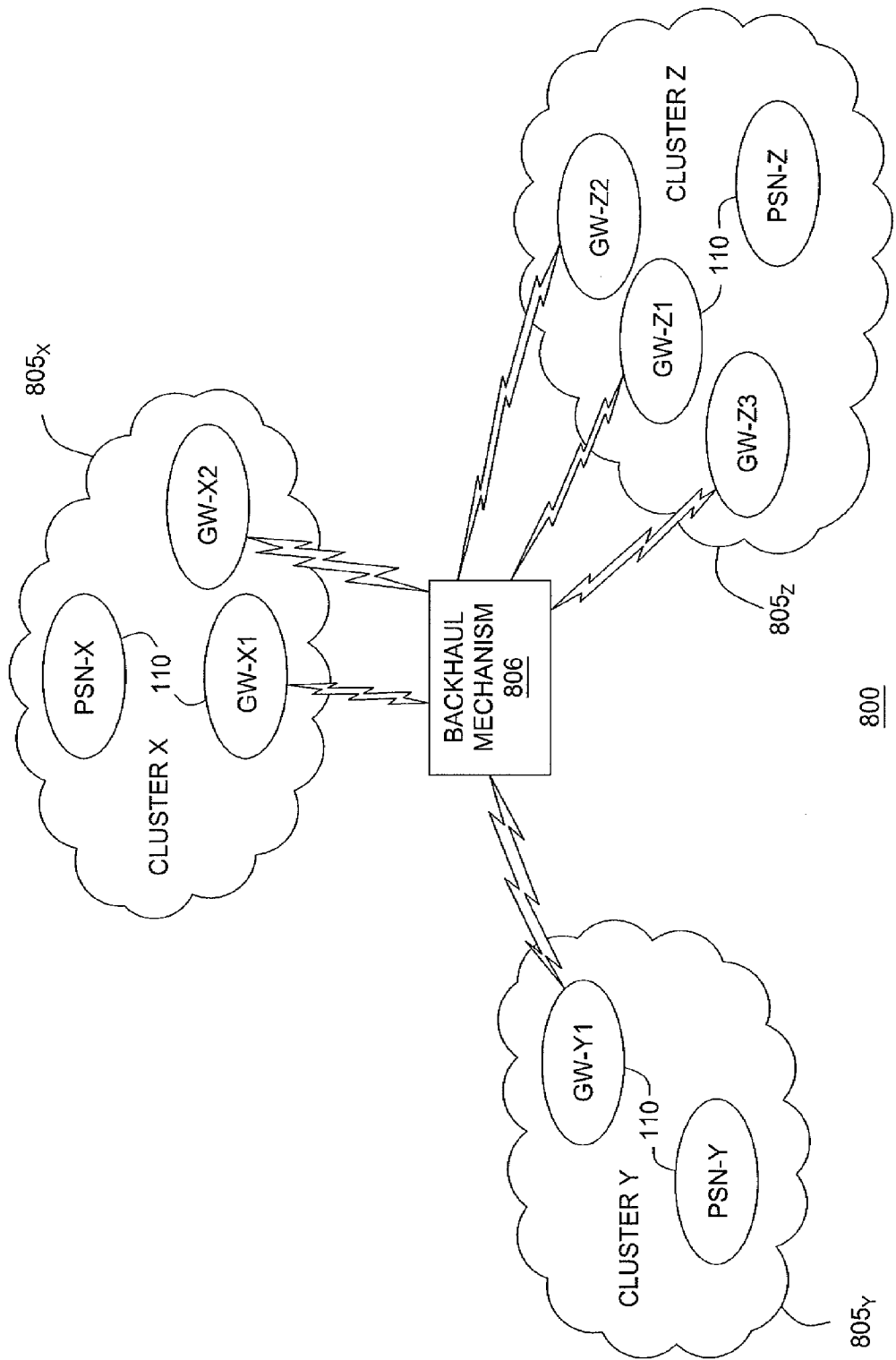
FIG. 8 depicts an exemplary network including three mesh clusters connected via satellite backhaul.

FIG. 8 depicts an exemplary network including three mesh clusters connected via satellite backhaul.

As depicted in FIG. 8, exemplary network 800 includes three mesh clusters as follows: cluster $805_X$ (cluster X), cluster $805_Y$ (cluster Y), and cluster $805_Z$ (cluster Z), which may be referred to collectively as clusters 805. The clusters 805 are connected via a backhaul mechanism 806.

As depicted in FIG. 8, each of the clusters 805 includes a plurality of nodes 110 operating in various roles.

The clusters $805_X$, $805_Y$, and $805_Z$ include respective Primary Serving Nodes (PSNs). Namely, cluster $805_X$ includes PSN-X, cluster $805_Y$ includes PSN-Y, and cluster $805_Z$ includes PSN-Z.

The clusters $805_X$, $805_Y$, and $805_Z$ each include one or more Gateway Nodes (GWs). Namely, cluster $805_X$ includes two GWs (GW-X1 and GW-X2), cluster $805_Y$ includes one GW (GW-Y1), and cluster $805_Z$ includes three GWs (GW-Z1, GW-Z2, and GW-Z3). The use of multiple GWs within a mesh cluster 605 may be for redundancy and load sharing purposes.

Although omitted for purposes of clarity, it will be appreciated that each of the clusters 805 may include one or more other nodes 110.

In one embodiment (e.g., in the exemplary network 800), every node 110 within a given cluster 805 is able to communicate with each gateway node (GW) within the given cluster 805, either directly or indirectly via one or more other nodes 110 of the given cluster 805.

In one embodiment (e.g., in the exemplary network 800), each GW maintains the following lists: (a) a list of mesh clusters 805 (excluding the mesh cluster 805 to which it belongs) with which the GW is able to communicate via the backhaul mechanism 806 and (b) a list of the GWs within those clusters 805 (i.e., the clusters 805 in the list of mesh clusters 805) with which the GW is able to communicate via the backhaul mechanism 806. These lists may be maintained in any suitable manner.

In one embodiment, for example, the list of mesh clusters 805 is maintained in a table (e.g., which may be referred to herein as the BackHaul_PSN_List table).

In one embodiment, the list of GWs is maintained in a table (e.g., which may be referred to herein as the BackHaul_PSN_GWNode_Mapping table). The GWs listed in the BackHaul_PSN_GWNode_Mapping table provide a list of direct neighbor nodes 110 of the GW that are reachable via the backhaul mechanism 806. In other words, a GW not only has mesh neighbor nodes 110 (i.e., from the Mesh Neighbor List 524), but also has backhaul neighbor nodes 110 (i.e., from the BackHaul_PSN_GWNode_Mapping table).

In one embodiment, in a GW, the Database Synchronization Procedure 523 running in the GW utilizes this information (e.g., the Mesh_Neighbor_List table and the BackHaul_PSN_GWNode_Mapping table) to facilitate database synchronization between clusters 805 and, thus, may be notified of changes to these two tables (e.g., in order to re-read the tables from its memory and refresh its internal cache).

In such embodiments, the Mesh_Neighbor List table and the BackHaul_PSN_GWNode_Mapping table may be populated in any suitable manner.

In one embodiment, for example, these lists maintained at a GW node may be populated by a Backhaul Application of the GW node at the time at which the associated backhaul connections are established for the GW node.

In the exemplary network 800, for example, GW-X1 of cluster $805_X$ maintains the following tables:

TABLE 2

BackHaul_PSN_List Table

| Cluster ID | PSN Node IP |
|---|---|
| Y | PSN-Y |
| Z | PSN-Z |

TABLE 3

BackHaul_PSN_GWNode_Mapping Table

| PSN Node IP | Gateway Node IP |
|---|---|
| PSN-Y | GW-Y1 |
| PSN-Z | GW-Z1 |
| PSN-Z | GW-Z2 |
| PSN-Z | GW-Z3 |

The BackHaul_PSN_List and BackHaul_PSN_GWNode_Mapping tables maintained on other GWs of the exemplary network 800 will be understood at least from the foregoing description and, thus, are omitted for purposes of clarity.

As described herein, each node 110 (including GWs) initiates its Neighbor Node Discovery Procedure 522 periodically.

In one embodiment, in order to reduce the bandwidth usage on the backhaul connections when a GW executes its Neighbor Node Discovery Procedure 522, additional features may be added to the Neighbor Node Discovery Procedure 522 and/or the Database Synchronization Procedure 523.

In one embodiment, a GW within a cluster is selected to be a GW Representative for database synchronization purposes.

In one embodiment, for example, the Database Synchronization Procedure 523 running on a PSN within a mesh cluster selects the GW Representative for the mesh cluster.

In one embodiment, a GW is not a GW Representative by default; rather, a GW assumes the role of a GW Representative upon receiving a message from the PSN that instructs the GW to operate as a GW Representative (referred to herein as a DBEQ_SYNC_REPRESENTATIVE message) and, similarly, a GW relinquishes its role as a GW Representative upon receiving a message from the PSN that instructs the GW to stop operating as a GW Representative (e.g., referred to herein as a DBEQ_SYNC_NONREPRESENTATIVE message).

The assignment or non-assignment of the GW Representative role to a GW controls the manner in which the GW handles database synchronization probe messages (DBEQ_SYNC_PROBE). A GW that is operating as a GW Representative may forward DBEQ_SYNC_PROBE messages via the backhaul connection. A GW that is not operating as a GW Representative does not forward DBEQ_SYNC_PROBE messages via the backhaul connection and discards DBEQ_SYNC_PROBE messages received via backhaul connections. In other words, for database synchronization purposes, a GW that is not operating as a GW Representative is essentially just another MNN without backhaul connectivity (even though it handles communication of other types of traffic via backhaul connections).

In one embodiment, selection of a GW of a mesh cluster to be the GW Representative for the mesh cluster may be performed as follows:
(1) The PSN of the mesh cluster maintains a list of local GWs (i.e., GWs of the mesh cluster). The list of local GWs may be maintained in any suitable manner. In one embodiment, for example, the list of local GWs is maintained in a database table on the PSN (e.g., referred to herein as a mesh_localClusterGWNodes table). The mesh_localClusterGWNodes table includes the IP addresses of the local GWs within the cluster.
(2) In response to any change to the mesh_ocalClusterGWNodes table, a notification is provided to the Database Synchronization Procedure 523 running on the PSN, which determines whether a GW Representative has already been selected for the mesh cluster and operates as follows:
(a) If a GW Representative has not been selected for the mesh cluster, the PSN selects a GW Representative from the mesh_localClusterGWNodes table.
(b) If a GW Representative has been selected for the mesh cluster, the PSN determines whether the selected GW Representative is included within the mesh_localClusterGWNodes table.
  (i) If the selected GW Representative is included within the mesh_localClusterGWNodes table, no further action needs to be taken by the PSN.
  (ii) If the selected GW Representative is not included within the mesh_localClusterGWNodes table, the PSN sends a DBEQ_SYNC_NONREPRESENTATIVE message to the current GW Representative and sends a DBEQ_SYNC_REPRESENTATIVE message to one of the GWs that is listed in the mesh_localClusterGWNodes table such that a new GW Representative is established within the mesh cluster.

As described herein, a GW operating as a GW Representative participates in the Database Synchronization Procedure 523, performing various functions in support of the Database Synchronization Procedure 523.

As described herein, a GW operating as a GW Representative is a representative for the organization to which the GW belongs and, thus, also may be referred to as an Organization Representative. The GW/Organization Representative for an organization performs database synchronization with other nodes 110, in other mesh clusters, that belong to the organization.

In one embodiment, upon assuming the role of GW Representative for a given organization within a mesh cluster, the GW enters certain information into an Organization Representative Node list.

The Organization Representative Node list for a mesh cluster includes, for each organization having at least one node 110 within the mesh cluster, information associated with the GW that is currently operating as the GW Representative for the organization. In one embodiment, for example, the Organization Representative Node list includes, for each GW listed in the Organization Representative Node list, the organization name of the GW, the IP address of the GW, and a current timestamp. The Organization Representative Node list may be maintained in any suitable format. In one embodiment, for example, the Organization Representative Node list may be maintained as follows:

TABLE 4

| Organization Name | Organization Representative Node IP | Elapsed Time |
|---|---|---|

As described herein, the Neighbor Node Discovery Procedure 522 is executed by each node 110 (including a GW that is operating as a GW Representative), and may be executed by a node at any suitable time (e.g., in response to expiration of the DBEQ_SYNC_PROBE_TIMER timer). In one embodiment, upon initiation of the Neighbor Node Discovery Procedure 522 by a GW operating as a GW Representative (e.g., in response to expiration of the DBEQ_SYNC_PROBE_TIMER timer), the GW operating as the GW Representative performs the actions described herein for execution of the Neighbor Node Discovery Procedure 522 by other nodes and also performs the following additional actions: (a)

refreshes its entry in the Organization Representative Node List (e.g., updating the Elapsed Time field based on the current time); and (b) sends a database synchronization probe message (DBEQ_SYNC_PROBE message) to each GW that is listed in the BackHaul_PSN_GWNode_Mapping table, where each database synchronization probe message that is sent has the Backhaul Indicator value (BackhaulIndicator) set to TRUE.

As described herein, the Neighbor Node Discovery Procedure 522 is executed by each node 110 in the network, and results in exchanges of database synchronization probe messages (DBEQ_SYNC_PROBE messages) and database synchronization probe response messages (DBEQ_SYNC_PROBE_RESP messages) between nodes 110 of the network.

As a result, GWs that are operating as GW Representatives, like other nodes 110 of the network, receive and process database synchronization probe messages and database synchronization probe response messages.

Upon receiving a database synchronization probe message, a GW operating as a GW Representative performs at least some of the actions described herein for execution of the Neighbor Node Discovery Procedure 522 by other nodes 110 (including the originally described version of the actions and, optionally, modified versions thereof) and, optionally, performs one or more additional actions. The exact set of actions performed by a GW operating as a GW Representative may be depend on the value of the Backhaul Indicator parameter that is set within the database synchronization probe message.

In one embodiment, upon receiving a database synchronization probe message in which the value of the Backhaul Indicator parameter is set to FALSE, the GW Representative performs the following additional step (in addition to steps 1 and 2 described hereinabove for processing of database synchronization probe messages by nodes 110):

(1) This step is the same as described hereinabove for processing of database synchronization probe messages by nodes 110.

(2) This step is the same as described hereinabove for processing of database synchronization probe messages by nodes 110.

(3) The executing node 110 is the GW Representative. The GW Representative determines if the Organization Representative Node List includes an Organization Representative Node for the organization specified in the database synchronization probe message (OriginatingNodeOrgName in the DBEQ_SYNC_PROBE message).

(a) If an entry is found in the Organization Representative Node List, the GW Representative determines if the "Elapsed Time" timestamp of the matching entry in the Organization Representative Node List is less than or greater than a threshold. The threshold may be any suitable value (e.g., twice the value of DBEQ_SYNC_PROBE_TIMER, or any other suitable threshold).

(i) If the "Elapsed Time" timestamp is determined to be less than the threshold, and the address of the node 110 from which the database synchronization probe message is received (OriginatingNodeIP) is not the same as the address of the Organization Representative Node as determined from the entry of the Organization Representative Node List, no additional action is required and the database synchronization probe message is discarded.

(ii) If the "Elapsed Time" timestamp is determined to be greater than the threshold (i.e., the GW Representative has become stale, meaning that it is no longer sending or responding), the GW Representative in the Organization Representative Node List is replaced with a new entry that identifies the node 110 from which the database synchronization probe message is received (OriginatingNodeIP). In this case, the database synchronization probe message (with BackhaulIndicator set to TRUE) is forwarded to each of the GWs listed in the BackHaul_PSN_GWNode_Mapping table.

(b) If no entry is found in the Organization Representative Node List, an entry is created in the Organization Representative Node List. The entry includes the organization name of the node 110 (e.g., OriginatingNodeOrgName from the database synchronization probe message), the address of the node 110 (e.g., OriginatingNodeIP from the database synchronization probe message), and the current time. In this case, the database synchronization probe message (with BackhaulIndicator set to TRUE) is forwarded to each of the GWs listed in the BackHaul_PSN_GWNode_Mapping table.

In one embodiment, upon receiving a database synchronization probe message in which the value of the Backhaul Indicator parameter is set to TRUE (i.e., the database synchronization probe message is received from a node 110 in a different cluster via a backhaul connection), the GW Representative performs steps (1) and (2a) described hereinabove for processing of database synchronization probe messages by nodes 110, and then performs a modified version of step (2b) described hereinabove for processing of database synchronization probe messages by nodes 110. As described in step (2), the GW Representative receiving the database synchronization probe message determines if the organization to which the GW Representative belongs and the OriginatingNodeOrgName of the database synchronization probe message are the same. In the modified version of step (2b) for the GW Representative, if the values are different, the GW Representative forwards the database synchronization probe message with the value of the BackhaulGatewayIP set to the address of the GW Representative and with the value of the BackhaulIndicator parameter remaining set to TRUE. In this case, each node 110 receiving the forwarded database synchronization probe message repeats this process described as being performed by a receiving node upon receiving a database synchronization probe message.

Similarly, as a result, GWs that are not operating as GW Representatives (i.e., non-representative gateways), like other nodes 110 of the network, receive and process database synchronization probe messages and database synchronization probe response messages.

In one embodiment, upon receiving a database synchronization probe message in which the value of the Backhaul Indicator parameter is set to FALSE, a non-representative GW performs the steps described hereinabove for processing of database synchronization probe messages by nodes 110 of the network.

In one embodiment, upon receiving a database synchronization probe message in which the value of the Backhaul Indicator parameter is set to TRUE (i.e., the database synchronization probe message is received from a node 110 in a different cluster via a backhaul connection), a non-representative GW performs step (1) and a modified version of step (2) described hereinabove for processing of database synchronization probe messages by nodes 110. As described in step (2), the non-representative GW receiving the database synchronization probe message determines if the organization to which the GW Representative belongs and the Originating-NodeOrgName of the database synchronization probe message are the same. In the modified version of step (2a) for the non-representative GW, if the values are the same, the non-representative GW (1) sends a database synchronization probe response message to the address from which the database synchronization probe message was received (i.e., to BackhaulGatewayIP) and (2) does not forward the database synchronization probe message to any other nodes 110.

Upon receiving a database synchronization probe response message, a GW operating as a GW Representative may perform different sets of actions depending on the value of the Backhaul Indicator parameter that is set within the database synchronization probe response message.

In one embodiment, upon receiving a database synchronization probe response message in which the value of the Backhaul Indicator parameter is set to FALSE, the GW Representative performs the set of actions performed by other nodes 110 in response to receiving database synchronization probe response messages.

In one embodiment, upon receiving a database synchronization probe response message in which the value of the Backhaul Indicator parameter is set to TRUE, the GW Representative determines whether the Organization Representative Node List includes an entry (i.e., an Organization Representative Node) associated with the organization identified in the database synchronization probe response message (i.e., the value of OriginatingNodeOrgName in the DBEQ_SYNC_PROBE_RESP message). The subsequent processing depends on whether or not an entry is found, as follows:

(1) If an entry is found, the GW Representative determines whether the "Elapsed Time" timestamp of the matched entry is larger than a threshold. The threshold may be any suitable value (e.g., twice the value of DBEQ_SYNC_PROBE_TIMER, or any other suitable threshold).
  (a) If the "Elapsed Time" timestamp of the matched entry is larger, meaning that the Representative Node of the matched entry is stale (not sending or responding), the Representative Node of the matched entry is replaced with the node 110 identified by the source address of the database synchronization probe response message and the "Elapsed Time" timestamp is set to the current time. The database synchronization probe response message is then forwarded to the node 110 that is identified by the OriginatingNodeIP value in the database synchronization probe response message.
  (b) If the "Elapsed Time" timestamp of the matched entry is not larger, and the node 110 identified by the RespNodeIP value in the database synchronization probe response message is different than the Organization Representative Node of the matched entry, no further action needs be taken and the database synchronization probe response message is discarded.
(2) If an entry is not found, the GW Representative creates an entry in the Organization Representative Node List, where the created entry includes the name of the organization specified in the database synchronization probe response message (i.e., the value of the OriginatingNodeOrgName), the source node of the database synchronization probe response message (i.e., the value of the OriginatingNodeIP), and the current time. The database synchronization probe response message is then forwarded to the node 110 that is identified by the OriginatingNodeIP value in the database synchronization probe response message.

Figure 9:
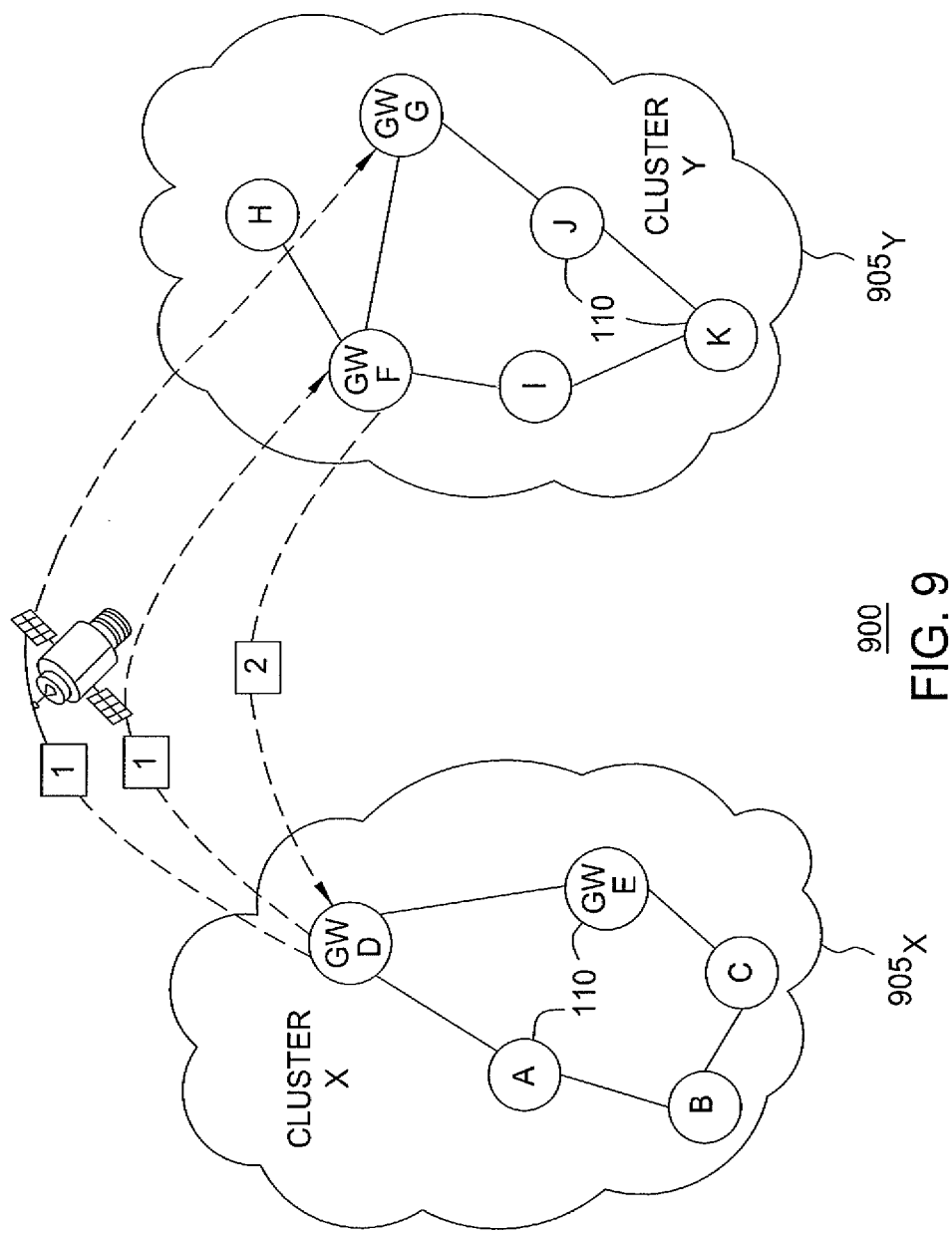
FIG. 9 depicts an exemplary network illustrating messages exchanged between nodes during neighbor node discovery executed via a backhaul connection where the nodes belong to a single organization.

FIG. 9 depicts an exemplary network illustrating messages exchanged between nodes during neighbor node discovery executed via a backhaul connection where the nodes belong to a single organization.

As depicted in FIG. 9, exemplary network 900 includes a first cluster $905_X$ and a second cluster $905_Y$ (collectively, clusters 905) in communication via a backhaul mechanism 906. The clusters 905 include respective pluralities of nodes 110. The first cluster $905_X$ includes five nodes (denoted as nodes A, B, C, GW-D, and GW-E). The second cluster $905_Y$ includes six nodes (denoted as nodes GW-F, GW-G, H, I, J, and K). The nodes 110 of the first and second clusters 905 all belong to the same organization. The node GW-D is the GW Representative Node for the first cluster $905_X$. The node GW-F is the GW Representative Node for the second cluster $905_Y$.

The execution of the Neighbor Node Discovery Procedures 522 of nodes 110, via a backhaul mechanism and where all of the nodes 110 belong to the same organization, may be better understood by way of reference to messages exchanged during execution of the Neighbor Node Discovery Procedure 522 within exemplary network 900 of FIG. 9.

The node GW-D, which is the GW Representative Node for the first cluster $905_X$, sends database synchronization probe request messages to the nodes GW-F and GW-G of second cluster $905_Y$, respectively, via the backhaul mechanism 906. These database synchronization probe request messages are indicated in FIG. 9 as Message 1.

The node GW-F, as the Organization Representative Node for second cluster $905_Y$, replies to the database synchronization probe request message with an associated database synchronization probe response message. This database synchronization probe response message is indicated in FIG. 9 as Message 2.

The node GW-G is not the Organization Representative Node for second cluster $905_Y$ and, thus, ignores the database synchronization probe request message received from node GW-D.

Although omitted from FIG. 9 for purposes of clarity, the execution of Neighbor Node Discovery Procedures 522 of nodes 110 of network 900 may proceed within each cluster 905 as described herein for the case of neighbor node discovery within a mesh cluster.

Figure 10:
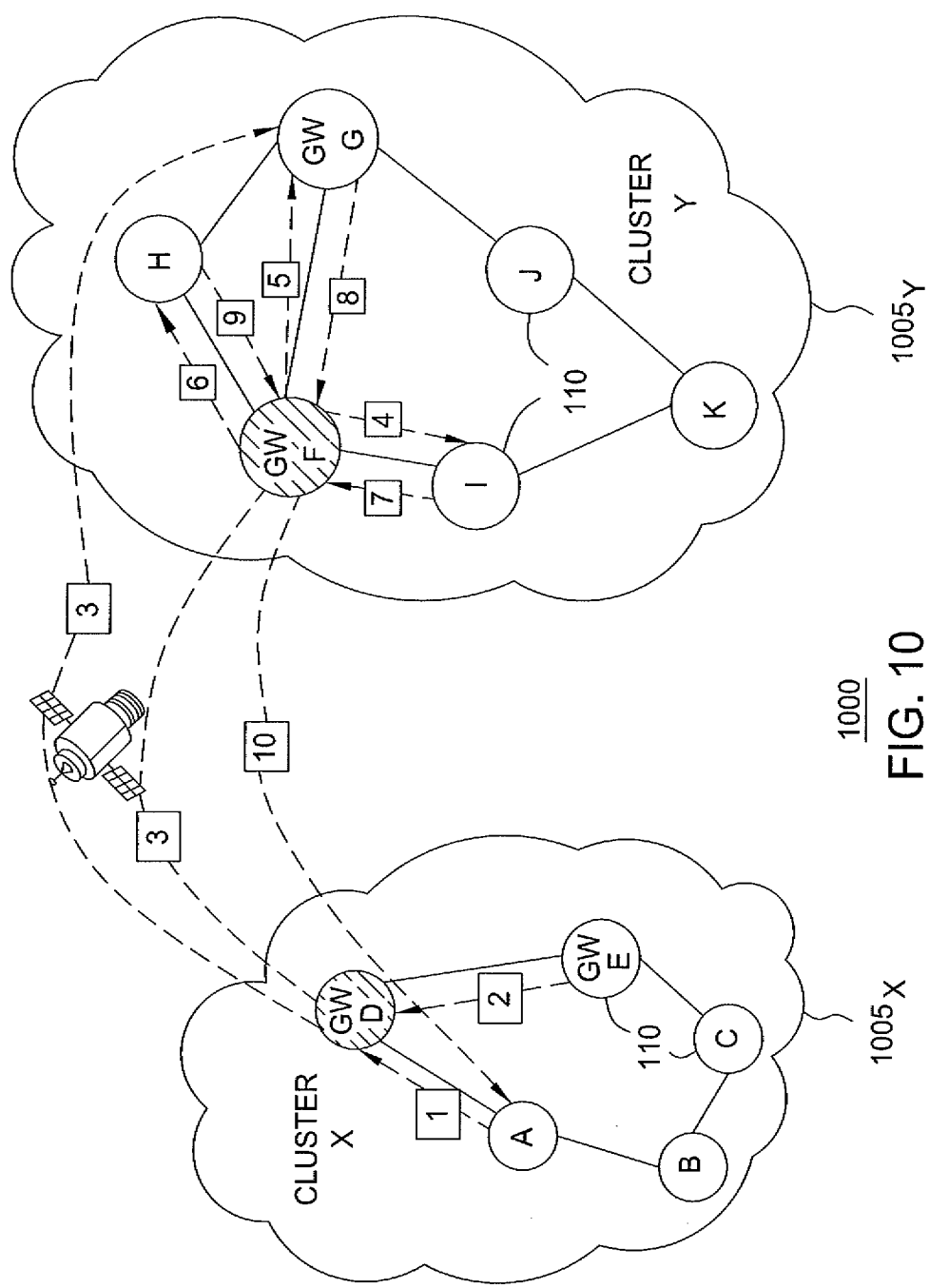
FIG. 10 depicts an exemplary network illustrating messages exchanged between nodes during neighbor node discovery executed via a backhaul connection where the nodes belong to multiple organizations.

FIG. 10 depicts an exemplary network illustrating messages exchanged between nodes during neighbor node discovery executed via a backhaul connection where the nodes belong to multiple organizations.

As depicted in FIG. 10, the exemplary network 1000 includes a first cluster $1005_X$ and a second cluster $1005_Y$ (collectively, clusters 1005) that communicate via a backhaul mechanism 1006. The clusters 1005 include respective pluralities of nodes 110. The first cluster $1005_X$ includes five nodes (denoted as nodes A, B, C, GW-D, and GW-E). The second cluster $1005_Y$ includes six nodes (denoted as nodes GW-F, GW-G, H, I, J, and K). The nodes A, B, C, GW-E, GW-G, H, I, J, and K belong to a first organization. The nodes GW-D and GW-F belong to a second organization. The node GW-D is the GW Representative Node for the first cluster $1005_X$. The node GW-F is the GW Representative Node for the second cluster $1005_Y$.

The execution of Neighbor Node Discovery Procedures 522 of nodes 110, via a backhaul mechanism and where the nodes 110 belong to multiple organizations, may be better understood by way of reference to messages exchanged during execution of Neighbor Node Discovery Procedures 522 within exemplary network 1000 of FIG. 10.

The nodes A and GW-E, as mesh neighbors of node GW-D, each send database synchronization probe request messages to node GW-D. These database synchronization probe request messages are indicated in FIG. 10 as Messages 1 and 2, respectively.

The node GW-D selects node A to be the Organization Representative Node for the first organization. The node GW-D forwards the database synchronization probe request message received from node A (i.e., Message 2) via the backhaul mechanism 1006. This database synchronization probe request message is indicated as Message 3. It will be appreciated that, until a later change, only database synchronization probe request messages from node A will be forwarded via the backhaul mechanism 1006.

The node GW-F receives the database synchronization probe request message from node GW-D, and forwards the database synchronization probe request message to each of its mesh neighbors belonging to a different organization than its own (namely, nodes GW-G, H, and I). These database synchronization probe request messages are indicated in FIG. 10 as Messages 4, 5, and 6, respectively.

The nodes GW-G, H, and I receive the database synchronization probe request messages from node GW-F. The nodes GW-G, H, and I each process the received database synchronization probe request messages. The nodes GW-G, H, and I reply to the database synchronization probe request messages from node GW-F with database synchronization probe response messages, respectively. These database synchronization probe response messages are indicated in FIG. 10 as Messages 7, 8, and 9, respectively.

The node GW-F receives the database synchronization probe response messages from nodes GW-G, H, and I, respectively, and selects one of the nodes (e.g., in this example, node I) to be the Organization Representative for the second cluster $1005_Y$.

The node GW-F forwards the database synchronization probe response message received from node I directly to node A via backhaul mechanism 1006. This database synchronization probe response message is indicated in FIG. 10 as Message 10.

Although omitted from FIG. 10 for purposes of clarity, the execution of Neighbor Node Discovery Procedures 522 of nodes 110 of network 1000 may proceed within each cluster 1005 as described herein for the case of neighbor node discovery within a mesh cluster.

Figure 11:
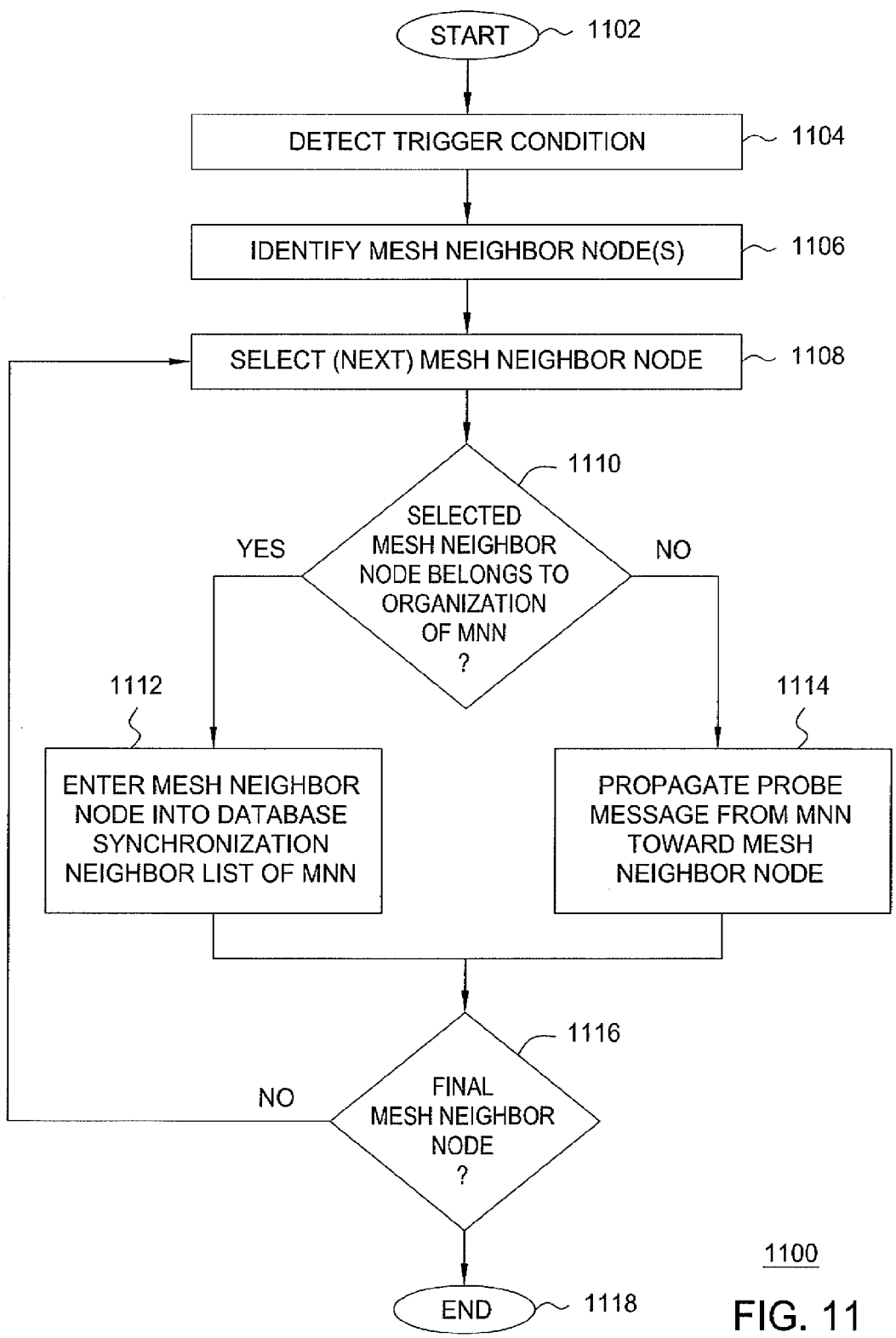
FIG. 11 depicts one embodiment of a method for neighbor node discovery for timer-based database synchronization.

FIG. 11 depicts one embodiment of a method for neighbor node discovery for timer-based database synchronization. The method 1100 is executed by a mobile network node (MNN) which is associated with an organization.

At step 1102, method 1100 begins.

At step 1104, a trigger condition is detected. At step 1106, in response to the trigger condition, the MNN identifies each of a plurality of mesh neighbor nodes of the MNN having wireless connectivity to the MNN.

At step 1108, a mesh neighbor node is selected (a first, or the next for any subsequent loops).

At step 1110, a determination is made as to whether or not the selected mesh neighbor node is associated with the organization of the MNN. If the selected mesh neighbor node is associated with the organization of the MNN, method 1100 proceeds to step 1112. If the selected mesh neighbor node is not associated with the organization of the MNN, method 1100 proceeds to step 1114.

At step 1112, the mesh neighbor node is entered into a database synchronization neighbor list of the MNN. From step 1112, method 1100 proceeds to step 1116.

At step 1114, the MNN propagates a probe message from the MNN toward the mesh neighbor node via the wireless connection therebetween. From step 1114, method 1100 proceeds to step 1116.

At step 1116, a determination is made as to whether the final identified mesh neighbor node has been selected. If the final identified mesh neighbor node has not been selected, method 1100 returns to step 1108, at which point the next mesh neighbor node is selected. If the final identified mesh neighbor node has been selected, method 1100 proceeds to step 1118.

At step 1118, method 1100 ends.

As described herein, each node 110 maintains a DB Sync Node List 521 that is populated using the Neighbor Node Discovery Procedure 522 of the node 110, as depicted and described with respect to FIGS. 6-10.

As described herein, each node 110 executes a Database Synchronization Procedure 523 for synchronizing its database 411 with databases 411 of other nodes 110. In one embodiment, each node 110 executes its Database Synchronization Procedure 523 using its DB Sync Node List 521. A node 110 that is executing its Database Synchronization Procedure 523 for synchronizing its database 411 with databases 411 of other nodes 110 is referred to herein as an originating node.

In one embodiment, an originating node 110 is allowed to engage in database synchronization with only one other node 110 at a time.

In one embodiment, in response to a determination by an originating node 110 that database synchronization is to be performed by that originating node 110, the originating node 110 selects a target node 110 for database synchronization from its DB Sync Node List 521. In one such embodiment, the selected target node 110 is the node 110 of the DB Sync Node List 521 that has the oldest Sync Timestamp. The Sync Timestamp value for a node 110 in the DB Sync Node List 521 identifies the time of completion of the last database synchronization between the originating node 110 and that node 110 of the DB Sync Node List 521. In one embodiment, in which a database synchronization has not yet been performed between the originating node 110 and a node 110 of the DB Sync Node List 521, the Sync Timestamp for that node 110 of the DB Sync Node List 521 is set to a value ensuring selection of that node 110 for database synchronization prior to selection of other nodes 110 for which database synchronization has already been performed (e.g., using a value of zero ("0") or any other suitable value(s)). In one embodiment, in which multiple nodes 110 of the DB Sync Node List 521 of an originating node 110 have respective Sync Timestamp values indicative that database synchronization has not yet been performed, the originating node 110 may select one of those nodes 110 in any suitable manner (e.g., the first listed in the DB Sync Node List 521, randomly, and the like).

The originating node 110 initiates database synchronization with the node 110 selected from the DB Sync Node List 521 of the originating node 110.

The originating node 110, following completion of the database synchronization between the originating node 110 and the selected node 110, enters the current time in the Sync Timestamp field associated with the selected node 110 in the DB Sync Node List 521 of the originating node 110 and similarly, the selected node 110 enters the current time in the Sync Timestamp field associated with the originating node 110 in the DB Sync Node List 521 of the selected node 110.

Figure 12:
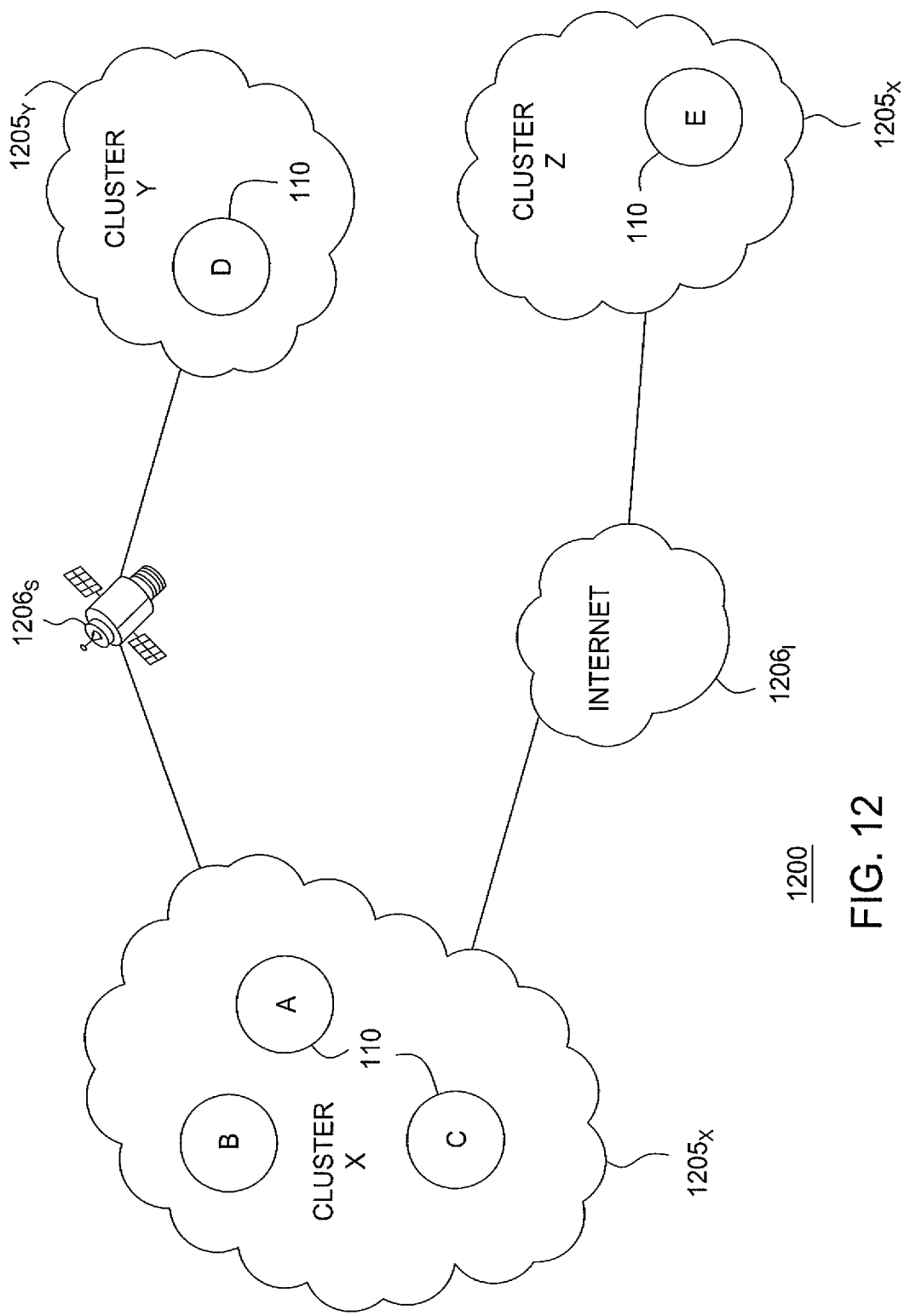
FIG. 12 depicts database synchronization for a node of an exemplary network.
Figure 13:
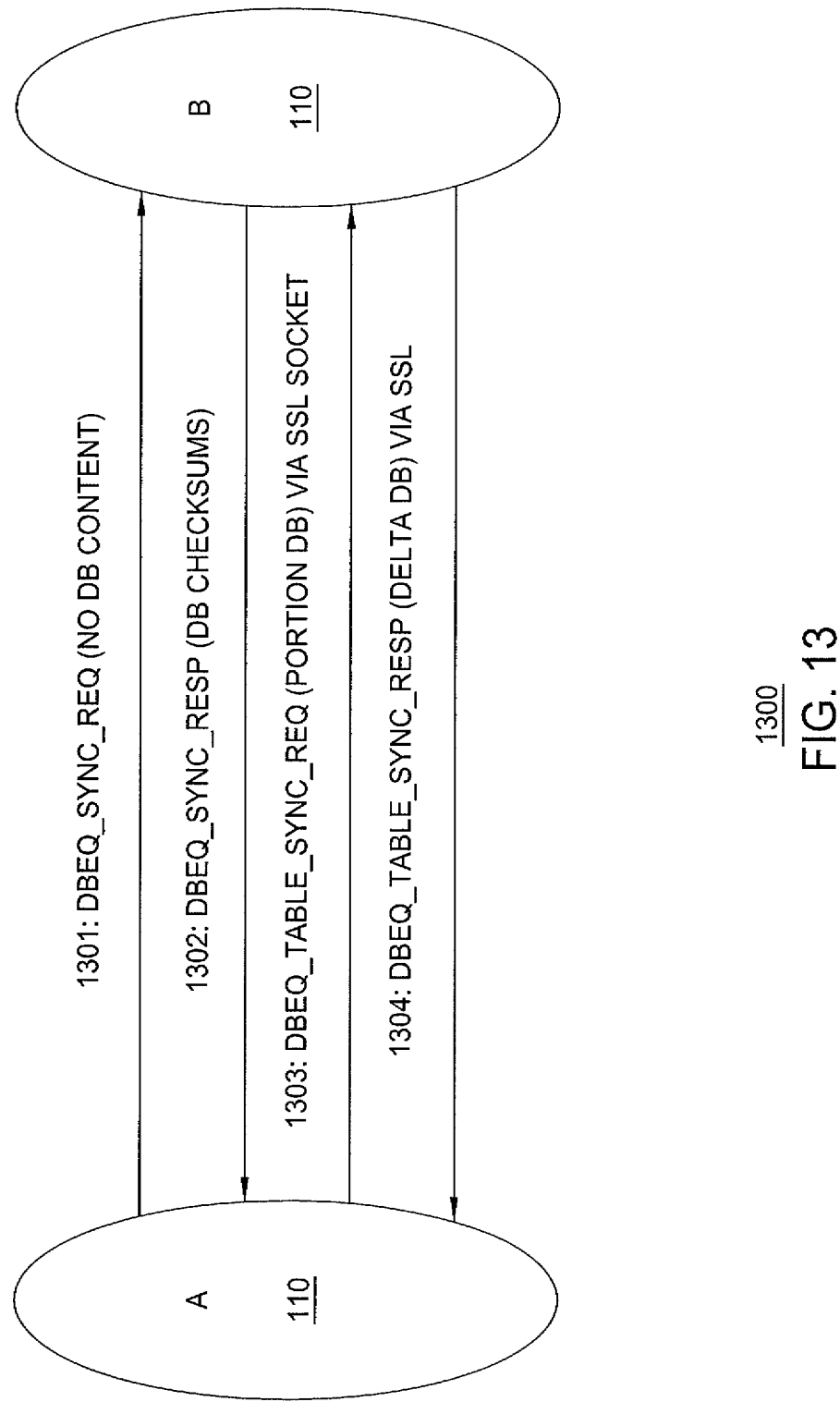
FIG. 13 depicts messages exchanged between two nodes during database synchronization for timer-based database synchronization.
Figure 14:
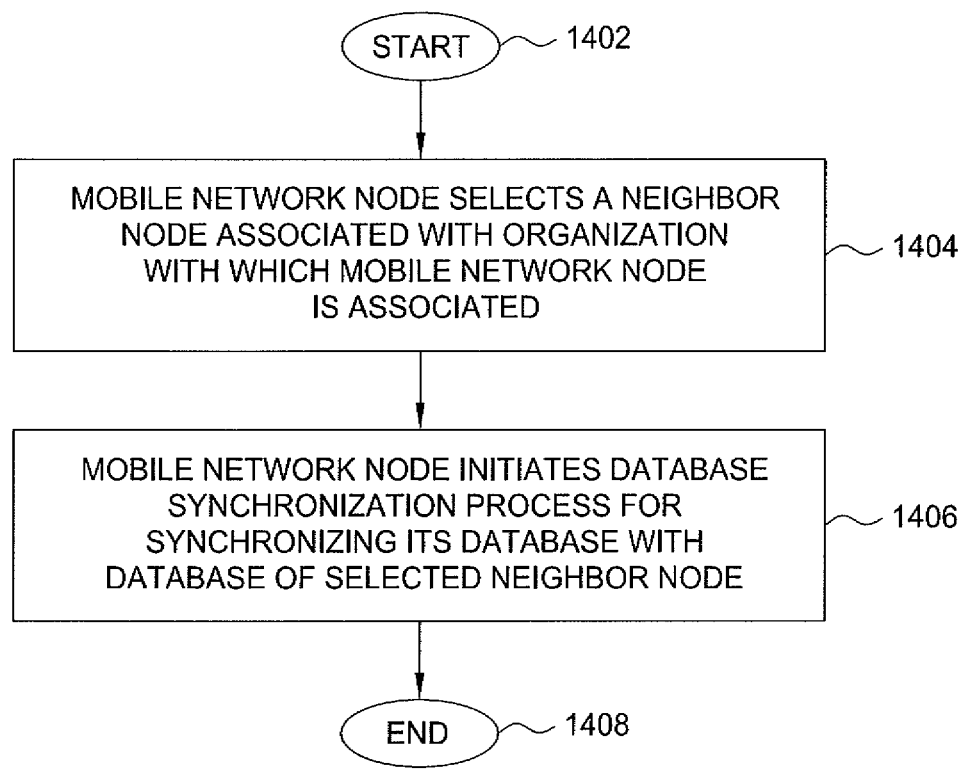
FIG. 14 depicts one embodiment of a method for database synchronization using timer-based database synchronization.

These and other embodiments of the Database Synchronization Procedure 523 of a node 110 may be better understood with respect to FIG. 12-14.

FIG. 12 depicts database synchronization for a node of an exemplary network.

As depicted in FIG. 12, exemplary network 1200 includes a first cluster $1205_X$ (also denoted as cluster X), a second cluster $1205_Y$ (also denoted as cluster Y), and a third cluster $1205_Z$ (also denoted as cluster Z), which may be referred to collectively herein as clusters 1205. The first cluster $1205_X$ includes three nodes 110, denoted as nodes A, B, and C. The second cluster $1205_Y$ includes one node 110, denoted as node D. The third cluster $1205_Z$ includes one node 110, denoted as node E. All of the nodes 110 of exemplary network 1200 belong to the same organization. The first and second clusters $1205_X$ and $1205_Y$ are connected via a satellite backhaul connection $1206_S$. The first and third clusters $1205_X$ and $1205_Z$ are connected via an Internet backhaul connection $1206_I$.

In the exemplary network 1200, each of the nodes 110 synchronizes its database 411 with each of the other nodes 110.

A description of a Database Synchronization Procedure 523 utilized by node A for synchronizing its database 411 follows.

As described herein, node A synchronizes its database 411 with databases 411 of nodes 110 discovered by node A (i.e., nodes 110 included in the DB Sync Node List 521 of node A).

In the example of FIG. 12, assume that, prior to initiating its Database Synchronization Procedure 523, node A discovered nodes B and C within its own mesh cluster (i.e., first cluster $1205_X$) and discovered nodes D and E within clusters other than its own mesh cluster (i.e., second and third clusters $1205_Y$ and $1205_Z$, respectively).

In the example of FIG. 12, further assume that, during the Neighbor Node Discovery Procedure 522 executed by node A, these discovered nodes 110 were entered into the DB Sync Node List 521 of node A as follows:

TABLE 5

| DB Sync Target IP | Sync Timestamp | Discover Timestamp |
|---|---|---|
| B's IP | 0 | B's latest discovered timestamp |
| C's IP | 0 | C's latest discovered timestamp |
| D's IP | 0 | D's latest discovered timestamp |
| E's IP | 0 | E's latest discovered timestamp |

As described herein, the Sync Timestamp value of a neighbor node 110 listed in the DB Sync Node List 521 of an originating node 110 may depend on whether or not that originating node 110 previously synchronized its database 411 with that neighbor node 110 of the DB Sync Node List 521. In one embodiment, for example, if the originating node 110 has not synchronized with the neighbor node 110 then the value of the Sync Timestamp for the neighbor node will be zero (or any other suitable value), and if the originating node 110 has synchronized with the neighbor node 110 then the value of the Sync Timestamp for the neighbor node 110 will be the timestamp of the time at which the originating node 110 completed its database synchronization with the neighbor node 110. In the example of FIG. 12, each of the Sync Timestamp values is zero ("0").

As described herein, the originating node 110 that is performing the database synchronization, upon detecting an indication that database synchronization is to be performed, selects a neighbor node 110 from the DB Sync Node List 521 that has the oldest timestamp in the Sync Timestamp field of the DB Sync Node List 521. In one embodiment, in which multiple neighbor nodes 110 of the DB Sync Node List 521 have Sync Timestamp values of zero, the originating node 110 performing the database synchronization may select one of those neighbor nodes 110 in any suitable manner (e.g., the first neighbor node 110 listed in the DB Sync Node List 521, randomly and the like). The originating node 110 performing the database synchronization initiates database synchronization with the neighbor node 110 selected from the DB Sync Node List 521. Upon completion of the database synchronization, the originating node 110 performing the database synchronization enters a timestamp in the associated entry of its DB Sync Node List 521.

In the example of FIG. 12, since the Sync Timestamps of neighbor nodes B, C, D, and E in the DB Sync Node List 521 of node A each have a value of 0, node A select one of these neighbor nodes as the target of its database synchronization.

In the example of FIG. 12, assume that node A selects neighbor node B, from the DB Sync Node List 521, as the node 110 with which to perform database synchronization. In this example, upon completion of database synchronization between nodes A and B, nodes A and B each update their DB Sync Node Lists 521, respectively. Node A updates the entry of its DB Sync Node List 521 that is associated with node B to include the current time at which node A determines that the database synchronization is complete (e.g., the time at which the DBEQ_TABLE_SYNC_RESP message is received at node A from node B). Similarly, node B updates the entry of its DB Sync Node List 521 that is associated with node A to include the current time at which node B determines that the database synchronization is complete (e.g., the time at which the DBEQ_TABLE_SYNC_RESP message is sent from node B to node A).

In the example of FIG. 12, following completion of updating of the DB Sync Node List 521 of node A, the DB Sync Node List 521 of node A is as follows:

TABLE 6

| DB Sync Target IP | Sync Timestamp | Discover Timestamp |
|---|---|---|
| B's IP | B's latest sync timestamp | B's latest discovered timestamp |
| C's IP | 0 | C's latest discovered timestamp |
| D's IP | 0 | D's latest discovered timestamp |
| E's IP | 0 | E's latest discovered timestamp |

As described herein, synchronization of the databases 411 of two nodes 110 includes exchanges of messages between the two nodes 110.

FIG. 13 depicts messages exchanged between two nodes during database synchronization for timer-based database synchronization.

As depicted in FIG. 13, database synchronization is performed between a first node 110 (denoted as node A) and a second node 110 (denoted as node B).

As depicted in FIG. 13, messages are exchanged between node A and node B for synchronizing the databases of nodes A and B, where nodes A and B belong to the same organization, nodes A and B are neighbors to each other, and node B is one of the synchronization targets of node A as determined from the DB Sync Node List 521 of node A.

As depicted in FIG. 13, the database synchronization is initiated by node A (i.e., the originating node) for synchronizing its database 411 with the database 411 of node B (i.e., the target node). The participation by node A in the database synchronization with node B is performed using the Database Synchronization Procedure 523 of node A. Similarly, the participation of node B in the database synchronization with node A is performed using the Database Synchronization Procedure 523 of node B.

Node A may initiate the database synchronization process in response to any suitable trigger condition, such as in response to one of the following:

(1) node A is joining a mesh cluster to which node B belongs, the mesh cluster has completed the connection of node A to the mesh cluster, and the DB Sync Node List 521 on node A has been updated (such that node A knows to perform a database synchronization with node B); (2) a database synchronization timer of node A (which also may be referred to herein as DBEQ_SYNC_TIMER) has expired; (3) and the like.

As depicted in FIG. 13, the database synchronization proceeds as follows:

(1) Node A initiates the database synchronization by sending a database synchronization request message (denoted herein as a DBEQ_SYNC_REQ message) to node B. The database synchronization request message may include any suitable information. In one embodiment, for example, the database synchronization request message includes the destination address, a message type (e.g., DBEQ_SYNC_REQ), and a transaction identifier that is unique within the mesh cluster. The database synchronization request message may be implemented in any suitable manner. In one embodiment, for example, the database synchronization request message is a UDP message. Node A, upon sending the database synchronization request message, starts a timer. If the timer on node A expires before node A receives a response from node B, node A selects the next neighbor node 110 in its DB Sync Node List 521 and restarts the database synchronization process with that next neighbor node 110. If node A receives a response from node B after the timer on node A expires, node A discards the response. The DBEQ_SYNC_REQ message is denoted in FIG. 13 as step 1301.

(2) Node B responds to the database synchronization request message from node A with a database synchronization response message (denoted herein as a DBEQ_SYNC_RESP). The database synchronization response message may include any suitable information. In one embodiment, for example, the database synchronization response message includes the destination address, a message type (e.g., DBEQ_SYNC_RESP), and a checksum list for the database 411 of node B. The checksum list for the database 411 of node B is adapted for use by node A in determining differences between the data of the database 411 of node A and the data of the database 411 of node B. The checksum list for the database 411 of node B may be provided at any suitable level of granularity. In one embodiment, for example, in which database synchronization is provided on a per-table basis, the checksum list includes, for each table of the database 411 which may be synchronized: (1) a table identifier of the table, and (2) a table checksum for the table. In one embodiment, for example, in which database tables are partitioned into sections and database synchronization is provided on a per-section basis, the checksum list includes, for each table of the database 411 which may be synchronized: (1) a table identifier of the table, and (2) a table checksum for the table, (3) the number of sections in the table (e.g., a predefined number of the maximum records per section may be used to divide the table, or the table may be divided into sections in any other suitable manner), and (4) a list of the checksums for the section of the table (e.g., which may be indexed by the number of sections of the table, or organized in any other suitable manner). The database synchronization response message may be implemented in any suitable manner. In one embodiment, for example, the database synchronization response message is a UDP message. The DBEQ_SYNC_RESP message is denoted in FIG. 13 as step 1302.

(3) Node A, upon receiving the database synchronization response message, compares the received checksums of the database 411 of node B with checksums of its own database 411. In one embodiment, for example, in which database synchronization is provided on a per-table basis, node A compares the table checksums for the tables. In one embodiment, in which database tables are partitioned into sections and database synchronization is provided on a per-section basis, node A compares the table checksums and (a) if the table checksums for a table match, the section checksums of the sections of the table do not need to be compared or (b) if the table checksums for a table do not match, node A compares the section checksums for each of the sections of the table to identify any sections of the table that may need to be synchronized. If all compared checksums match, node A terminates the database synchronization process with node B and node A may then begin a new database synchronization procedure by either (a) selecting a next target neighbor node 110 in its DB Sync Node List 521 or (b) waiting for its database synchronization timer (e.g., DBEQ_SYNC_TIMER) to expire. If one or more of the checksums do not match, node A initiates a request for data to node B.

(4) Node A, upon determining that one or more of the compared checksums do not match, initiates a connection with node B and sends a database table synchronization request message to node B (denoted herein as a DBEQ_TABLE_SYNC_REQ). The database table synchronization request message is adapted for requesting, from node B, data from one or more database tables of the database 411 of node B that have been determined by node A as not matching the corresponding database tables of the database 411 of node A. The database synchronization request message may include any suitable information. In one embodiment, for example, the database synchronization request message includes the destination address, a message type (e.g., DBEQ_TABLE_SYNC_REQ), a transaction identifier that is unique within the mesh cluster (e.g., the same as used in the DBEQ_SYNC_REQ message), a number of tables to be transferred, a list of the tables to be transferred (which may be indexed by the number of tables, or indexed in any other suitable manner), a number of files to be transferred, and information for each of the files to be transferred. The information for each of the files to be transferred may include a table identifier (e.g., since, depending on the size of the mismatched table, a single table may be divided into several files), a section identifier, and the table entries of the section. Node A, upon sending the database table synchronization request message, starts a timer. If the timer on node A expires before node A receives a response from node B, node A moves on to the next neighbor node 110 in its DB Sync Node List 521 and restarts the database synchronization process with that next neighbor node 110. If node A receives a response from node B after the timer on node A expires, node A discards the response. The DBEQ_TABLE_SYNC_REQ message is denoted in FIG. 13 as step 1303.

(5) Node B, upon receiving the database table synchronization request message from node A, retrieves the data requested by node A and compares the timestamps of the retrieved database records of node B with the timestamps of the database records from node A. Node B commits each database record from node A that has a later timestamp than the corresponding database record of node B. Node B ignores each database record from node A that has an earlier timestamp than the corresponding database record of node B. Node B determines whether any database records of the database 411 of node B have later timestamps than corresponding database records received from node A. Node B then responds to the database table synchronization request message with a database table synchronization response message (denoted herein as a DBEQ_TABLE_SYNC_RESP message). The database table synchronization response message may include any suitable information, which depends on whether or not node B identifies any database records of the database 411 of node B having later timestamps than corresponding database records received from node A.

(i) If node B does not identify any database records of the database 411 of node B having later timestamps than corresponding database records received from node A, the database table synchronization response message includes a message type (e.g., DBEQ_TABLE_SYNC_RESP) and a transaction identifier that is unique within the mesh cluster (e.g., the same as used in the DBEQ_TABLE_SYNC_REQ message).

(ii) If node B does identify database records of the database 411 of node B having later timestamps than corresponding database records received from node A, the database table synchronization response message includes a message type (e.g., DBEQ_TABLE_SYNC_RESP), a transaction identifier that is unique within the cluster (e.g., the same as used in the DBEQ_TABLE_SYNC_REQ message), a number of tables to be transferred, a list of the tables to be transferred (which may be indexed by the number of tables, or indexed in any other suitable manner), a number of files to be transferred, and information for each of the files to be transferred. The information for each of the files to be transferred may include a table identifier (e.g., since, depending on the size of the mismatched table, a single table may be divided into several files), a section identifier, and the table entries of the section.

In one embodiment, in which node B is not ready to participate in a database synchronization with node A, node B may reply to the database synchronization request message with a database synchronization response message that does not include checksums (e.g., a database synchronization response message that only includes the destination address and the message type (e.g., DBEQ_SYNC_RESP)). In this embodiment, node A, upon receiving a database synchronization response message without checksums, begins a new database synchronization procedure by either (a) selecting a next target neighbor node 110 in its DB Sync Node List 521 or (b) waiting for its database synchronization timer (e.g., DBEQ_SYNC_TIMER) to expire.

In one embodiment, when two nodes 110 are participating in a database synchronization process, each of the two nodes 110 remains in a busy state for the duration of the database synchronization process (such that neither of the nodes 110 will participate in any other initiated or requested database synchronizations while the current database synchronization is in progress). In one such embodiment, each node 110 enters a busy state after sending or receiving a database synchronization request message (DBEQ_TABLE_SYNC_REQ message). In one embodiment, if a target node 110 receives a database synchronization request message from an originating node 110, and the database synchronization request message includes an associated Transaction Identifier different than the Transaction Identifier being used for the current database synchronization, the target node 110 responds to the originating node 110 with a database synchronization response message that is empty (i.e., without any database checksums). The originating node 110, upon receiving the empty database synchronization response message, knows that the target node 110 to which the database synchronization request message was sent is busy (e.g., involved in another database synchronization process with a different node 110) and, thus, may select the next target node 110 in its DB Sync Node List 521 having the next oldest Sync Timestamp. In the DB Sync Node List 521 of the originating node 110, the first target node 110 selected for database synchronization (i.e., the one that was busy) will remain the node 110 of the DB Sync Node List 521 that has the oldest Sync Timestamp, such that this target node 110 will be selected for database synchronization following completion of the database synchronization between the originating node 110 and the second target node 110 selected from the DB Sync Node List 521 of the originating node 110. In one embodiment, in order to prevent a busy loop in which all of the neighbor nodes 110 of the DB Sync Node List 521 of an originating node 110 are busy and the originating node 521 continues to loop through all of the neighbor nodes 110 of the DB Sync Node List 521 of the originating node 110 without actually performing any database synchronization, the originating node 110 may be configured to restart its database synchronization timer (DBEQ_SYNC_TIMER) when two (or more) consecutive neighbor nodes 110 selected by the originating node 110 from its DB Sync Node List 521 are determined to be busy.

FIG. 14 depicts one embodiment of a method for database synchronization using timer-based database synchronization. The method provides for synchronization of a database of a mobile network node that is associated with an organization. At step 1402, method 1400 begins. At step 1404, the mobile network node selects a neighbor node associated with the organization with which the mobile network node is associated, where the selected neighbor node is one of a plurality of neighbor nodes of the mobile network node that are associated with the organization. At step 1406, the mobile network node initiates a database synchronization process for synchronizing its database with the database of the selected neighbor node. At step 1408, method 1400 ends.

As described herein, in some cases mesh clusters may communicate via backhaul. In some cases, mesh clusters also may come into contact with each other directly via mesh wireless communications. In such cases, the mesh clusters may merge to form a single cluster.

Figure 15:
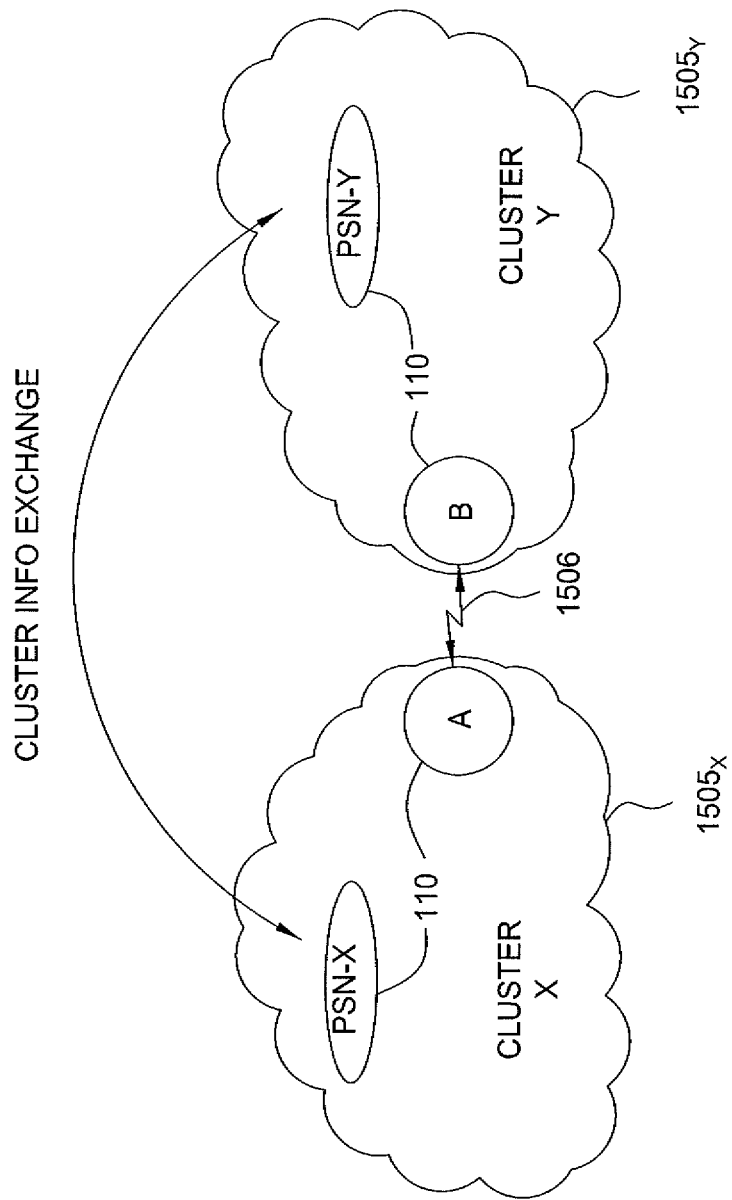
FIG. 15 depicts an exemplary cluster merge in which two clusters are merging to form a single cluster.

FIG. 15 depicts an exemplary cluster merge in which two clusters are merging to form a single cluster.

As depicted in FIG. 15, a first cluster 1505$_X$ (denoted as cluster X) and a second cluster 1505$_Y$ (cluster Y) come within wireless range of each other. The first cluster 1505$_X$ includes two nodes 110: a PSN (denoted as node PSN-X) and a node A. The second cluster 1505$_Y$ includes two nodes 110: a PSN (denoted as node PSN-Y) and a node B. The first and second clusters 1505$_X$ and 1505$_Y$ come within range of each other via wireless communication between node A and node B. The first and second clusters $1505_X$ and $1505_Y$ begin a process for merging to form a single cluster. A connection 1506 is established between node PSN-X and nodes PSN-Y, such that first and second clusters $1505_X$ and $1505_Y$ may exchange cluster information for merging to form a single cluster. In one embodiment, in order to prevent database synchronization between first and second clusters $1505_X$ and $1505_Y$ prior to completion of the cluster merge process, the DB Sync Node Lists 521 of nodes A and B are controlled in order to prevent inclusion of node B in the DB Sync Node List 521 stored on node A and, similarly, to prevent inclusion of node A in the DB Sync Node List 521 stored on node B. In one such embodiment, following completion of the cluster merge process, node B is entered into the DB Sync Node List 521 of node A and, similarly, node A is entered into the DB Sync Node List 521 of node B. The Neighbor Node Discovery Procedures 522 and Database Synchronization Procedures 523 of the nodes 110 may then be executed in order to synchronize the databases 411 of the nodes 110 of the merged cluster.

In one embodiment, one or more nodes 110 may support a database update push capability in addition to supporting the database synchronization capability.

In one embodiment, the database update push capability of a node 110 enables the node 110 to receive database changes configured via a provisioning process and to push the database changes to each of the other nodes 110 in the same organization (e.g., within the cluster and, optionally, to other clusters connected via backhaul).

In one embodiment, the database update push capability relies on the DB Sync Node List 521 depicted and described with respect to the database synchronization capability.

In one embodiment, for example, a node 110, upon receiving a database update configured via a provisioning process, pushes the database update data to one or more other nodes 110 for which database synchronization is to be maintained (e.g., the nodes 110 listed in the DB Sync Node List 521 of the node 110 that received the database update). In one such embodiment, the node 110 pushes the database update data using database update request messages (e.g., (DBEQ_UPDATE_REQ, as described herein with respect to the database synchronization capability), where each database update request message includes: (1) a database transaction identifier, (2) an IP address of the originating node 110 pushing the database update (e.g., denoted as OriginatingNodeIP), (3) an organization name of the originating node 110, which is optional (e.g., denoted as OriginatingNodeOrgName), (4) a table identifier, and (5) an indication of the database update.

In one embodiment, a node 110 receiving a database update request message generated for a database update push performs the following:
(1) The node 110 updates its own database 411 based on the information included within the database update request message.
(2) The node 110 checks the database transaction identifier of the database update request message against a list of recent database transaction identifiers (denoted herein as a Recent DB Transaction Identifier List) maintained by the node 110.
　(a) If the transaction identifier of the database update request message is included in the Recent DB Transaction Identifier List, node 110 discards the database update request message in order to prevent a forwarding loop from forming.
　(b) If the transaction identifier of the database update request message is not included in the Recent DB Transaction Identifier List, node 110 saves the transaction identifier of the database update request message in the Recent DB Transaction Identifier List and forwards the database update request message to the neighbor nodes 110 listed in the DB Sync Node List 521 of the node 110 (excluding the node 110 from which the database update request message was received).

In one embodiment, a token-based database synchronization capability is provided.

In one embodiment, for a given cluster of nodes 110 and for a given organization with which nodes 110 of the cluster are associated, database synchronization is performed to each node 110 within the organization across the cluster, even though, for any given node 110 of the cluster, messaging is performed only to neighbor nodes of the given node 110. A reason for this is that modifications of existing data and additions of new data are propagated within the network. For example, if a given user is deleted from a subscriber database on one node of the cluster, but this information was not propagated to other nodes of the cluster, it becomes possible that the given user may be erroneously authenticated in the next deployment of the node where only the non-updated nodes are present.

In one embodiment, for a given cluster of nodes 110, a given node 110 needs knowledge only of other nodes 110 of the cluster that are neighbors of the given node 110. In this sense, while synchronization is performed cluster wide, each given node 110 only needs to be concerned with synchronization with other nodes 110 of the cluster that are neighbors of the given node 110.

In one embodiment, when a node joins a cluster, the joining node sends a token configured to lock the other nodes of the cluster before the joining node begins database synchronization. In one such embodiment, the token is configured to lock the database synchronization mechanism on the other nodes of the cluster, not to lock the databases on the other nodes of the cluster. The token ensures that the cluster is in a stable state, with respect to database synchronization, prior to initiation of database synchronization, thereby ensuring that database comparisons between the new node that issued the token and its neighbor node(s) are representative of the database state of the new node with respect to any other node in the cluster. In this manner, use of tokens protects against concurrent database synchronizations being initiated by multiple nodes of the cluster at or about the same time, thereby avoiding conflicts when multiple nodes join the cluster at the same or about the same time and, thus, ensuring that the database synchronization is performed in an orderly fashion. The use of tokens obviates the need for a new node of a cluster to perform comparisons with every other node of the cluster. In one embodiment, the token includes an IP address of the originating node, a transaction identifier for the token, and a timestamp of the token. In one embodiment, when multiple tokens are sent by different nodes when joining a cluster, the token having the earliest associated timestamp locks the cluster and the node that sent that token begins database synchronization first. In one embodiment, during the time when database synchronization is taking place in a cluster, a newly joining node issuing a token receives an indication that the cluster is locked, thereby indicating to the newly joining node that the token should be re-sent at a later time (e.g., after a set time period).

These and various other embodiments of the token-based database synchronization capability may be better understood by way of reference to FIGS. 16-24.

Figure 16:
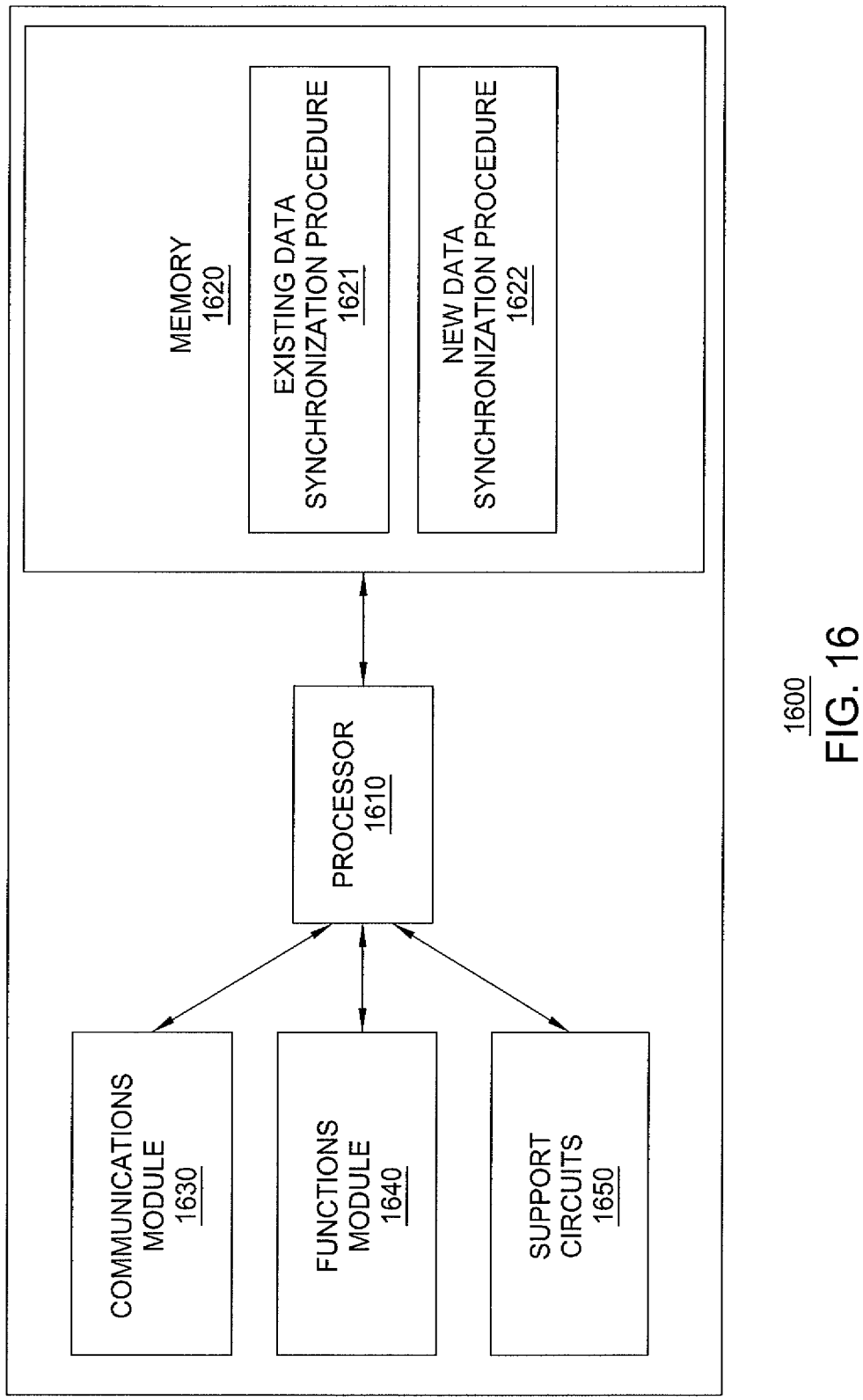
FIG. 16 depicts an exemplary node configured for providing a token-based database synchronization capability.

FIG. 16 depicts an exemplary node configured for providing a token-based database synchronization capability.

As depicted in FIG. 16, the node 1600 includes a processor 1610, a memory 1620, a communications module 1630, a functions module 1640, and support circuits 1650. The memory 1620, communications module 1630, functions module 1640, and support circuits 1650 each communicate with processor 1610. Although omitted for purposes of clarity, it will be appreciated that any of the modules of node 1600 may communicate with any other modules of node 1600 in any suitable manner for providing functions described herein.

The configuration and operation of node 1600 may be in accordance with any suitable network element which may participate in the database synchronization capability depicted and described herein. In one embodiment, the configuration and operation of node 1600 is similar to that of the exemplary 911-NOW node 110 of FIG. 1 (e.g., with processor 1610 being similar to processor 340, memory 1620 being similar to memory 350, communications module 1630 and functions module 1640 being similar to functions module 301, and support circuits 1650 being similar to support circuits 360).

The configuration and operation of node 1600 may be adapted for use with the token-based database synchronization capability in any suitable manner. In one embodiment, as depicted in FIG. 16, memory 1620 stores information configured for use by node 1600 in providing the token-based database synchronization capability. In one embodiment, for example, memory 1620 stores an Existing Data Synchronization Procedure 1621 and a New Data Synchronization Procedure 1622. It will be appreciated that memory 1620 may store any other suitable information (e.g., such as programs 351, applications 352, support data 353, and/or user data 354 as depicted and described with respect to FIG. 3, and/or any other suitable information).

The Existing Data Synchronization Procedure 1621 for a given node is used by the given node to perform database synchronization for existing data. Various embodiments of the Existing Data Synchronization Procedure 1621 are depicted and described with respect to FIGS. 17-21 and 25-27.

The New Data Synchronization Procedure 1622 for a given node is used by the given node to perform database synchronization for new data updates. Various embodiments of the New Data Synchronization Procedure 1622 are depicted and described with respect to FIGS. 22-24.

In one embodiment, a token-based database synchronization process (e.g., Existing Data Synchronization Procedure 1621 and/or New Data Synchronization Procedure 1622) may be initiated in response to any suitable trigger condition. In one embodiment, a database synchronization process is initiated in response to a join condition (e.g., a node joins a cluster, a cluster merges with another cluster, and the like). In one embodiment, the database synchronization process is initiated in response to a data update condition (e.g., an update of the data in the database tables which are synchronized). In general, at least a portion of the synchronization steps performed in response to these two conditions may be different since the first condition (i.e., the join condition) is a synchronization of existing data in which comparisons and possibly merges of entire database tables may be performed, whereas the second condition (i.e., the data update condition) is a synchronization of new updates that may only require pushing of the data update to all of the other associated nodes. It will be appreciated that a database synchronization process may be initiated in response to other types of trigger conditions.

In one embodiment, token-based database synchronization supports synchronization of existing data. In one such embodiment, synchronization of existing data is provided using the Existing Data Synchronization Procedures 1621 of nodes 110. Various embodiments for token-based synchronization of existing data are depicted and described with respect to FIGS. 17-21 and 25-27.

Figure 17:
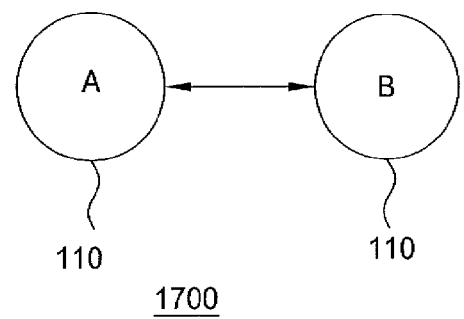
FIG. 17 depicts an exemplary network for illustrating database synchronization of existing data when a first node joins a second node where both nodes belong to the same organization.

FIG. 17 depicts an exemplary network for illustrating database synchronization of existing data when a first node joins a second node where both nodes belong to the same organization.

As depicted in FIG. 17, exemplary network 1700 includes two nodes 110. The exemplary network 1700 is formed when node A joins node B. In this example, assume that nodes A and B belong to the same organization.

In one embodiment, the database synchronization procedure for a network, such as exemplary network 1700, includes the following steps:

(1) Node A performs mesh network entry and establishes connectivity with node B. This may include mutual authentication between node A and node B. In one embodiment, in which node A includes a mesh component for performing mesh network entry and a database synchronization component for performing database synchronization processing, the mesh component of node A informs the database synchronization component of node A that node A has entered the mesh network.

(2) Node A sends a request for database checksums to all of its one-hop neighbor nodes (in this example, only node B).

(3) Node B responds to the request for database checksums from node A by sending its database checksums to node A.

(4) Node A compares the database checksums of node A and the database checksums received from node B in order to determine if the database of node A and the database of node B are currently synchronized.

(5) Node A, if the compared database checksums are the same, determines that no further action is required.

(6) Node A, if the compared database checksums are different, initiates a database synchronization process including the following steps:

(a) Node A sends, to each one-hop neighbor of node A (in this case, only node B), a token indicative that node A wants to begin database synchronization. The token may include any information suitable for use in providing the token-based distributed database synchronization capability depicted and described herein. In one embodiment, for example, the token includes the following information: (i) an organization name (the organization name of the organization to which node A belongs); (ii) a transaction identifier (e.g., a board serial number and the timestamp of the time at which the database synchronization is taking place, or any other information suitable for providing a unique identifier); and (iii) a source IP address (the source IP address of the originating node, i.e., node A). The token may include less or more (as well as different) information.

(b) Node B sends, back to node A, an acknowledgement indicating that, at least from the perspective of node B, no database synchronization is currently being performed (i.e., the cluster is in a stable state with respect to database synchronization and, thus, node A can proceed with the database synchronization).

(c) Node A sends, to node B, a request for a transfer of the database tables (and/or subsets of tables, depending on the level of granularity of the database checksums) that are not synchronized (based on the comparison performed at Step 4).
(d) Node B sends the requested data to node A. Node B may send the requested data using any suitable technique for transferring such data (e.g., using messaging, using a file transfer protocol such as FTP or SFTP, and the like). Node B may compress the data prior to transmitting the data to node A.
(e) Node A compares the existing data of node A with the transferred data received from node B.
(f) Node A merges the existing data of node A with the transferred data received from node B.
(g) Node A determines whether any of the existing data of node A is more recent than any of the transferred data received from node B.
  (i) If the transferred data received from node B is more up to date than the existing data of node A, no further action is required. In this case, node A sends, to node B, a message releasing the database synchronization token.
  (ii) If any of the existing data of node A is more recent than any of the transferred data received from node B, the following steps may be performed: (a) node A pushes the merged data back to node B, (b) node B updates its table(s) with the merged data received from node A, and (c) node B sends, to node A, a message indicating that node B has completed the process, and (d) node A sends, to node B, a message releasing the database synchronization token.

Figure 18:
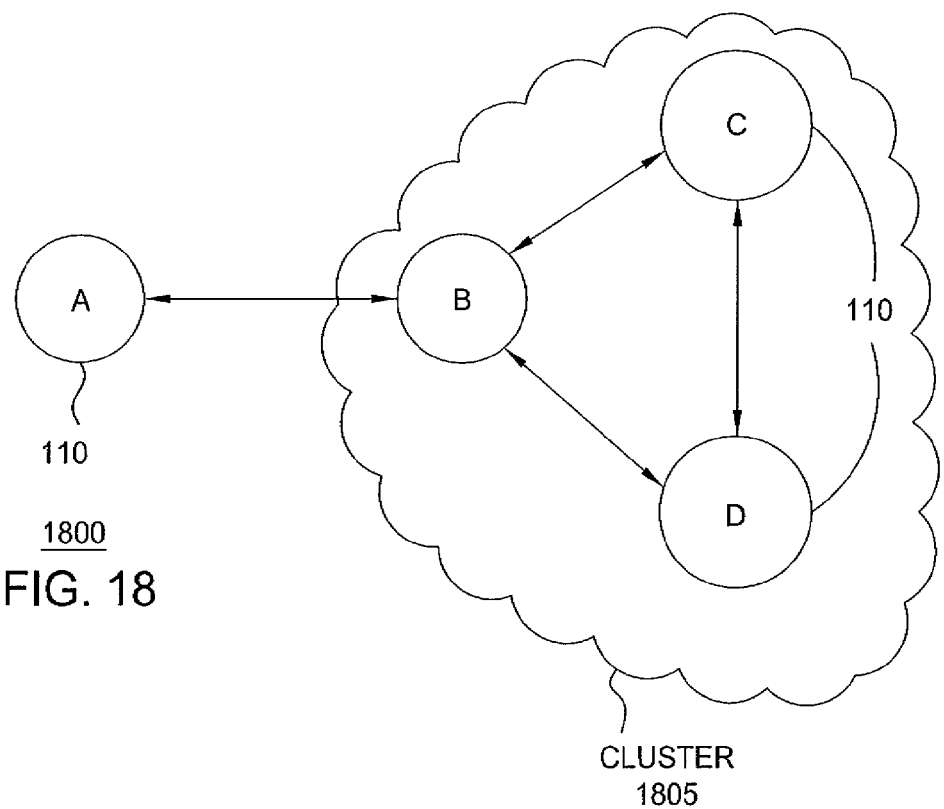
FIG. 18 depicts an exemplary network for illustrating database synchronization of existing data when a first node joins a second node that is a member of a cluster including at least one additional node, and where all nodes belong to the same organization.

FIG. 18 depicts an exemplary network for illustrating database synchronization of existing data when a first node joins a second node that is a member of a cluster including at least one additional node, and where all nodes belong to the same organization.

As depicted in FIG. 18, exemplary network 1800 is formed when a node A joins a cluster 1805 having a plurality of nodes 110 (illustratively, nodes B, C, and D, which are connected in a full mesh topology). In this example, joining node A and existing nodes B, C, and D belong to the same organization.

In one embodiment, the database synchronization procedure for a network, such as exemplary network 1800, includes the following steps:
  (1)-(5) These steps are the same as steps 1-5 as described with respect to the embodiment of FIG. 17.
  (6) Node A, if the checksums are different, initiates a database synchronization process including the following steps:
    (a) Node A sends, to each one-hop neighbor of node A (in this case, only node B), a token indicative that node A wants to begin database synchronization. The token may include any information suitable for use in providing the token-based distributed database synchronization capability depicted and described herein. In one embodiment, for example, the token includes the following items: (i) an organization name (the organization name of the organization to which node A belongs); (ii) a transaction identifier (e.g., a board serial number and the timestamp of the time at which the database synchronization is taking place, or any other information suitable for providing a unique identifier); and (iii) a source IP address (the source IP address of the origination node, i.e., node A). The token may include less or more information, including different information.
    (b) Node B, upon receiving the token from node A, determines whether node B already has a token from another node.
      (i) If node B already has another token from another node of the cluster (e.g., from node C if node C was performing a database synchronization), node B replies to node A with an indication that a database synchronization is already in process and that node A is to wait a period of time before attempting synchronization again.
      (ii) If node B does not already have a token from another node of the cluster, Node B forwards the token received from node A to all of its one-hop neighbors (in this example, nodes C and D), which in turn forward the token to their one-hop neighbors, and so forth, until the token from node A is propagated to all nodes of the cluster (e.g., in this example, node C forwards the token to node D and node D forwards the token to node C). During propagation of the token within the cluster, if a node has already received the token from one of its neighbors, it ignores the token if it receives that token from any other neighbor(s).
    (c) Node B, upon determining that no database synchronization is being performed within the cluster, sends back to node A an acknowledgement indicating that no database synchronization is currently being performed (i.e., the cluster is in a stable state with respect to database synchronization and, thus, node A can proceed with the database synchronization). Node B determines that no database synchronization is being performed within the cluster via acknowledgment messages exchanged as part distribution of the token within the cluster. During propagation of the token within the cluster, each neighbor receiving a token will forward a corresponding acknowledgment message to the neighbor from which the token was received. Once a node reaches a point at which (a) the node does not have any additional neighbor nodes to which it can send the token and (b) the node has received acknowledgment from all of the neighbor nodes to which it forwarded the token, the node sends an acknowledgment to the neighbor node from which the node received the token. In this manner, acknowledgments are propagated back toward the node from which the token originated, for indicating to the originating node that no database synchronization is currently being performed within the cluster and, thus, that the originating node can proceed with its database synchronization. In this example, acknowledgments are sent from nodes C and D to node B; and node B, upon receiving the acknowledgements, sends an acknowledgement to node A to indicate to node A that it can proceed with its database synchronization.
    (d) Node A sends, to node B, a request for a transfer of the database tables (and/or subsets of tables, depending on the level of granularity of the checksums) that are not aligned (based on the comparison at Step 4).
    (e) Node B sends the requested data to node A. Node B may send the requested data using any suitable technique for transferring such data (e.g., using messaging, using a file transfer protocol such as FTP or SFTP, and the like). Node B may compress the data prior to transmitting the data to node A.
    (f) Node A compares the existing data of node A with the transferred data received from node B.

(g) Node A merges the existing data of node A with the transferred data received from node B.

(h) Node A determines whether any of the existing data of node A is more recent than any of the transferred data received from node B.

(i) If the transferred data received from node B is more up to date than the existing data of node A, no further action is required. In this case, node A sends, to node B, a message releasing the database synchronization token.

(ii) If any of the existing data of node A is more recent than any of the transferred data received from node B, the following steps may be performed: (a) node A pushes the merged data back to node B, (b) node B updates its table(s) with the merged data received from node A, (c) node B pushes the merged data to each of the nodes from which node B received an acknowledgment message during propagation of the token (which in turn update their data with the merged data and iteratively push the merged data to their acknowledged neighbors, until the merged data is propagated to all nodes of the cluster), (d) node B (as well as other nodes of the cluster) waits to receive, from its neighbors, acknowledgments that the synchronization of the merged data is complete, such that acknowledgment that synchronization of the merged data is complete is propagated back toward node A which originated the token, (e) node B, upon receiving acknowledgments from each of its neighbor nodes (in this case, nodes C and D) sends, to node A, a message indicating that the database synchronization process is complete, and (f) node A sends, to node B, a message releasing the database synchronization token.

In effect, this process is performing database synchronization along a topology tree that was established via the token distribution process, in this case with node A being the head of the topology tree. This eliminates the passing of the possibly large merged table(s) to nodes which may have already received the merged table(s) from other neighbors (e.g., between nodes C and D), and thereby further reduces the traffic on the wireless links between nodes of the cluster 1805.

Figure 19:
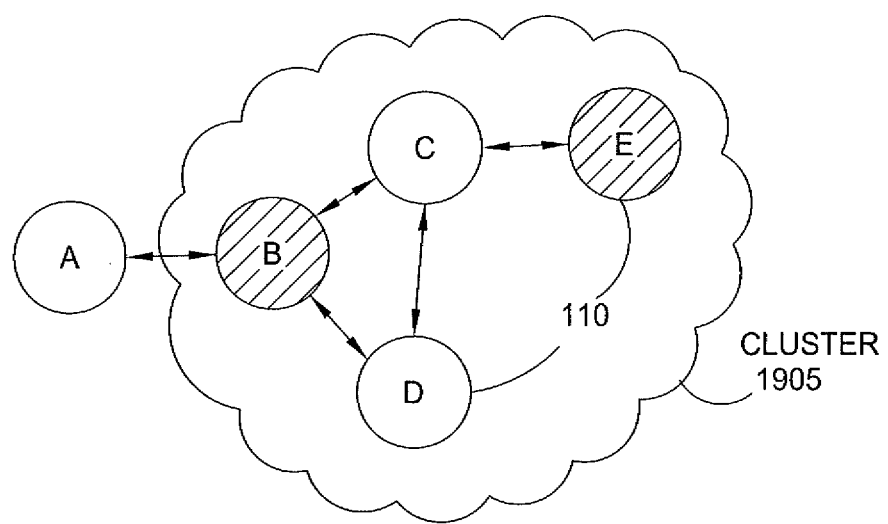
FIG. 19 depicts an exemplary network for illustrating database synchronization of existing data when a first node joins a second node that is a member of a cluster including at least one additional node, and where the nodes of the cluster belong to two or more different organizations.

FIG. 19 depicts an exemplary network for illustrating database synchronization of existing data when a first node joins a second node that is a member of a cluster including at least one additional node, and where the nodes of the cluster belong to two or more different organizations.

As depicted in FIG. 19, exemplary network 1900 is formed when a node A joins a cluster 1905 having a plurality of nodes 110 (illustratively, nodes B, C, D, and E). In cluster 1905, nodes B, C, and D are interconnected via a full mesh topology, and node E is connected to node C. In this example, joining node A and existing nodes C and D belong to a first organization, and existing nodes B and E belong to a second organization.

In one embodiment, the database synchronization procedure for a network having multiple organizations (such as exemplary network 1900) includes steps substantially similar to the steps of the database synchronization procedures described with respect to the case of a single organization (i.e., with respect to FIG. 18).

In one embodiment, in which the joining node and the neighbor node (via which the joining node joins the cluster) belong to different organizations, upon receiving a token from the joining node, the neighbor node forwards the token to its neighbor nodes, but does not perform the actual database synchronization process. This enables the creation of a topology tree even when nodes of other organizations are immediate neighbors of the joining node and/or interleaved within the cluster. This is depicted in FIG. 19, in which node A (the joining node) and node E (the neighbor node via which the joining node joins the cluster 1905) belong to different organizations.

In one embodiment, in which a node that receives the token (1) does not belong to the same organization as the node from which the token originated and (2) has no neighbors to which to forward the received token, the node receiving the token replies to the token with a negative acknowledgment (NACK). This effectively prunes the topology tree so that no data transfers need to be performed between the node that forwards the token and the node that receives the token. This is depicted in FIG. 19, where node E, upon receiving the token from node C, replies to node C with a NACK, thereby pruning the branch of the topology tree that would otherwise be created between nodes C and E (such that no data needs to be transferred from node C to node E).

In the case in which a cluster includes multiple organizations, database synchronizations may only be performed for a single organization at a time or for different organizations concurrently.

Figure 20:
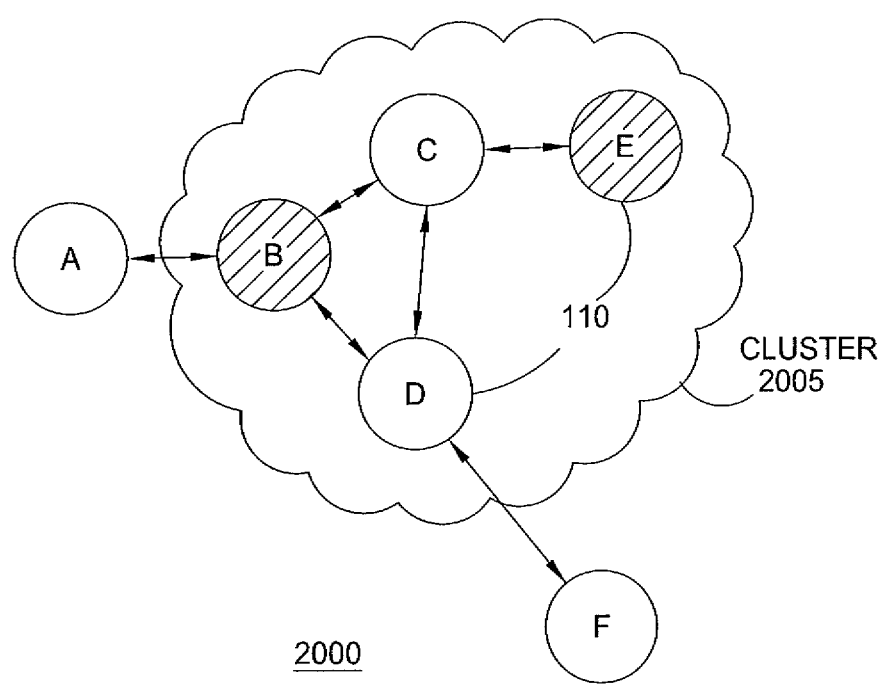
FIG. 20 depicts database synchronization as depicted and described with respect to FIG. 19, illustrating token collisions when two nodes are joining the cluster.

FIG. 20 depicts database synchronization as depicted and described with respect to FIG. 19, illustrating token collisions when two nodes are joining the cluster.

As depicted in FIG. 20, exemplary network 2000 is formed when nodes A and F each join a cluster 2005 having a plurality of nodes 110 (illustratively, nodes B, C, D, and E). In cluster 2005, nodes B, C, and D are interconnected via a full mesh topology, and node E is connected to node C. In this example, node A is joining via node B and node F is joining via node D. In this example, joining nodes A and F and existing nodes C and D belong to a first organization, and existing nodes B and E belong to a second organization.

In one embodiment, the database synchronization procedure for a network having multiple organizations where two nodes are joining a cluster (such as exemplary network 2000) includes steps substantially similar to the steps of the database synchronization procedures described with respect to the cases in which a single node is joining a cluster and the nodes belong to a single organization (i.e., with respect to FIG. 18) and multiple organizations (i.e., with respect to FIG. 19).

As depicted in FIG. 20, nodes A and F are joining the cluster 2005 via different neighbor nodes 110. In this example, assume that node A has started to propagate a token through the cluster 2005 when node F joins, but the token of node A has not yet reached node D and, thus, node D accepts the token from node F. Upon receiving the token of node A (e.g., from node B), node D compares the timestamp of the token of node A with the timestamp of the token of node F and selects the token having the earlier timestamp.

If the token from node A is earlier than the token from node F, node D responds to node F with a message indicative that a database synchronization process is already in progress. In this case, node D knows that it has an unsynchronized relationship with node F and, thus, node D will not forward the token of node A to node F; rather, the synchronization with node F will need to be restarted from the beginning, just in case node D and node F are synchronized after the node A synchronization has been completed (as would be the case if nodes A and F are in the same organization and more up to date that nodes B, C, D, and E).

If the token from node F is earlier than the token from node A, node D (1) responds to node B with a message indicative that a database synchronization process is already in progress, and node B then propagates the message to node A, and (2) forwards the token from node F in the usual manner as described herein.

Although primarily described with respect to the case in which the token collision occurs at a neighbor node 110 at the edge of the cluster 2005, even if the token collision occurs deeper within the cluster 2005, the earlier token will be selected over the later token.

Figure 21:
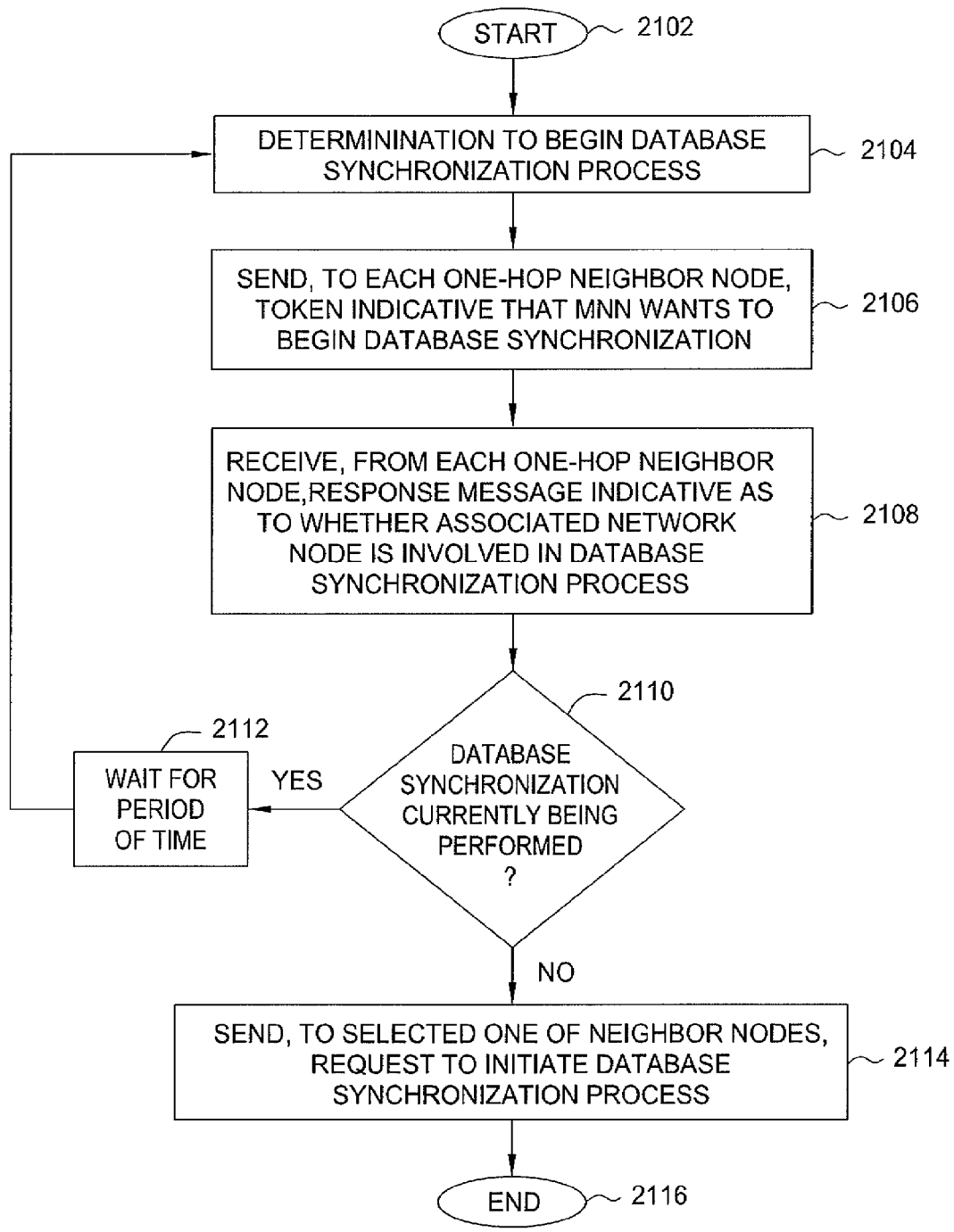
FIG. 21 depicts one embodiment of a method for database synchronization of existing data using token-based database synchronization.

FIG. 21 depicts one embodiment of a method for database synchronization of existing data using token-based database synchronization. The method 2100 is executed by a mobile network node. At step 2102, method 2100 begins. At step 2104, the mobile network node makes a determination to begin a database synchronization process. At step 2106, the mobile network node sends, to each of its one-hop neighbor nodes, a token that is indicative that the mobile network node wants to begin database synchronization. At step 2108, the mobile network node receives, from each of its one-hop neighbor nodes, a response message indicative as to whether the associated network node is involved in a database synchronization process. At step 2110, a determination is made, by the mobile network node using the received response message(s), as to whether any other database synchronization process is currently being performed. If at least one database synchronization process is being performed, method 2100 proceeds to step 2112, at which point the mobile network node waits a period of time before reattempting database synchronization, and then returns to step 2104 at which point the mobile network node makes a determination to begin the database synchronization process again. If no other database synchronization process is being performed, method 2100 proceeds to step 2114, at which point the mobile network node sends, to a selected one of its neighbor nodes, a request to initiate a database synchronization process for synchronizing databases. From step 2114, method 2100 proceeds to step 2116, at which point method 2100 ends.

In one embodiment, token-based database synchronization supports synchronization of new data updates. In one such embodiment, synchronization of new data updates is provided using the New Data Synchronization Procedures 1622 of nodes 110. Various embodiments for token-based synchronization of new data updates are depicted and described with respect to FIGS. 22-24.

In general, during or after the synchronization of existing data (as depicted and described with respect to FIGS. 17-21), any new database updates on any nodes 110 may be propagated to all nodes 110 within the same organization.

In one embodiment, synchronization of existing data takes precedence over synchronization of new data updates. This may be implemented at any suitable level of granularity. For example, even if database tables are locking on a per-row level for database merges on the tables, new data updates may be prevented from being executed on the tables.

In one embodiment, for each new database update transaction performed on a node 110, an indication of the database update transaction is stored in the database 411 of the node 110. The indications of the database update transactions may be maintained in any suitable manner. In one embodiment, for example, the node 110 may maintain a separate database table configured for storing indications of database update transactions. The indications of the database update transactions may include any information suitable for use in enabling the node 110 to synchronize with other nodes 110 based on the database update transactions. In one embodiment, for example, the indication of a database update transaction may include primary key information and a time at which the database update transaction was executed.

In one embodiment, each node 110 periodically checks the indications of database update transactions (e.g., periodically check the database table that stores the indications of database update transactions) for new database update transactions (e.g., ones performed since the last check). In this embodiment, the database update transactions of a node 110 may be checked with any suitable frequency (e.g., every five seconds, every thirty seconds, or with any other suitable frequency). In one embodiment, the frequency with which the node 110 checks the database update transactions may be configurable. A node 110, upon identifying a new database update transaction during the periodic check, initiates a process by which the node 110 informs its neighbor node(s) 110 of the new database update transaction for purposes of replicating the database update transaction to its neighbor node(s) 110. A node 110 may information its neighbor node(s) 110 of a new database update transaction in any suitable manner. In one embodiment, for example, a node 110 may information its neighbor node(s) 110 of a new database update transaction using a secure file transfer mechanism in which the transferred file includes transaction SQL commands, a transaction identifier, and an organization name of the organization to which the node 110 belongs. A node 110 may information its neighbor node(s) 110 of a new database update transaction in any other suitable manner.

Figure 22:
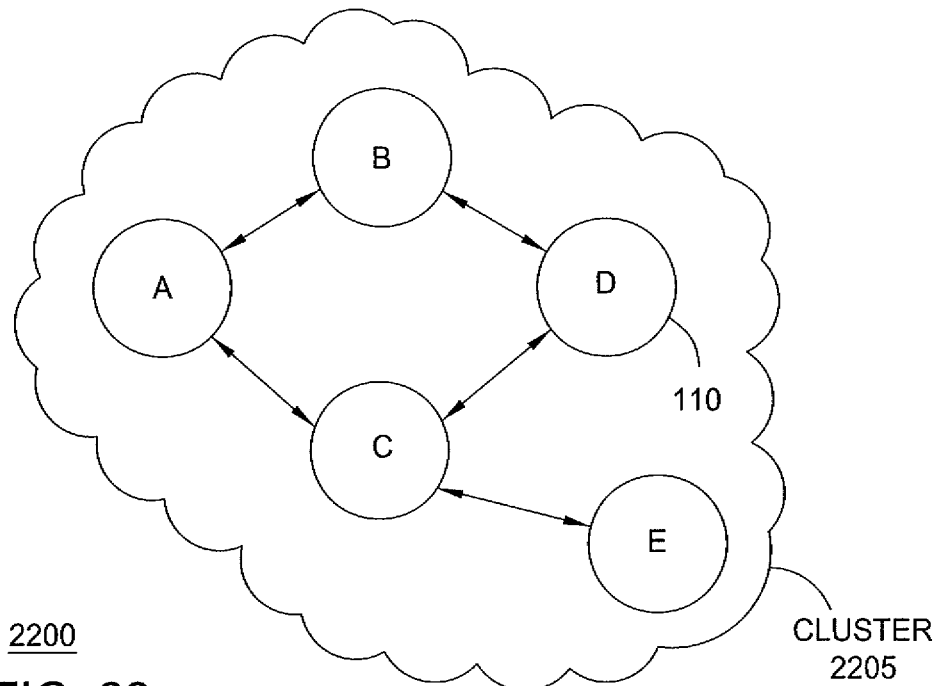
FIG. 22 depicts a network illustrating database synchronization of new data updates when the nodes of a cluster belong to the same organization.
Figure 23:
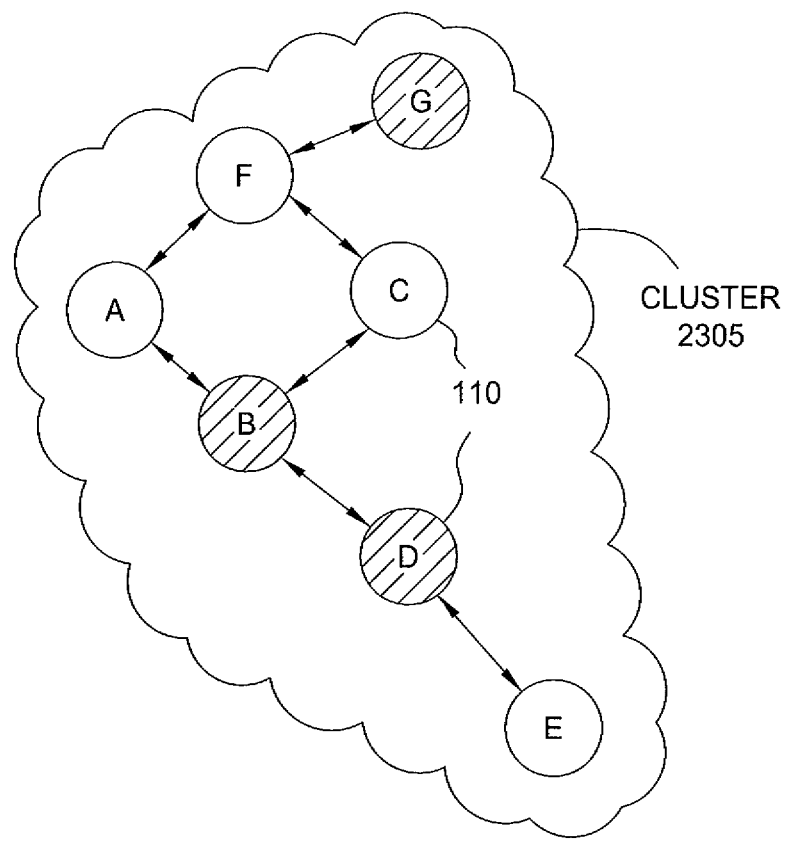
FIG. 23 depicts an exemplary network illustrating database synchronization of new data updates when the nodes of a cluster belong to different organizations.
Figure 24:
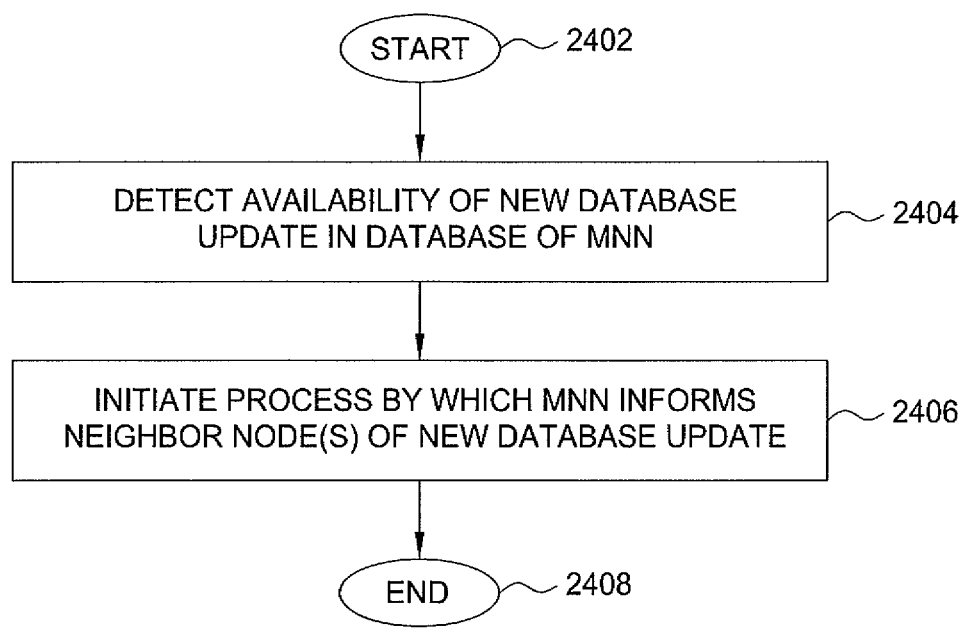
FIG. 24 depicts one embodiment of a method for database synchronization of new data updates using token-based database synchronization.

These and various other embodiments of database synchronization of new data updates may be better understood by way of reference to FIG. 22-FIG. 24.

FIG. 22 depicts a network illustrating database synchronization of new data updates when the nodes of a cluster belong to the same organization.

As depicted in FIG. 22, the network 2200 includes a cluster 2205 including five nodes 110 (denoted as nodes A, B, C, D, and E) belonging to the same organization. The nodes 110 are arranged such that nodes B and C are neighbors of node A, nodes A and D are neighbors of node B, nodes A and D are neighbors of node C, nodes B and C are neighbors of node D, and node C is a neighbor of node E.

In one embodiment, in which a database update is taking place at node A, the database synchronization procedures include the following steps:

(1) Node A, since it does not have any knowledge of the organization(s) to which nodes B and C belong, sends an update token to node B and node C. The update token includes any information suitable for use in facilitating the database synchronization for new data updates. In one embodiment, for example, the update token includes: (a) the organization name of node A, (b) a transaction identifier, and (c) an originating node address (e.g., the IP address of node A). The update token may include less or more information as needed or desired.

(2) Nodes B and C, upon receiving the update token from node A, each perform two determinations as follows: (a) a determination as to whether the received update token is for the organization to which the node belongs and (b) a determination as to whether this is the first time the node receives this token with that transaction identifier.

(3) Nodes B and C, when both determinations are positive (i.e., the organization is the same and this is the first time the token is received), send an acknowledgment message to node A. The acknowledgments sent from nodes B and C are adapted for indicating, to node A, that node A should send the database update transaction.

(4) Node A, upon receiving the acknowledgments from nodes B and C, initiates a database update transaction for updating the databases of nodes B and C. In one embodiment, node A sends database transaction commands (e.g., a transactional SQL command or any other suitable command) to nodes B and C, respectively, for updating the databases of nodes B and C. In one embodiment, the database transaction commands are sent using a secure file transfer mechanism.
  (a) If this transaction has not previously been executed on the nodes (i.e., nodes B and C), the nodes receive the respective database transaction commands and execute the respective database transaction commands. If execution of the database transaction command on the node is successful, the node replies to node A with an acknowledgment. If the execution of the database transaction command on the node is unsuccessful, the node replies to node A with a NACK.
  (b) If this transaction has already been executed on one of the nodes (i.e., node B or node C), the node replies to node A with a duplicate transaction acknowledgment, and no further action is taken by the node (i.e., node B or C).
(5) Node B modifies the update token from node A and forwards the modified update token to node D, and node C modifies the update token from node A and forwards the modified update token to nodes D and E. Nodes B and C modify the update token by changing the originating node IP address included within the tokens as follows: node B changes the originating node IP address from the IP address of node A to the IP address of node B, and node C changes the originating node IP address from the IP address of node A to the IP address of node C.
  (a) Node D receives the modified update tokens from nodes B and C. If the update token from node B arrives at node D before the update token from the node C, node D discards the update token received from node C and sends a duplicate token message back to node C. Similarly, if the update token from node C arrives at node D before the update token from the node B, node D discards the update token received from node B and sends a duplicate token message back to node B.
  (b) Node E receives the update token from node C.
(6) Nodes D and E, upon receiving the update tokens, each perform two respective determinations as follows: (a) a determination as to whether the received update token is for the organization to which the node belongs and (b) a determination as to whether this is the first time the node receives this token with that transaction identifier.
(7) Nodes D and E, when both determinations are positive (i.e., the organization is the same and this is the first time the token is received), send acknowledgment messages to nodes B and C, respectively. The acknowledgments sent from nodes D and E are adapted for indicating to nodes B and C that they should send database update transactions to nodes D and E, respectively.
(8) Nodes B and C, upon receiving the acknowledgments from nodes D and E, respectively, initiate respective database update transactions for updating the databases of nodes D and E, respectively. In one embodiment, nodes B and C send database transaction commands (e.g., a transactional SQL commands or any other suitable commands) to nodes D and E, respectively, for updating the databases of nodes D and E. In one embodiment, the database transaction commands are sent using a secure file transfer mechanism.
  (a) If this transaction has not previously been executed on the nodes (i.e., nodes D and E), the nodes receive the respective database transaction commands and execute the respective database transaction commands. If execution of the database transaction command on the node is successful, the node replies to the originating node (e.g., node D replies to node B and node E replies to node C) with an acknowledgment. If the execution of the database transaction command on the node is unsuccessful, the node replies to the originating node (e.g., node D replies to node B and node E replies to node C) with a NACK.
  (b) If this transaction has already been executed on one of the nodes (i.e., node D or node E), the node replies to the originating node (e.g., node D replies to node B and node E replies to node C) with a duplicate transaction acknowledgment.

FIG. 23 depicts an exemplary network illustrating database synchronization of new data updates when the nodes of a cluster belong to different organizations.

As depicted in FIG. 23, the exemplary network 2300 includes a cluster 2305 having seven nodes 110 (denoted as nodes A, B, C, D, E, F, and G). The nodes A, C, E, and F belong to a first organization, and the nodes B, D, and G belong to a second organization (or any other organization other than the first organization). The nodes 110 are arranged such that: (a) nodes B and F are neighbors of node A; nodes A, C, and D are neighbors of node B; (b) node B and F are neighbors of node C; (c) nodes B and E are neighbors of node D; (d) node D is a neighbor of node E; (e) nodes A, C, and G are neighbors of node F; and (f) node F is a neighbor of node G.

In one embodiment, in which a database update is taking place at node A, the database synchronization procedures include the following steps:
  (1) Node A, since it does not have any knowledge of the organization(s) to which nodes B and F belong, sends an update token to node B and node F. The update token includes any information suitable for use in facilitating the database synchronization for new data updates. In one embodiment, for example, the update token includes: (a) the organization name of node A, (b) a transaction identifier, and (c) an originating node address (e.g., the IP address of node A). The update token may include less or more information as needed.
  (2) Node F, upon receiving the update token, recognizes that the token is associated with the same organization to which node F belongs.

In this case, node F performs steps 2-5 of the database synchronization procedures described with respect to FIG. 22 (i.e., in the single organization case).
  (3) Node B, upon receiving the update token from node A, determines that the received update token is for the organization to which node B belongs. Node B then forwards the token to its neighbor nodes (i.e., nodes C and D).
  (4) Processing for Node C:
    (a) If the update token from node F arrives at node C before the update token from node B arrives at node C, node C discards the token received from node B, node C replies to node A with a duplicate transaction acknowledgment, and no further action is taken by the node C.
    (b) If the update token from node B arrives at node C before the update token from node F arrives at node C, node C performs the following: (1) indicates to node A that node A should send the database update transaction (e.g., requesting a file transfer for the new update), (2) discards the token received from node F, and (2) sends an acknowledgment to node F.

(c) Node A, upon receiving the acknowledgment from node C, initiates a database update transaction for updating the database of node C. In one embodiment, node A sends a database transaction command (e.g., a transactional SQL command or any other suitable command) to node C for updating the databases 411 of node C. In one embodiment, the database transaction command is sent using a secure file transfer mechanism.

(i) If this transaction has not previously been executed on node C, node C receives the database transaction command and executes the database transaction command. If execution of the database transaction command on node C is successful, node C replies to node A with an acknowledgment. If the execution of the database transaction command on node C is unsuccessful, node C replies to node A with a NACK.

(ii) If this transaction has already been executed on node C, node C relies to node A with a duplicate transaction acknowledgment.

(5) Processing for Node D: Node D, upon receiving the update token from node B, realizes that the update token is for a different organization. Node D then forwards the update token to its neighbor node (node E).

(6) Processing for Node E: Node E, upon receiving the update token from node D, realizes that the update token is for the same organization. Node E then performs the processing described for node C in Step (4).

In one embodiment, rather than propagating the update token throughout the entire cluster 2305, a cache of the topology may be maintained on each of the nodes 110, such that the nodes 110 do not need to forward the update token in order to identify neighbor nodes 110 belonging to the same organization. In this case, nodes 110 only forward the update token to neighbor nodes 110 known to belong to the same organization, as determined from the cached topology information.

In one such embodiment, the cached topology information may only be maintained for a threshold period of time, after which the cached topology information is not longer considered valid. As long as the cached topology information is valid, the update token is not propagated to in order to identify neighbor nodes belonging to the same organization. After the cache topology information expires, during the next execution of the database synchronization procedure, the update token is again propagated to all of the nodes of the cluster and, as part of this process, the new topology information for the cluster is determined and cached on each of the nodes for use in subsequent executions of the database synchronization procedure (as long as the current cached topology information remains valid).

FIG. 24 depicts one embodiment of a method for database synchronization of new data updates using token-based database synchronization. The method 2400 is executed by a mobile network node. At step 2402, method 2400 begins. At step 2404, the mobile network node detects that a new database update is available in the database of the mobile network node. At step 2406, the mobile network node initiates a process by which it informs its neighbor node(s) of the new database update. At step 2408, method 2400 ends.

The embodiments depicted and described with respect to FIG. 17-23 are primarily directed toward embodiments in which database synchronization is performed when a node joins a single-node or multi-node cluster and in which database synchronization is performed when a single node of a cluster has database updated to provide to other nodes of the cluster.

In addition to such embodiments, in other embodiments two clusters of nodes may join together, in which case the nodes in each cluster are discovered by the nodes of the other cluster. In such embodiments, it may be assumed that, in each cluster, the databases of all of the nodes of the cluster have reached an equilibrium state and are fully synchronized.

In at least some such embodiments, for inter-cluster synchronization that is performed for new updates, the database synchronization procedures of FIGS. 22-23 (described hereinabove) may be utilized.

Figure 25:
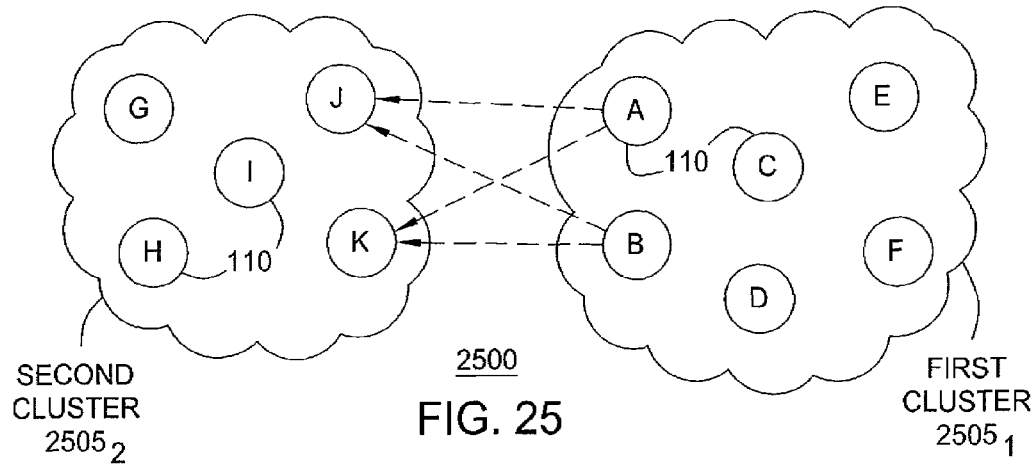
FIG. 25 depicts an exemplary network illustrating database synchronization of existing data when two clusters merge, where all nodes of the two clusters belong to the same organization.
Figure 26:
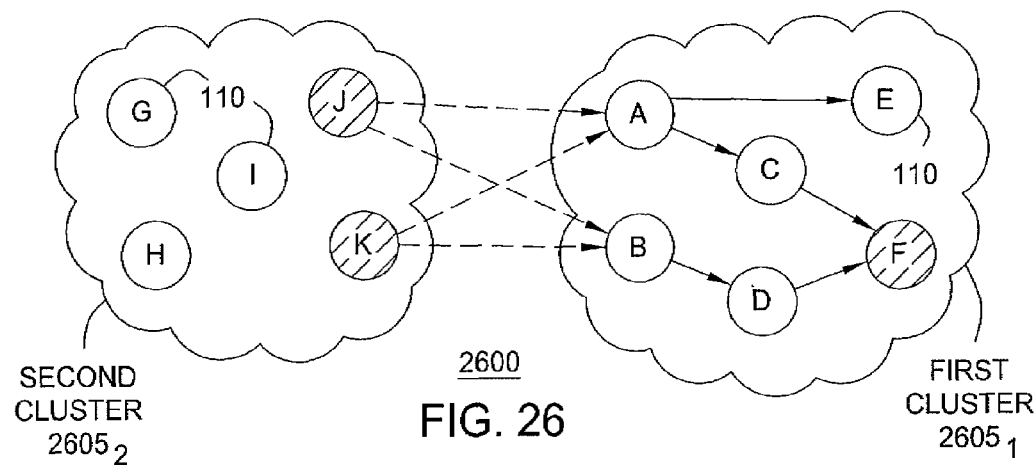
FIG. 26 depicts an exemplary network illustrating database synchronization of existing data when two clusters merge, where nodes of the two clusters belong to different organizations.
Figure 27:
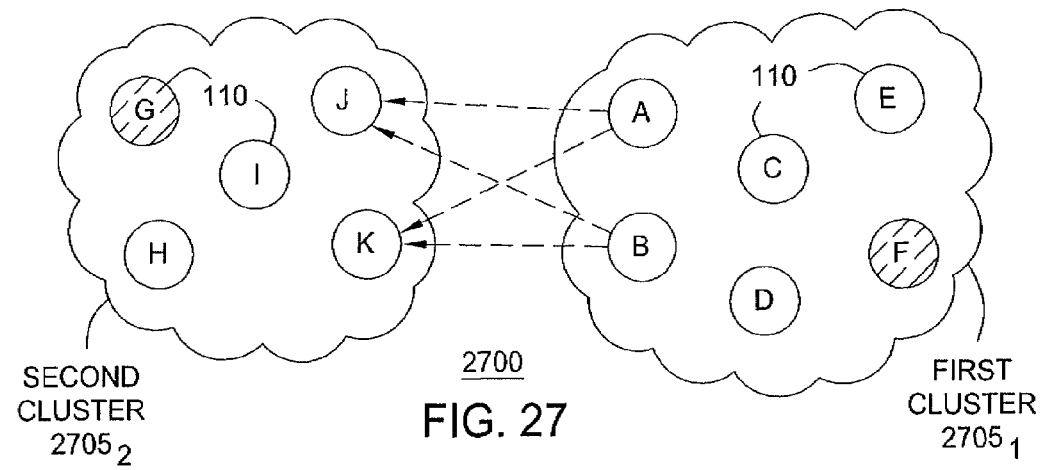
FIG. 27 depicts an exemplary figure illustrating database synchronization of existing data when two clusters merge, where nodes of the two clusters belong to different organizations.

In at least some such embodiments, for inter-cluster synchronization that is performed for existing data, the database synchronization procedures of FIGS. 25-27 (descriptions of which follow) may be utilized.

FIG. 25 depicts an exemplary network illustrating database synchronization of existing data when two clusters merge, where all nodes of the two clusters belong to the same organization.

As depicted in FIG. 25, exemplary network 2500 includes a first cluster 2505$_1$ having six nodes 110 (denoted as nodes A, B, C, D, E, F) and a second cluster 2505$_2$ having five nodes 110 (denoted as nodes G, H, I, J, K). For purposes of clarity, intra-cluster node peering relationships are omitted. In this example, node A discovers nodes J and K while node B also discovers nodes J and K. Node A and Node B each start the synchronization process depicted and described with respect to FIGS. 17-21. Assuming that node C is a one-hop neighbor of node A, node A will know that it previously synchronized with node C and, thus, that it only has to synchronize existing data with node J and node K. In this example, nodes J and K each will receive tokens from nodes A and B. In this case, node J and node K each should be informed that the databases on nodes A and B should be identical and, thus, that node J and node K each only need to synchronize with the databases of one of node A and node B. This may be indicated to nodes J and K in any suitable manner. In one embodiment, for example, the tokens sent from nodes A and B to nodes J and K also may include a cluster identifier such that nodes J and K will know that tokens from nodes A and B are from nodes 110 of the same cluster (namely, first cluster 2505$_1$).

FIG. 26 depicts an exemplary network illustrating database synchronization of existing data when two clusters merge, where nodes of the two clusters belong to different organizations.

As depicted in FIG. 26, exemplary network 2600 includes a first cluster 2605$_1$ having six nodes 110 (denoted as nodes A, B, C, D, E, F) and a second cluster 2605$_2$ having five nodes 110 (G, H, I, J, K). The nodes A, B, C, D, E, G, H, and I belong to a first organization, and the nodes F, J, and K belong to a second organization. For purposes of clarity, intra-cluster node peering relationships are omitted. In this example, node A discovers nodes J and K while node B also discovers nodes J and K. Nodes A and B each start the synchronization process depicted and described with respect to FIGS. 17-21. In this example, nodes J and K each will receive tokens from nodes A and B. In this example, since nodes A and B belong to a different organization than nodes J and K, the tokens would be forwarded by nodes J and K to each of their one-hop neighbor nodes (one or more of nodes I, G, or H). Additionally, nodes J and K would send out tokens to nodes A and B, and the tokens eventually would be propagated across the cluster 2605$_1$ until reaching node F (which is in the same organization as nodes J and K). In this example, node F will receive tokens from nodes J and K, and node F should be informed that the databases on nodes J and K should be identical and, thus, that node F only needs to synchronize with the database 411 of one of node J and node K. This may be indicated to node F in any suitable manner. In one embodiment, for example, the tokens received at node F also may include a cluster identifier such that node F will know that the tokens from nodes J and K are from nodes of the same cluster.

FIG. 27 depicts an exemplary network illustrating database synchronization of existing data when two clusters merge, where nodes of the two clusters belong to different organizations.

As depicted in FIG. 27, an exemplary network 2700 includes a first cluster $2705_1$ having six nodes 110 (denoted as nodes A, B, C, D, E, F) and a second cluster $2705_2$ having five nodes 110 (denoted as nodes G, H, I, J, K). The nodes A, B, C, D, E, H, I, J, and K belong to a first organization, and the nodes F and G belong to a second organization. For purposes of clarity, intra-cluster node peering relationships are omitted. In this example, node F and node G are in the same organization, but cannot discover each other because they are not neighbors (and, thus, neither node F nor node G could trigger database synchronization, because neither node F nor node G knows of the existence of the other). In this example, if the token includes a cluster identifier, node F or node G could receive a token from the other cluster and realize that there is a cluster merge that needs to be executed. Then nodes F and G could send out respective tokens to trigger database synchronization across the clusters for their organization.

In various embodiments of the token-based and/or timer-based database synchronization capabilities, checksums are used for determining which data requires synchronization. It will be appreciated that any suitable levels of checksums may be used for this purpose (database-level, table level, table section-level, and the like as well as various combinations thereof).

In one embodiment, for example, a single checksum may be used for the database (although in at least some embodiments this may be too coarse since all of the database tables would then need to be transferred and compared).

In one embodiment, each table of the database may have an associated checksum such that the transfer and comparison may be performed on a table-by-table basis (although in at least some embodiments this also may be too course since very large tables may have only a small number of changes).

In one embodiment, one or more tables of the database may have multiple checksums associated therewith. The multiple checksums may be associated with a single table in any suitable manner. In one such embodiment, for example, multiple checksums may be associated with a single table by sorting the table by the primary key and dividing the table into sections (e.g., a section is a group of entries for every X records in the table, where X may be any suitable number) and calculating a section checksum for each of the sections. In such embodiments, where comparison of checksums of two sections indicates that the checksums are different, only that delta portion of the database table will need to be synchronized.

It will be appreciated that various combinations of such checksum granularities may be used. It will be further appreciated that any other suitable checksum granularities may be utilized. In one embodiment, the checksum granularities may be refined manually and/or automatically based on various factors such as the number of tables, the sizes of the tables, and the like, as well as various combinations thereof.

In various embodiments of the token-based and/or timer-based database synchronization capabilities, database data being synchronized may be transported between non-neighbor nodes using secure tunneling (e.g., using SSL tunnels or any other suitable secure tunneling capability) such that intermediate nodes are unable to intercept and interpret the data.

The distributed database synchronization capability provides a number of advantages in dynamic networks (e.g., network in which the nodes themselves can move and, therefore, there is uncertainty regarding the bandwidth available on inter-node wireless links at any given time), such as reducing the bandwidth required within the mesh network in order to perform database synchronization, eliminating the funneling effect that results from centralized database synchronization schemes. For example, various embodiments of the distributed database synchronization capability may achieve one or both of: (1) eliminate the group leader node concept and make the mechanism more, if not completely, distributed while still enabling mutual aid and multiple organizations in a given cluster; (2) reduce the traffic on inter-node links (e.g., by reducing the size of the messages exchanged for database synchronization, by reducing the number of messages exchanged for database synchronization, and the like, as well as various combinations thereof). In at least some embodiments, better reduction in the amount of traffic exchanged for providing database synchronization may be achieved by reducing the size of the exchanged messages rather than the number of exchanged messages (e.g., elimination of the transmission of very large database tables will more than make up for the added packet header information that is transmitted if the number of transmitted messages increases).

Although primarily depicted and described herein as 911-NOW nodes, it will be appreciated that the 911-NOW nodes also may be referred to as Rapidly Deployable Nodes (RDNs).

Figure 28:
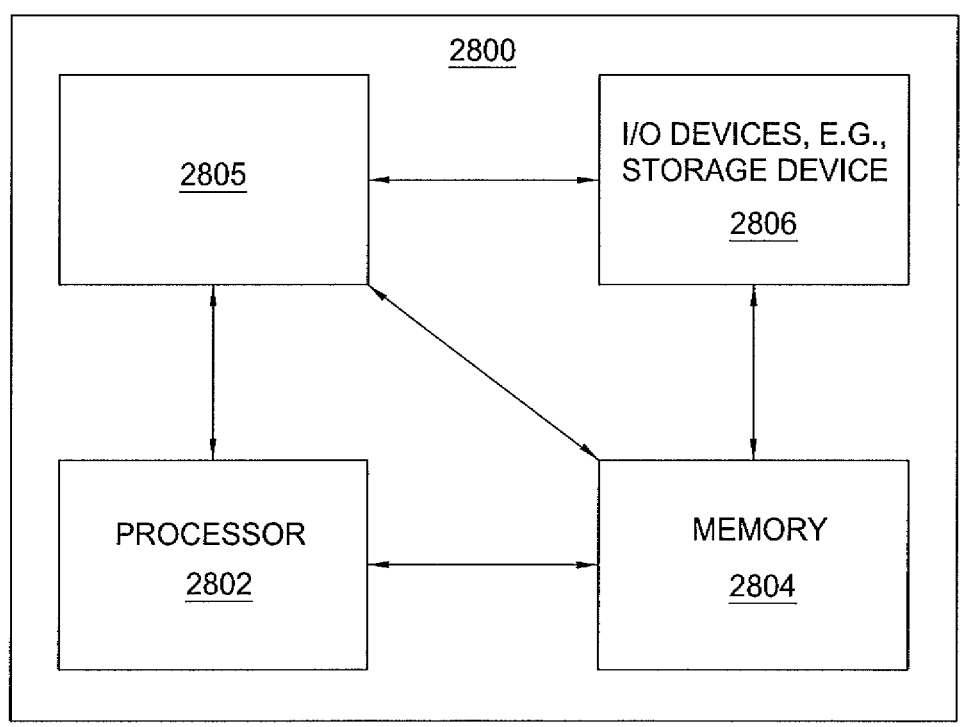
FIG. 28 depicts a high-level block diagram of a computer suitable for use in performing functions described herein.

FIG. 28 depicts a high-level block diagram of a computer suitable for use in performing functions described herein. As depicted in FIG. 28, the computer 2800 includes a processor element 2802 (e.g., a central processing unit (CPU) and/or other suitable processor(s)) and a memory 2804 (e.g., random access memory (RAM), read only memory (ROM), and the like). The computer 2800, optionally, may include one or more of a cooperating module/process 2805, various input/output devices 2806 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)), and/or any other modules or elements suitable for use in supporting various functions depicted and described herein.

It will be appreciated that the functions depicted and described herein may be implemented in software for executing on a general purpose computer so as to implement a special purpose computer, and/or may also be implemented on hardware, one or more application specific integrated circuits (ASIC), and/or any other hardware equivalents. In one embodiment, the cooperating process 2805 can be loaded into memory 2804 and executed by processor 2802 to implement the functions as discussed herein. Thus, the cooperating process 2805 (including associated data structures) can be stored on a computer readable storage medium, e.g., RAM memory, magnetic or optical drive or diskette, and the like.

It will be appreciated that computer 2800 depicted in FIG. 28 provides a general architecture and functionality suitable for implementing functional elements described herein and/or portions of functional elements described herein. For example, the computer 2800 provides a general architecture and functionality suitable for implementing a 911-NOW node 110 or any other suitable node on which the distributed database synchronization capability may be provided.

It is contemplated that some of the steps discussed herein as software may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal-bearing medium, and/or stored within a memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus for building a database synchronization node list of a mobile network node (MNN) associated with an organization, the apparatus comprising:
   a processor and a memory communicatively connected to the processor;
   wherein the processor is configured to:
      in response to a trigger condition, identify a plurality of mesh neighbor nodes of the MNN having wireless connectivity to the MNN;
      for each of at least one of the mesh neighbor nodes of the MNN that is associated with the organization, enter the mesh neighbor node into the database synchronization node list of the MNN; and
      for each of at least one of the mesh neighbor nodes of the MNN that is not associated with the organization, propagate a probe message from the MNN toward the mesh neighbor node via the wireless connection therebetween; wherein the processor is further configured to:
      receive, from a neighbor node of the MNN, a probe message comprising an indication of an organization with which the neighbor node is associated;
      determine whether the organization with which the MNN is associated and the organization with which the neighbor node is associated are the same;
      when the organizations are the same, respond to the probe message with a probe response message without forwarding the probe message to any other nodes; and
      when the organizations are different, forward the probe message to one or more mesh neighbor nodes of the MNN.

2. The apparatus of claim 1, wherein the trigger condition is expiration of a periodic timer.

3. The apparatus of claim 1, wherein at least one entry of the database synchronization node list comprises an Internet Protocol (IP) address of the node and a discovery timestamp indicative of a time at which the node was discovered, wherein the processor is configured to:
   for at least one mesh neighbor node of the MNN associated with the organization, set the discovery timestamp of the entry of the database synchronization node list to the current time.

4. The apparatus of claim 1, wherein at least one probe message comprises:

an Internet Protocol (IP) address of the MNN; and
an indication of the organization with which the MNN is associated.

5. The apparatus of claim 4, wherein at least one probe message further comprises at least one of:
   a hop counter;
   a backhaul indicator; and
   an IP address of a backhaul gateway.

6. The apparatus of claim 1, wherein the processor is for configured to:
   receive a probe response message at the MNN, wherein the probe response message identifies the mesh neighbor node of the MNN from which the probe response message is received.

7. The apparatus of claim 6, wherein the processor is configured to:
   determine whether the mesh neighbor node from which the probe response message is received is listed in the database synchronization node list.

8. The apparatus of claim 7, wherein the processor is configured to:
   when the mesh neighbor node from which the probe response message is received is not listed in the database synchronization node list, add the mesh neighbor node from which the probe response message is received to the database synchronization node list.

9. The apparatus of claim 7, wherein at least one entry of the database synchronization node list comprises an Internet Protocol (IP) address of the node and a discovery timestamp indicative of a time at which the node was discovered, wherein the processor is configured to:
   when the mesh neighbor node from which the probe response message is received is listed in the database synchronization node list, update the discovery timestamp of the entry of the database synchronization node list that is associated with the mesh neighbor node to include the current time.

10. The apparatus of claim 1, wherein the processor is configured to:
    select, by the MNN, a node from the database synchronization node list; and
    initiate, by the MNN, a database synchronization process for synchronizing the database of the MNN with a database of the selected node.

11. A method for building a database synchronization node list of a mobile network node (MNN) associated with an organization, the method comprising:
    using a processor for:
      in response to a trigger condition, identifying each of a plurality of mesh neighbor nodes of the MNN having wireless connectivity to the MNN;
      for each of at least one of the mesh neighbor nodes of the MNN that is associated with the organization, entering the mesh neighbor node into the database synchronization node list of the MNN;
      for each of at least one of the mesh neighbor nodes of the MNN that is not associated with the organization, propagating a probe message from the MNN toward the mesh neighbor node via the wireless connection therebetween
      receiving, from a neighbor node of the MNN, a probe message comprising an indication of an organization with which the neighbor node is associated;
      determining whether the organization with which the MNN is associated and the organization with which the neighbor node is associated are the same;

when the organizations are the same, responding to the probe message with a probe response message without forwarding the probe message to any other nodes; and when the organizations are different, forwarding the probe message to one or more mesh neighbor nodes of the MNN.

12. The method of claim 11, further comprising:

receiving a probe response message at the MNN, wherein the probe response message identifies the mesh neighbor node of the MNN from which the probe response message is received;

determining whether the mesh neighbor node from which the probe response message is received is listed in the database synchronization node list; and when the mesh neighbor node from which the probe response message is received is not listed in the database synchronization node list, adding the mesh neighbor node from which the probe response message is received to the database synchronization node list.

13. A mobile network node (MNN) associated with an organization and comprising a database, the MNN comprising:

a processor and a memory communicatively connected to the processor, the processor configured to:

select, by the MNN, a neighbor node associated with the organization, the selected neighbor node being one of a plurality of neighbor nodes of the MNN that are associated with the organization, the selected neighbor node including a database;

initiate, by the MNN, a database synchronization process for synchronizing the database of the MNN with the database of the selected neighbor node, wherein the database synchronization process comprises:

sending a database synchronization request message from the MNN toward the selected neighbor node;

receiving, at the MNN, a database synchronization response message comprising a checksum list for the database of the selected neighbor node;

comparing the checksum list for the database of the selected neighbor node with a checksum list for the database of the MNN; and when a determination is made that one or more of the compared checksums do not match, sending a database table synchronization request message configured for requesting, from the selected neighbor node, data from the database of the selected neighbor node that is determined not to match data of the database of the MNN.

14. The apparatus of claim 13, wherein the selected neighbor node is selected from a neighbor node list maintained on the MNN, wherein the neighbor node list includes the plurality of neighbor nodes of the MNN that are associated with the organization.

15. The apparatus of claim 14, where, for at least one of the neighbor nodes listed in the neighbor node list, the neighbor node has associated therewith a synchronization timestamp indicative of the last time a database synchronization was performed between the MNN and the neighbor node.

16. The apparatus of claim 15, wherein the selected neighbor node is the one of the plurality of neighbor nodes having an earliest synchronization timestamp associated therewith.

17. The apparatus of claim 14, wherein the processor is configured to populate the neighbor node list maintained on the MNN by:

in response to a trigger condition, identifying a plurality of mesh neighbor nodes of the MNN having wireless connectivity to the MNN;

for each of at least one of the mesh neighbor nodes of the MNN that is associated with the organization, entering the mesh neighbor node into the neighbor node list of the MNN; and for each of at least one of the mesh neighbor nodes of the MNN that is not associated with the organization, propagating a probe message from the MNN toward the mesh neighbor node via the wireless connection therebetween.

18. The apparatus of claim 14, wherein at least one of the neighbor nodes maintained in the neighbor node list has a discovery timestamp associated therewith, wherein the processor is configured to:

remove one of the neighbor nodes from the neighbor node list in response to a determination that its discovery timestamp satisfies a threshold.

* * * * *